US009101819B2

(12) United States Patent
Weissenborn

(10) Patent No.: US 9,101,819 B2
(45) Date of Patent: Aug. 11, 2015

(54) CLAMP SYSTEM WITH CLAMP

(76) Inventor: Richard Weissenborn, Calgary (CA)

( * ) Notice: Subject to any disclaimer, the term of this patent is extended or adjusted under 35 U.S.C. 154(b) by 536 days.

(21) Appl. No.: 13/357,596

(22) Filed: Jan. 24, 2012

(65) Prior Publication Data

US 2012/0119427 A1 May 17, 2012

Related U.S. Application Data

(63) Continuation-in-part of application No. 12/347,456, filed on Dec. 31, 2008, now Pat. No. 8,342,495.

(51) Int. Cl.

| | |
|---|---|
| *B23Q 3/02* | (2006.01) |
| *A63C 11/26* | (2006.01) |
| *A63C 11/04* | (2006.01) |
| *B25B 1/10* | (2006.01) |
| *B25B 1/20* | (2006.01) |
| *B25B 1/24* | (2006.01) |
| *B25B 5/00* | (2006.01) |
| *B25B 5/10* | (2006.01) |
| *B25B 5/14* | (2006.01) |
| *B25B 27/00* | (2006.01) |
| *B25H 1/00* | (2006.01) |
| *F41A 23/16* | (2006.01) |
| *F41A 23/18* | (2006.01) |

(52) U.S. Cl.

CPC ................. *A63C 11/26* (2013.01); *A63C 11/04* (2013.01); *B25B 1/106* (2013.01); *B25B 1/205* (2013.01); *B25B 1/2484* (2013.01); *B25B 5/006* (2013.01); *B25B 5/101* (2013.01); *B25B 5/14* (2013.01); *B25B 27/0071* (2013.01); *B25H 1/0014* (2013.01); *F41A 23/16* (2013.01); *F41A 23/18* (2013.01)

(58) Field of Classification Search

USPC .......... 269/143, 249, 71, 75, 95, 166; 29/257, 29/276, 278

See application file for complete search history.

(56) References Cited

U.S. PATENT DOCUMENTS

| | | | | |
|---|---|---|---|---|
| 994,630 A | | 6/1911 | Bergstrom | |
| 1,352,647 A | | 9/1920 | Benton | |
| 1,369,747 A | | 2/1921 | Jordan | |
| 1,410,184 A | | 3/1922 | Hunter | |
| 2,455,517 A | * | 12/1948 | Nielson | 269/130 |
| 2,606,583 A | | 8/1952 | O'Connor | |
| 2,636,527 A | | 4/1953 | Schiemann | |
| 2,669,958 A | | 2/1954 | Sweeney | |
| 2,778,939 A | | 1/1957 | Haddad | |
| 2,907,630 A | | 10/1959 | Lawroski | |
| 2,944,811 A | | 7/1960 | Wolf | |
| 3,574,900 A | | 4/1971 | Emery | |

(Continued)

*Primary Examiner* — Lee D Wilson
*Assistant Examiner* — Nirvana Deonauth
(74) *Attorney, Agent, or Firm* — McCarthy Tétrault LLP

(57) ABSTRACT

A clamp system having a clamp adapted to be removably fastened to a wide variety of stationary support forming a base on which additional clamps or rods may be mounted for the purpose of holding a workpiece, the clamp including a tensioning device allowing a piece of cord to be looped over a part of the workpiece and pulled taut to bind the workpiece to the clamp. The cord is quickly and easily attachable to the clamp, fixed in place under tension, and quickly and easily released. The clamp comprises: a frame, clamping screw subassembly, at least one jamming cleat formed as part of the frame, and adjustable connector feature formed as part of the frame for connecting two or more frames together. A length of cord may be tensioned and secured within the jamming cleat of the frame and means is provided for anchoring the cord within the clamping plate.

18 Claims, 48 Drawing Sheets

(56) References Cited

U.S. PATENT DOCUMENTS

| | | | | |
|---|---|---|---|---|
| 3,826,482 | A | | 7/1974 | Tourangeau |
| 3,861,664 | A | | 1/1975 | Durkee |
| 3,981,491 | A | | 9/1976 | Snyder |
| 4,141,542 | A | | 2/1979 | Wolff |
| 4,500,077 | A | | 2/1985 | Coxon |
| 4,607,829 | A | | 8/1986 | Suska |
| 4,824,086 | A | | 4/1989 | Rickling et al. |
| 4,825,513 | A | | 5/1989 | Verespej |
| 4,828,210 | A | | 5/1989 | Anderson et al. |
| 4,919,406 | A | | 4/1990 | Bunnell |
| 4,969,636 | A | | 11/1990 | Gautam |
| 5,405,124 | A | | 4/1995 | Mayer et al. |
| 5,497,967 | A | | 3/1996 | Gantois |
| 5,605,321 | A | | 2/1997 | Jarvis |
| 5,765,822 | A | | 6/1998 | Mead |
| 5,893,550 | A | | 4/1999 | Lassley |
| 5,996,814 | A | | 12/1999 | Workman et al. |
| 6,305,679 | B1 | | 10/2001 | Brill |
| 6,663,094 | B2 | | 12/2003 | Weissenborn |
| 6,880,817 | B2 | | 4/2005 | Clarke |
| 7,356,960 | B1 | | 4/2008 | Knitt |
| 7,478,794 | B1 | * | 1/2009 | Gohlke et al. ....... 254/134.3 FT |
| 2004/0232608 | A1 | * | 11/2004 | Wong ............................ 269/249 |

* cited by examiner

SECTION A-A

CLAMP SYSTEM WITH CLAMP

CROSS-REFERENCE TO RELATED APPLICATION

This application is a continuation-in part application of U.S. patent application Ser. No. 12/347,456 filed on Dec. 31, 2008 now U.S. Pat. No. 8,342,495.

FIELD OF THE DISCLOSURE

The present disclosure is a clamp system adapted to be removably fastened to a wide variety of stationary support forming a base on which one or more additional clamps or rods can be mounted for the purpose of holding a workpiece, the clamp including a tensioning device allowing a length of rope, elastic or accessory cord to be looped around or through a workpiece and then pulled taut to bind the workpiece to the clamp, and adjustable connector feature integrally formed as part of the clamp frame for connecting two or more clamp frames together.

BACKGROUND

There are numerous previous disclosures relating to portable clamps on which additional clamps or rods can be mounted, and disclosures disclosing wedge slot devices wherein a V-shaped slot catches a rope or cord when properly positioned are well known, but none are equivalent to the present disclosure.

U.S. Pat. No. 994,630 discloses a pin loosely connecting two clamp frames together. U.S. Pat. No. 1,352,647 discloses a hinge mechanism for pivotally connecting two clamp frames together. U.S. Pat. No. 4,141,542 discloses a C-clamp with one leg adapted as a guiding ledge to which a second C-clamp is connected.

U.S. Pat. No. 1,410,184 discloses a spring-loaded locking mechanism fastened between two C-clamp frames.

U.S. Pat. No. 2,606,583 discloses C-clamp frames with tongue and groove interconnecting means. U.S. Pat. No. 2,636,527 discloses C-clamp frames with male and female interconnecting elements. U.S. Pat. No. 2,778,939 discloses a pair of interfitted C-clamp frames.

U.S. Pat. No. 2,669,958 discloses a welder's work holder appliance where C-clamp frames are connected to each other using ball joints.

U.S. Pat. No. 5,405,124 discloses a C-clamp with auxiliary connecting elements used to connect two clamp frames together. U.S. Pat. No. 4,607,829 discloses C-clamp frames with spaced holes allowing fasteners to secure juxtaposed clamp frames.

U.S. Pat. No. 5,765,822 discloses a C-clamp frame with a clamping module connected through frictional contact between dowel pieces.

U.S. Pat. No. 4,825,513 discloses C-clamp frames modularly connectable along a linear pathway.

U.S. Pat. No. 4,969,636 discloses C-clamp formed with an opening through which a shaft extends and means for locking the shaft to the clamp. U.S. Pat. No. 4,500,077 discloses a C-clamp with a pivoting hinge element used to connect a clamp frame to a rod.

U.S. Pat. No. 3,574,900 discloses a jamming cleat, but unlike the present disclosure it is not integrally formed as part of a C-clamp frame.

U.S. Pat. No. 1,369,747 discloses C-clamp frames with apertures through which flexible seat suspenders are attached. U.S. Pat. No. 2,907,630 discloses a C-clamp with a flexible clamping element.

U.S. Pat. No. 4,828,210 discloses a C-clamp with integrated bore and angled cross cam slot for locking a tether line.

U.S. Pat. No. 6,663,094 discloses an apparatus for holding a ski during repair and maintenance with an intermediate tensioning device comprising a C-clamp, accessory cord and cleat component.

SUMMARY OF THE DISCLOSURE

The present disclosure provides a clamp system providing a clamp adapted to be removably fastened to a wide variety of stationary support forming a base on which additional clamps or rods may be mounted for the purpose of holding a workpiece, the portable clamp including a tensioning device allowing a flaccid length of rope, elastic or accessory cord to be looped around or through the workpiece and then pulled taut to bind the workpiece to the clamp, where the rope or cord is quickly and easily attached to the clamp, fixed in place under tension, as well as quickly and easily released; the portable clamp comprising: a clamp frame, clamping screw subassembly, at least one jamming cleat integrally formed as part of the clamp frame, and adjustable connector feature integrally formed as part of the clamp frame for connecting two or more clamp frames together. A length of rope or cord may be tensioned and secured within the jamming cleat of the clamp frame and means is provided for anchoring the rope or cord within the clamping plate.

In one aspect of an embodiment, a clamp system for holding a workpiece is provided. The clamp system comprises a clamp. The clamp has a frame having a cavity located along an exterior surface of the frame, the cavity having a first wall and a second wall; and a first protrusion located in the cavity on the first wall, extending towards the second wall and shaped to retain a cord.

In the clamp system, the clamp may be a C-clamp having a lower jaw connected to a middle section connected to an upper jaw; and the first protrusion further comprises a feature located on the second wall, extending towards the first wall and shaped to retain the cord.

In the clamp system, the first protrusion may have a V-shaped cross section.

In the clamp system may further comprise a second protrusion extending to a center line of a spine of the clamp and extending from the first protrusion.

In the clamp system, the cavity may span a corner of the exterior surface of the frame; and the first protrusion may be located in about the corner in the cavity.

In the clamp system, the clamp may further comprise: a first mating feature located on the frame at a first location; and a second mating feature shaped to mate with the first mating feature located on the frame at a second location.

In the clamp system, the first mating feature may be a third protrusion extending from the surface of the clamp; and the second mating feature may be a depression shaped to receive the third protrusion.

In the clamp system, the first mating feature may have an aperture to receive a locking mechanism.

In the clamp system, the first location may be in on the middle portion of the frame on the exterior surface on the frame; and the second location may be in on the middle portion on an interior surface on the frame.

In the clamp system, the first location may be in on a distal end of the lower jaw of the frame on the exterior surface on the frame; and the second location may be in on the distal end of the lower jaw on an interior surface on the frame.

In the clamp system, the clamp may further comprise: an orientation feature provided on the first mating feature to orient a second clamp in one of at least two fixed orientations relative to the clamp when the first mating feature of the clamp is mated to the second mating feature of the second clamp.

In the clamp system, the clamp may further comprise a clamping screw subassembly that has: a clamping plate; a clamping screw; and a support head formed on one end of the clamping screw. The clamping screw subassembly may be mated to the clamp through an opening in a jaw of the clamp.

In the clamp system, in use, the clamp may be mounted to a workstation; a workpiece may be mounted on the support head; the cord may be fed through the first protrusion in the clamp, over a section of the workpiece and to the clamping plate to assist in stabilizing the workpiece at the workstation.

In the clamp system, the clamping plate may comprise a recess to receive the cord.

In the clamp system, the support head may comprise a clamping handle having ends adapted to receive mounting hold a bicycle fork of the workpiece.

In a second aspect, a clamp is provided, comprising: a frame that has a lower jaw, a middle section connected to the lower jaw at a first corner, an upper jaw connected to the middle section at a second corner and first and second cavities defined an exterior surface of the frame at the first and second corners; a first protrusion located in the each of the first and second cavities around the first and second corners, the first protrusion located on a first wall of the first and second cavities, extending towards a second wall of the first and second cavities shaped to retain a cord at one end of the cord; and a second protrusion extending to a center line of a spine of the clamp and extending from the first protrusion.

The clamp may further comprise a first mating feature located on the frame at a first location, the first mating feature shaped to mate with a second mating feature of a second clamp.

The clamp may further comprise a clamping screw subassembly having: a clamping plate; a clamping screw; and a support head formed on one end of the clamping screw, where the clamping screw subassembly is mated to the clamp through an opening in the lower jaw of the clamp.

The clamp may further comprise a second clamping screw subassembly mated to the clamp through an opening in the upper jaw of the clamp.

In the clamp the support head may comprise the second mating feature to mate with the first mating feature of the clamp.

According to another aspect of the disclosure, there is provided a clamp and tensioning device providing means to hold a workpiece on or above stationary support such as a work station.

According to another aspect of the disclosure, there is provided a tensioning device that can be removably attached to a variety of stationary support.

According to another aspect of the disclosure, there is provided adjustable connector feature integrally formed as part of the clamp frame for connecting two or more clamp frames together.

According to another aspect of the disclosure, there is provided a clamp to which one or more rods can be mounted for the purpose of holding a workpiece.

According to another aspect of the disclosure, there is provided at least one jamming cleat integrally formed as a part of a clamp frame.

According to another aspect of the disclosure, there is provided means to quickly and easily properly position and tension the rope, elastic or accessory cord so the V-shaped slot of a jamming cleat is able to catch and hold the rope or cord securely at one end of the cord, and to quickly and easily release the rope or cord from the jamming cleat.

It is another aspect of the disclosure to secure a rope, elastic or accessory cord within the clamping plate of the clamp so as to provide a simple and convenient anchor point from which to pull the rope or cord when tensioning and fixing the rope or cord in a jamming cleat.

It is a further aspect for the rope, elastic or accessory cord to be threaded through at least one aperture in the clamping plate where rope or cord is furnished with a knot that is easily captured and held within the clamping plate.

It is yet another object of the disclosure to provide a convenient square clamping plate shape, one or more sides of which may be readily aligned with the edge of a tabletop or other stationary support to consistently position the clamp in relation to the stationary support.

It is another aspect of the disclosure to provide improved elements and arrangements thereof in a device for the purposes described which is inexpensive, dependable and fully effective in accomplishing its intended purposes.

In yet another aspect of the disclosure, there is provided an apparatus for holding a ski or snowboard in a fixed horizontal position during base preparation and maintenance which apparatus also employs means permitting the ski or snowboard to be held in a fixed vertical position for edge maintenance procedures.

According to another aspect of the disclosure, there is provided a three-point support arrangement which provides substantial support of the entire ski or snowboard for base and edge tuning and maintenance operations.

According to another aspect of the disclosure, there is provided an apparatus for holding a bicycle in a fixed upright position on or above stationary support such as a work stand to facilitate bicycle cleaning, adjustment, repair and/or replacement operations.

According to another aspect of the disclosure, there is provided an apparatus for holding a firearm in a generally horizontal and fixed position on or above stationary support such as a work stand to facilitate maintenance procedures including inspection, cleaning, repair and sighting.

According to another aspect of the disclosure, there is provided an apparatus that is adaptable for use with a very wide variety of skis, snowboards, bicycles and firearms having different shapes, sizes and construction.

According to another aspect of the disclosure, there is provided an apparatus where sports equipment including skis, snowboards, bicycles and firearms can be readily mounted to or dismounted from the holder.

According to another aspect of the disclosure, a removable mounting system is provided for removably mounting sports equipment including skis, snowboards, bicycles and firearms to a holding apparatus, said apparatus being adapted to be mounted to a wide variety of tables, work stations and support stands.

According to another aspect of the disclosure, there is provided a sports equipment holding apparatus that is compact and readily portable.

According to another aspect of the disclosure, there is provided an apparatus having a high degree of versatility, adjustability, and/or adaptability to other non-ski, snowboard, bicycle and firearm uses.

According to another aspect of the disclosure, there is provided a portable holder for use in spaced relation with a similar holder as a ski, snowboard, bicycle and firearm support for maintenance operations at a work station, each said holder being adapted to support one of the opposing end portions of the ski, snowboard, bicycle or firearm. The portable holder comprises a base section adapted to be fixed to the work station in a generally upright position and a rod portion mounted to the base section in a generally upright and vertical orientation. A support head mounted upon the rod allows a variety of modular supports, platforms and brackets to be removably mounted to the support head including ski and snowboard supports, bicycle fork mounting brackets, bicycle bottom bracket shell supports and gun cradles. The rod may be threaded.

According to another aspect of the disclosure, there is provided a portable holder for use in spaced relation with a similar holder as a ski and snowboard support, each said holder being adapted to support one of the opposing end portions of the ski or snowboard. The portable holder comprises a base section adapted to be fixed to the work station in a generally upright position and a threaded rod portion mounted to the base section in a generally upright and vertical orientation. A support head mounted upon said threaded rod allows a ski and snowboard support to be mounted to the holder. The ski and snowboard support typically has a resilient top surface to frictionally engage the ski or snowboard when resting thereon and includes a vertical slot for holding both a ski and snowboard in a generally upright position to permit convenient side edge work. The vertical slot of the support is of a sufficient width that when either a ski or snowboard is placed upright in said slot the ski and snowboard support, support head and threaded rod portion of the holder can be rotated as a unit about the base section of the holder and the holders' vertical axis such that two opposing longitudinal edges of said slot act to clamp the ski or snowboard in a fixed upright position. A nut on the lower portion of the threaded rod turned against the top portion of the base allows the ski and snowboard support, support head and threaded rod portion of the holder to be fastened to the base section in the desired orientation preventing unwanted movement of the ski or snowboard when performing side edge tuning procedures. The ski and snowboard support, support head and threaded rod portion of the holder can also be rotated about the holders vertical axis to adjust the height of the support relative to the holder base section, or to change the orientation of the support from a position where said support is aligned across the width of a snowboard to a position where the support is aligned with the longitudinal axis of a ski. The ski and snowboard support is preferably mounted to the support head of the holder for movement between a position where the support is generally horizontal to one where the support is generally vertical, allowing the support to pivot between horizontal and vertical positions to adjust to various degrees of ski camber when the support is aligned under the longitudinal axis of a ski. A locking system is provided for locking the ski and snowboard support to the support head of the holder in either a fixed horizontal or vertical position.

According to another aspect of the disclosure, there is provided a portable holder typically positioned in spaced relation along the edge of a tabletop, work station or support such that the first holder is placed under or in close proximity to a bicycle frame bottom bracket shell and the second holder is positioned under either the front bicycle dropout or rear bicycle dropout. In this manner the proximity of the holders in relation to each other can be easily and independently adjusted according to bicycle frame size. The first holder comprising a bottom bracket shell support is typically positioned in close proximity to one corner of the tabletop, work station or support so as to allow either the front or rear bicycle wheel sufficient clearance off the table or stand to spin freely, and said holder is of a sufficient height so as to allow the bicycle crank arms and pedals sufficient clearance above the tabletop, work station or support to rotate without impediment. The bottom bracket shell support preferably has a "V" shaped profile allowing a wide variety of bottom bracket shell diameters and shapes to be cradled by said support and typically has a resilient top surface to frictionally engage the bicycle bottom bracket shell when resting thereon. The bottom bracket shell support is preferably mounted to the support head of the holder for movement between a position where said support is generally horizontal to one where said support is generally vertical, allowing said support to pivot between horizontal and vertical positions to accommodate various frame shapes in the vicinity of the bottom bracket shell, and a locking system is provided for locking the bottom bracket shell support in either said horizontal or vertical position. The first holder preferably comprises a retaining strap associated therewith to hold a bicycle frame bottom bracket shell against bottom bracket shell support, said strap being looped around and tensioned against the portion of the bicycle frame where the down tube and seat tube meet the bottom bracket shell. Mounts are provided to readily detachably mount various bicycle axles transversely through the support head of the second holder to permit fastening of a wide variety of front and rear bicycle fork ends to the holder.

According to another aspect of the disclosure, there is provided a vise assembly for use with the portable holder adapted to be mounted upon the threaded rod portion of the holder or fixed directly to a work station and used in spaced relation with similar holder(s), or in combination with the variety of modular supports, platforms and brackets described above. A vise base including a perpendicular threaded aperture allows the threaded rod of the holder to be turned into the threaded aperture of the vise base permitting mounting of the vise assembly to the threaded rod portion of the holder. A vise screw extending horizontally through the vise base with two reversely threaded sections drives oppositely disposed vise jaws toward and away from each other along at least one guide bar with the vise jaws sliding exactly parallel to each other when the vise screw is turned. The vise screw is turned by a handle assembly fastened to one end of the vise screw including a lever transversely and slidably mounted through an aperture in a handle end cap. Index finger rings mounted on each end of the lever act to prevent the lever from becoming detached from the handle assembly and allow for quick and efficient manual rotation of the handle assembly and vise screw when an index finger is placed through, or partially through, one of the index finger rings. The handle end cap is of a larger diameter than the vise screw and acts as a stop preventing the vise jaws from winding off the vise screw when vise jaws are actuated away from each other. Both vise screw and guide rod(s) are preferably detachably secured to the vise base in order to be readily exchanged with a longer or shorter vise screw and guide bar(s) depending on the width of ski, snowboard, bicycle, firearm or other sports equipment to be held in the vise assembly. Each oppositely disposed vise jaw forms a "C" shaped profile allowing a holder support head, clamp knob or a ski binding to be positioned within the vise assembly between the vise jaws when clamping. Each of the vise jaws preferably includes a recessed stepped indent to receive and hold pins of varying diameters and lengths when two oppositely disposed vise jaws are closed upon both ends of a pin extending between and perpendicular to the vise jaws. Diameters of pins are held onto which certain types of cross country, touring and backcountry touring ski bindings are fastened with said pins also able to provide anchor for an eyebolt used to fasten and support a snowboard resting base up on the holder when said eyebolt is turned into one of the snowboard threaded inserts.

A flat surface exists on the top of each vise jaw allowing the vise assembly to act as a rest in addition to having clamping ability. The vise jaws are actuated towards each other to clamp either a ski or snowboard in a vertical orientation, or actuated a sufficient distance away from each other to provide stable support for a ski or snowboard resting horizontally on the flat top surface of the vise jaws. The vise assembly is able to be rotated such that the vise jaws can be positioned in line with the longitudinal axis of the ski so as not to interfere with base rilling, structuring and/or imprinting tools with vertically disposed flanges of a thickness greater than the thickness of a ski or snowboard when drawn down the ski or snowboard base as required when the ski or snowboard is resting base up. The vise jaws are typically provided with resilient jaw pads, each jaw pad covering the entire top portion of each vise jaw and shaped such that each pad is mechanically held in place against the vise jaw when clamping so as not to become detached from the vise jaw. The jaw pads are preferably made of a resilient material such as rubber so as not to dent, mar or otherwise damage the sports equipment including for instance the ski, snowboard, bicycle or firearm being clamped.

According to another aspect of the disclosure, there is provided a portable holder typically positioned in spaced relation along the edge of a tabletop, work station or support such that a first holder is placed under or in close proximity to the shovel portion of a ski or snowboard, a second holder is positioned under the binding area and a third holder is positioned under or in close proximity to the tail portion of a ski or snowboard providing an improved three point ski and snowboard support arrangement. Each of the three holders is provided with vise assemblies as described above. The first and third holders positioned under or in close proximity to both shovel and tail portions of the ski or snowboard are each equipped with support heads mounted upon the threaded rod portions of each holder. A vertical slot in each support head serves to stabilize a snowboard in a generally upright position when the support head is rotated about its vertical axis such that the vertical slot is aligned parallel with the vise jaws and the snowboard is dropped down into the slot and clamped between the vise jaws to permit convenient side edge tuning. The support head of each holder also acts as a rest for a ski placed upright on the support head then clamped between the vise jaws when the support head is rotated about its vertical axis such that the vertical slot is perpendicular to the vise jaws, thereby allowing the vise jaws to clamp the ski relatively close to its bottom edge allowing work to be done on the top edge of the ski without obstruction from the vise jaws. A ski is held either base up for base tuning or base down to facilitate binding mounting by clamping the sides of the ski in the binding area using the second holder and resting the shovel and tail portions of the ski on the top portion of the vise jaws of the first and third holders. When holding skis having an alpine binding the second holder is positioned directly under the binding ski brake. The opposing “C” shape of each vise jaw provides an open area under each jaw pad allowing the ski brake to be first retracted then held in a retracted position by the vise jaws when either the sides of a ski or ski binding are clamped by the vise jaws. In this respect the vise jaws of the second holder serve the dual purpose of clamping the ski or ski binding and retracting the ski brake. When holding skis having a binding of the Nordic variety, that is to say a binding that closes on a pin in order to fasten a ski boot to a ski, an additional mounting option exists where the vise jaws of the second holder include stepped indents to receive and hold pins of varying diameters and lengths when the two oppositely disposed vise jaws are closed on both ends of a pin placed in a perpendicular orientation between the vise jaws. At least three diameters of pins may be held in progressively smaller diameter stepped indents in each vise jaw onto which both New Nordic Norm (NNN) and Salomon Nordic System (SNS) cross country, and other touring and backcountry touring ski bindings may be fastened. To hold a snowboard base up the vise jaws of the first and third holders are actuated far enough away from each other so the top surface of the four vise jaws act as a stable four-point rest upon which the snowboard can be placed. An eyebolt turned into one of the snowboard threaded inserts can be anchored to the second holder by placing one of the pins mentioned above through said eyebolt and closing the oppositely disposed vise jaws on both ends of said pin. The threaded rod of the second holder is provided with two reversely disposed sections of threads to permit convenient height adjustment of the vise assembly relative to the base section of the holder when the vise assembly is held in position and the threaded rod is turned either clockwise or counter-clockwise, allowing the height of the vise assembly to be readily adjusted relative to the snowboard without the need to rotate either vise assembly or eyebolt. A nut or knob on the lower portion of the threaded rod turned against the top portion of the base allows the threaded rod portion of the holder to be fastened to the base in a fixed position once the holder has been adjusted to the desired height.

According to another aspect of the disclosure, there is provided a vise assembly that is mounted to the threaded rod portion of both a first holder and a second holder, each holder positioned in spaced relation along the edge of a tabletop or support such that the first holder is placed under or in close proximity to a bicycle frame bottom bracket shell and the second holder is positioned under either the front bicycle dropout or rear bicycle dropout. The vise assembly of each holder is orientated such that the vise jaws are transversely positioned relative to the length of the tabletop or support on which the supports are fastened. The vise jaws of the first holder can then be adjusted to allow the bicycle bottom bracket shell to be seated upon the top portion of both jaws in a stable manner. The first holder preferably comprises a retaining strap associated therewith to hold a bicycle frame bottom bracket shell against the top portion of the vise jaws, said strap being looped around and tensioned against the portion of the bicycle frame where the down tube and seat tube meet the bottom bracket shell. A horizontal “V” shaped groove exists in the clamping surface of each vise jaw allowing for convenient horizontal clamping of a wide variety of bicycle axles with circular cross sections in the vise jaws of the second holder, thereby allowing the front or rear bicycle dropout to be securely fastened to the second holder.

According to another aspect of the disclosure, there is provided a vise assembly in which the opposing vise jaws include apertures where resilient rubber frame pads are inserted to facilitate clamping a very wide variety of bicycle frames between the opposing vise jaws of the vise assembly. Each frame pad preferably has a “V” shaped profile allowing a very wide variety of bicycle frame tube diameters and shapes to be cradled between and held within the angled flanges of the frame pads. The frame pads are preferably made of a resilient rubber material to prevent damage to the bicycle frame and provide for good frictional engagement therewith. The vise assembly is mounted transversely on the vertically orientated threaded rod of the holder with the threaded rod turned into a corresponding threaded aperture in vise base. In this manner the vise assembly is positioned in a generally horizontal orientation with the longitudinal axis of opposing vise jaws parallel with the tabletop or support allowing vise jaws of the vise assembly to both clamp the top tube of the bicycle frame and act to suspend the bicycle a sufficient distance off the tabletop and above the ground to facilitate bicycle maintenance, adjustment or repair. Alternatively, the vise assembly can be mounted transversely on the vertically orientated threaded rod of the holder through a second threaded aperture in the vise base, positioning the vise assembly in a generally horizontal orientation, but with the vise jaws perpendicular to the tabletop. In this orientation the opposing vise jaws are able to clamp the vertically orientated seat tube of the bicycle frame, thereby holding the bicycle sufficiently off the table and above the ground to facilitate bicycle maintenance, adjustment and repair operations thereon.

According to another aspect of the disclosure, there is provided a first holder is for use in spaced relation with a second similar holder as a firearm support, each said holder being adapted to support one of the opposing end portions of a firearm. The holder comprises a base section adapted to be fixed to the work station in a generally upright position and a threaded rod portion mounted to the base section in a generally upright and vertical orientation. A support head mounted upon said threaded rod allows a gun barrel cradle to be mounted to first said holder. The gun barrel cradle typically has a resilient top surface to frictionally engage a gun barrel, said cradle preferably having a "V" shaped profile permitting a wide variety of barrels to be automatically centered relative to the vertical axis of said cradle when resting thereon. The gun barrel cradle is preferably mounted to the support head of the holder for movement between a position where said cradle is generally horizontal to one where said cradle is generally vertical, allowing said cradle to pivot between horizontal and vertical positions to accommodate various barrel inclination angles, and means are provided for locking said cradle in either a fixed horizontal or vertical position. A vise assembly as described above is mounted to the threaded rod portion of the second holder with the vise base typically having a resilient top surface to frictionally engage the bottom of a gunstock resting thereon permitting centered clamping of the gunstock along its longitudinal axis between oppositely disposed vise jaws. The threaded rod of the second holder is provided with two reversely disposed sections of threads to permit convenient height adjustment of the vise assembly and gunstock relative to the base section of the holder when the vise assembly is held in position and the threaded rod is turned either clockwise or counter-clockwise, allowing the height of the vise assembly and angle of inclination of the firearm to be readily adjusted relative to the holders. A nut or knob on the lower portion of the threaded rod turned against the top portion of the base allows the threaded rod portion of the holder to be fastened to the base in a fixed position once the holder has been adjusted to the desired height.

BRIEF DESCRIPTION OF THE DRAWINGS

Further features and advantages of the embodiments of the present disclosure will become apparent from the following detailed description, taken in combination with the appended drawings, in which.

DETAILED DESCRIPTION OF EMBODIMENTS

Figure 1:
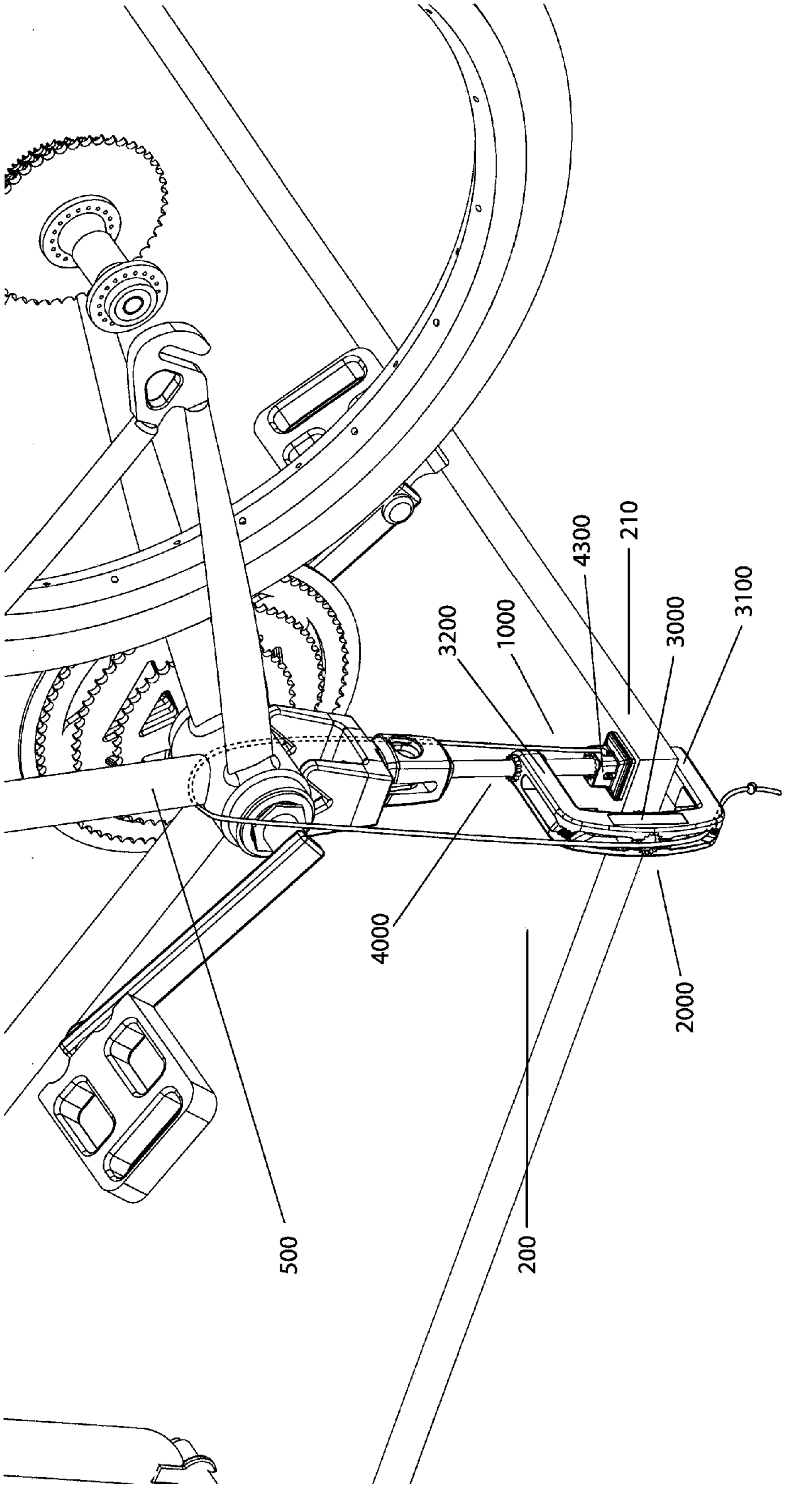
FIG. 1 is a perspective view illustrating a clamp with integrated tensioning device fastened to a table or work bench with a bicycle frame shown positioned upon the clamp and an elastic cord anchored within the clamping plate and looped through the bicycle frame where the down tube and seat tube meet the bottom bracket shell, cord tensioned and secured within the tensioning device for bicycle maintenance, adjustment or repair, in accordance with an embodiment of the disclosure.

The description which follows and embodiments described therein are provided by way of illustration of examples of particular embodiments of the principles of the present disclosure. These examples are provided for the purposes of explanation and not limitation of those principles and of the disclosure. In the description that follows, like parts are marked throughout the specification and the drawings with the same respective reference numerals.

Briefly, an embodiment provides a clamp and tensioning device adapted to be fastened to a wide variety of stationary support for the purpose of firmly holding a workpiece. Representative workpieces include, but are not limited to, sports equipment including a bicycle, ski, snowboard, firearm (such as a gun, rifle, shotgun, pistol, crossbow etc.). One embodiment has specific features for holding a frame, such as a frame for a bicycle.

An embodiment may also be used to hold other devices, objects, items and articles, such as building materials, construction tools, etc.

For an embodiment, the clamp and tensioning device provides support for maintenance operations of the held device at a work station (which may include any suitable work area, such as a work stand, workbench, tabletop, desk, etc.). In one embodiment, the clamp and tensioning device is portable and comprises a clamp frame; a threaded clamping screw and clamping plate mounted to the clamp frame and two jamming cleats integrally formed as part of the clamp frame, where the frame is adapted to be fixed to the work station in a generally upright position and a clamping screw portion attached to the frame in a generally upright and generally vertical orientation.

In one aspect, an embodiment provides that the cleat integrally formed as part of the clamp frame allows a length of rope, elastic or accessory cord to be readily detachable from the C-clamp frame, which is necessary when it is not convenient or practical to loop a rope, elastic or accessory cord entirely around a large object, for example when an elastic cord is looped through a bicycle frame and tensioned against the portion of the bicycle frame where the down tube and seat tube of the bicycle frame meet the bottom bracket shell. An aspect provides that a rope, elastic or accessory cord is anchored without the use of rivets or other fasteners simply by tying a knot in one end of the rope or cord, threading the rope or cord through an aperture in the clamping plate, then compressing the clamping plate against a stationary support to capture the knot within the clamping plate.

In another aspect, an embodiment provides that the cleat is integrally formed as a part of the clamp frame and positioned to be easily accessed from both sides of the clamp frame in order to fix a rope or cord in the cleat, not mounted vertically on one side of the C-clamp frame where it is not possible to fix the cord from the opposite side of the clamp frame.

According to another aspect of the disclosure a clamping plate is able to secure a length of cord, where the cord is knotted and threaded through an aperture in the clamping plate, so as to provide a simple and convenient anchor point from which to pull and tension the cord around or through a workpiece and then fix the cord in a jamming cleat integrally formed as part of a clamp frame for the purpose of binding the workpiece to the clamp. According to another aspect of the disclosure a support head mounted upon the clamping screw allows a variety of modular supports, platforms and brackets to be removably mounted to the support head including, for example, ski and snowboard supports, gun cradles, bicycle fork mounting brackets and bicycle bottom bracket mounting supports. In another embodiment additional clamp frames may be interlocked and fastened directly to the clamp and tensioning device employing interlocking feature integrally formed as part of the clamp frame. In yet another embodiment of the disclosure a second clamp frame may be mounted upon the clamp screw portion of the clamp and tensioning device providing a height-adjustable clamping apparatus. Further details on aspects of embodiments are provided below.

Referring firstly to FIG. 1, which illustrates one embodiment, there is shown a clamp with integrated tensioning device 1000 as a bicycle support for bicycle 500 for maintenance operations being carried out at a work station 200. While having unique features, in one embodiment, clamp 2000 consists of a C-shaped frame 3000 and one clamping screw subassembly 4000; screw subassembly and lower jaw 3100 of frame 3000 fasten clamp to work station 200. Frame 3000 has a lower horizontal jaw 3100 attached to a middle portion, which is in turn attached to an upper horizontal jaw 3200, forming a "C" shape in profile. Other clamps of different shapes may be provided for an embodiment, including L-, V-, U-, O-, P-, T-, ⊓-, ∩-shaped clamps, hook clamps, loop clamps, brackets and others. When the term clamp is used herein, it will be understood that any clamp, bracket or holding device herein may be provided in place of the described clamp unless otherwise noted.

Figure 3:
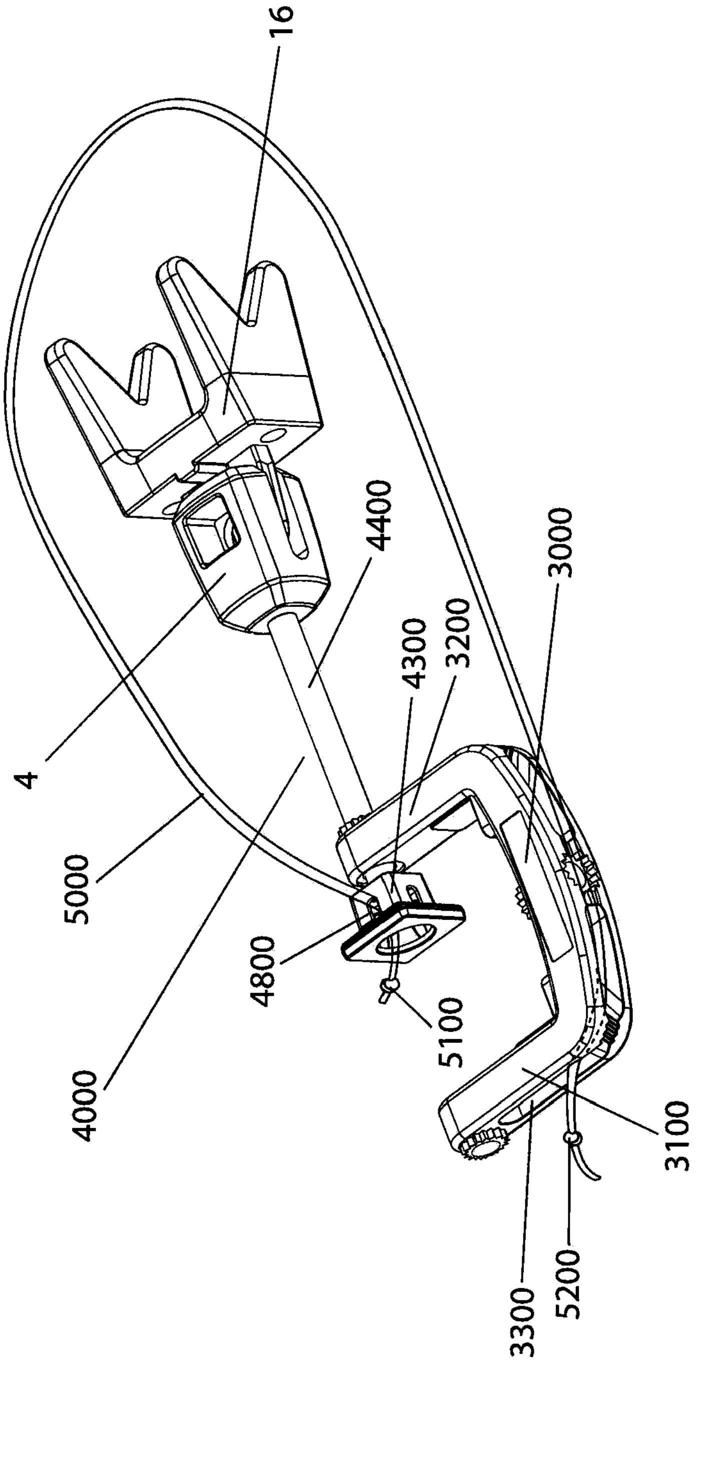
FIG. 3 is a perspective view of a clamp with integrated tensioning device showing two jamming cleats and four interlocking features integrally formed as a part of the clamp frame, a clamping screw subassembly mounted to the clamp frame consisting of a clamping screw, clamping plate and support head, with a bicycle bottom bracket shell support mounted to the support head and a cord knotted and threaded through an aperture in the clamping plate, cord looped loosely around the bottom bracket shell support and cinched in one jamming cleat.
Figure 4:
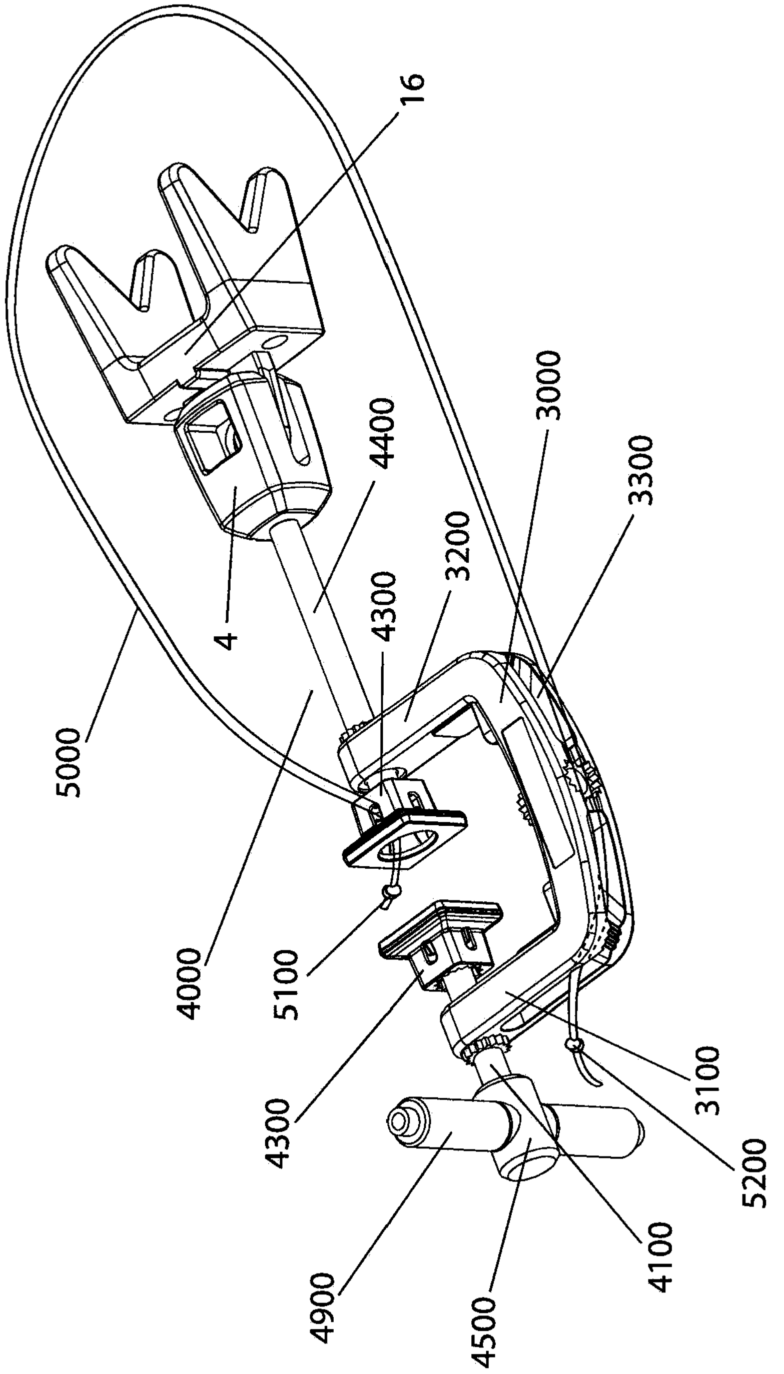
FIG. 4 is a perspective view showing the same clamp with integrated tensioning device, but with an additional clamping screw subassembly and a clamping handle mounted to the clamp frame.

With reference to FIG. 3, clamping screw subassembly 4000 comprises clamping plate 4300, clamping screw 4400, support head 4, which may be integrally formed on one end of clamping screw 4400 and bicycle bottom bracket shell support 16, which may be removably mounted to the support head 4. A length of cord 5000 threaded through aperture 4800 in clamping plate 4300 has knot 5100 tied at one end of cord 5000 to prevent detachment from clamping plate 4300 through aperture 4800. The term "cord" is used to represent any cord, rope, string, wire, band, shock cord, etc. that is made of any material or combination of materials, including paper, twine, elastic, metal, plastic, etc. Subassembly 4000 mates with frame 3000, through an opening at an end in jaw 3200. Screw 4400 has a shaft portion which is fed through the aperture in jaw 3200. The shaft and opening are dimensioned so that the shaft can be moved relative to jaw 3200; the shaft is threaded (not shown) and the opening of jaw 3200 is also threaded (not shown). As such, subassembly 4000 can be rotated about jaw 3200 to move its plate between jaws 3100 and 3200. The ease of movement can be varied depending on the dimensions for a loose fit or a tight fit. Other embodiments may have the shaft fixed to jaw 3200. The ease of movement can be varied depending on the dimensions for a loose fit or a tight fit. Other embodiments may have the shaft fixed to jaw 3200. One or more subassemblies 4000 may be provided on one or both jaws of clamp 2000.

Figure 2:
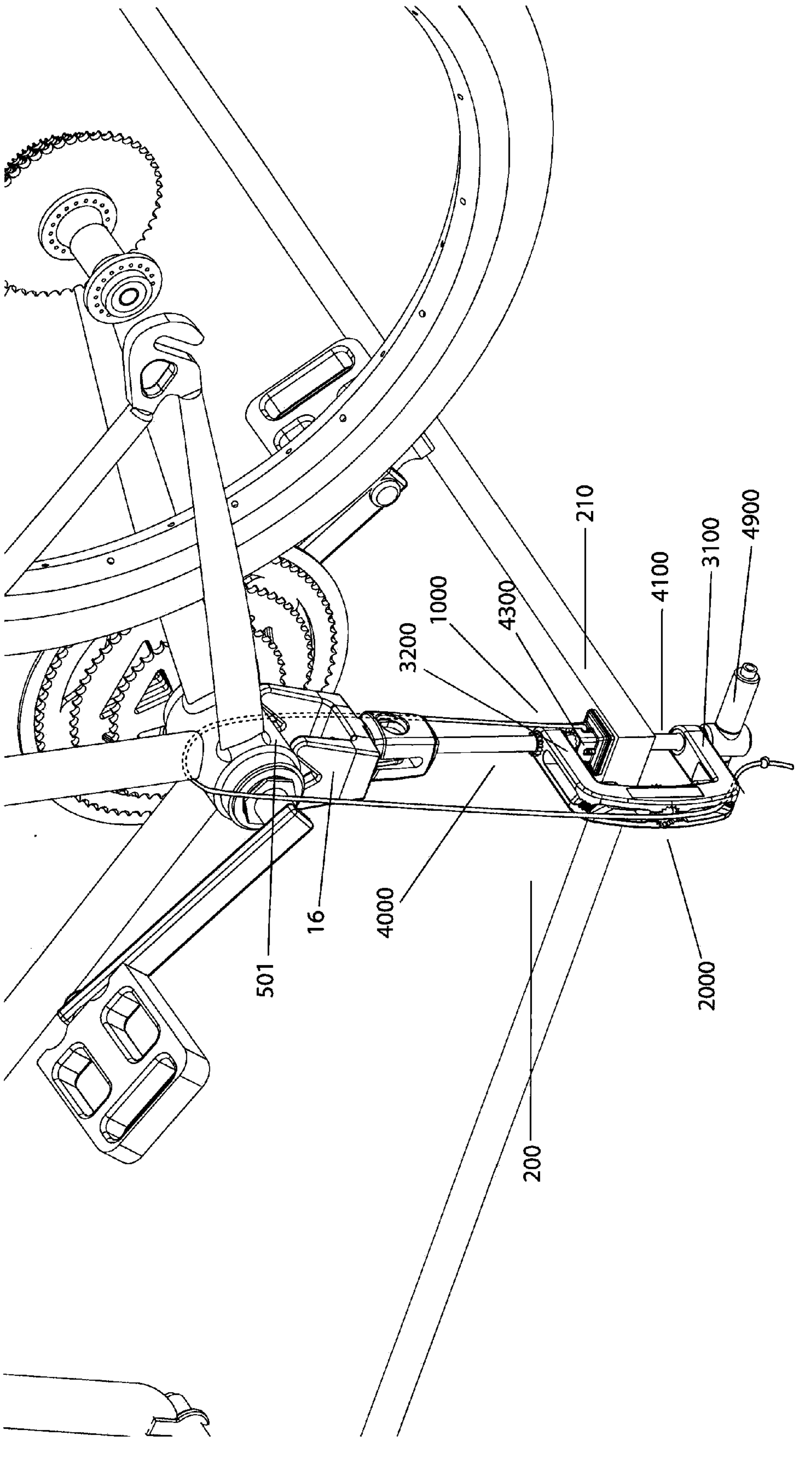
FIG. 2 is a perspective view showing the same clamp with integrated tensioning device, but with the device fastened to a table or workbench using an additional clamping screw subassembly with clamping handle.

As shown in FIG. 2, according to one embodiment, clamp with integrated tensioning device 1000 is fastened to work station 200 using second clamping screw subassembly 4100 and clamping handle 4900 allowing clamping screw subassembly 4000 including bicycle bottom bracket shell support 16 to be easily positioned to align with and accept bicycle bottom bracket 501 while lower clamping screw subassembly 4100 and clamping handle 4900 is used to fasten the clamp and tensioning device 1000 to work station 200. Second subassembly 4100 has a shaft portion which is fed through the aperture. The shaft and opening are dimensioned so that the shaft can be moved relative to the jaw; the shaft is threaded (not shown) and the opening of jaw is also threaded (not shown). As such, second subassembly 4100 can be rotated about its jaw to move its plate between the two jaws of clamp 2000.

As best shown in FIGS. 11, 13, 18 and 20, frame 3000 has two elongated L-shaped cavities 3300 located on the exterior back surface of frame 3000. The cavity has a first wall, a bottom and a second wall, where the cavity is defined between the first and second walls and above the bottom. In other embodiments, a cavity may be formed from a slot (where the first wall joins the second wall and there is no separate "bottom"), depression, bowl, channel or other inward feature in frame 3000. An embodiment may provide a cavity that does not have edges providing distinctive walls, e.g. for a cavity having a profile of a half-cylinder. For such a cavity, the first and second walls are considered to be sections of the half cylinder that face each other, at least partially. For the purpose of convenience, and not limitation, where the term "cavity" is used herein, it will be understood that any inward features described herein may be provided in place of the described cavity unless otherwise noted.

Cleat 3400 may located on the sides of cavities 3300. Cleat 3400 may be located in, at, near or about a corner of frame 3000, but also may be located on the middle portion of frame 3000. Cleat 3400 is provided to preferably grip and fix cord 5000; cleat 3400 in one embodiment has a generally V-shaped slot 3600 (when viewed in cross-section along the cavity 3300) that narrows as it progresses from the surface of frame 3000 towards an interior of frame 3000. When cleat 3400 is located at, near or about the corner of frame 3000, cord 5000 can wrap around the corner and the cleat 3400 provide additional tension on cord 5000 as it would be pulled further into the cavity 3300 by the tension provided as cord 5000 wraps around the corner of frame 3000. Cord 5000 may have one or more additional knot(s) 5200 that when inserted into cavity 3300 and abutted against cleat 3400 provide mechanical means to calibrate and pre-set cord tension when cord 5000 is pulled around or through and constricted against a workpiece or other object, the amount of tension dependent on where knot 5200 is tied along length of cord 5000.

The sides of slot 3600 may have one or more ridges or features thereon extending inwardly towards the center line of frame 3000. The center line, in this regard is the axial center line running down the middle of the middle portion of frame 3000 and through the middle of each of jaws 3100 and 3200. Longitudinal ridges or features may also be provided. The narrowing assists with holding cord 5000 within cavity 3300. It will be appreciated that for an embodiment, a feature is provided that extends from one or more surfaces of frame 3000 having dimensions and shapes to hold cord 5000 against frame 3000. The feature is a (first) protrusion and may be a cleat (as described above), nodule, extension, bump, wall, post, rail, hook, bar, eyelet, loop or any other feature that allows cord 5000 to be retained against frame 3000. One or more (first) protrusions can be provided in cavity 3300. The retention may be tight or loose and cord 5000 may be able to be paid in or out, along frame 3000. Friction fit interaction between the protrusion and cord 5000 may be provided by the shape and/or dimension of the protrusion to limit the movement of cord 5000. The protrusion may have a combination of the features noted above. For the purpose of convenience, and not limitation, where the term "cleat" or "first protrusion" is used herein, it will be understood that any protrusion or feature described herein may be provided in place of the described cleat or first protrusion unless otherwise noted. An exemplary cleat or first protrusion may be comprised of one or more walls and/or components as noted above.

At the top of cleat 3400, from one or both sides of cleat 3400, a second feature extends towards the center line of the spine of frame 3000 to impede removal of cord 5000 through the top of cleat 3400. In one embodiment the feature(s) are multiple teeth 3700 that extend towards the center line and are dimensioned to be able to catch and secure cord 5000 when located in slot 3600. As shown, there is one set of teeth 3700 on one side of frame 3000 and a second set of teeth 3700 on the opposite side of frame 3000. The two sets of teeth 3700 have a gap therebetween, which may be dimensioned (along at least a part of it) to allow cord 5000 to pass through, with at least some resistance. However, an alternative gap (or at least a part of it) may be dimensioned to not allow cord 5000 to pass through. The two sets of teeth 3700 are shown as being symmetric in size and shape. However, asymmetric sizes may be provided, where one set of teeth 3700 is larger than the other set. For example, one set of teeth 3700 may extend past the center line of cavity 3300. A recessed groove 3800 in the mid-portion of clamp frame 3000 between the L-shaped cavities 3300 guides cord 5000 when tensioned providing a mechanism to quickly and easily properly position cord 5000 so the multiple teeth 3700 of the V-shaped slot 3600 of cleat 3400 are able to catch and hold the cord 5000 securely. In other embodiments, one of the two cavities 3300 can be provided or a continuous cavity can be provided where upper and lower cavities 3300 are joined to form the continuous cavity. In embodiments, the teeth may be formed from a (second) protrusion, nodule, bump or any protruding feature extending towards the center line of frame 3000. For the purpose of convenience, and not limitation, where the term “teeth”, “tooth” or “second protrusion” is used herein, it will be understood that feature(s) described in this paragraph may be provided in place of the described “teeth”, “tooth” or “second protrusion” unless otherwise noted. The teeth or second protrusion may be comprised of one or more teeth and/or components as noted above. Further the teeth or second protrusion may be further provided in sets. In one example, two (or more) sets are provided for the second protrusion, where a first set of features (e.g. teeth) is located on one side of cavity 3300 and a second set of features (e.g. opposing teeth) is located on the other side of cavity 3300. Additional set(s) of teeth may be located within cavity 3300.

In addition to catching and holding cord 5000, in one embodiment the shape of slot 3600 and diagonal alignment of teeth 3700 relative to the horizontal orientation of lower jaw 3100 and upper jaw 3200 of frame 3000 structurally reinforce and strengthen each corner 3500 of clamp frame 3000. It will be appreciated that in other embodiments, other shapes, sizes, orientations and features can be provided for cleat 3400, groove 3800 and teeth 3700. For example in one embodiment, no tapering of the sides (as provided by slot 3600) may be provided or only one side may be tapered. The tapering may or may not be symmetrical, when both sides are tapered. Other features may be provided to provide interference of removal of cord 5000 from cavity 3300, such as one or more protrusions along one or both of the walls in cavity 3300. The protrusions may be offset from each other or they may align with each other. In another embodiment, one or more of the features may protrude from the outside surface of frame 3000. In one embodiment cleat 3400 is integrated into frame 3000. In other embodiments, cleat 3400 may be a separate feature that is snapped into, fastened, welded, and/or held via a friction fit in cavity 3300.

Figure 7:
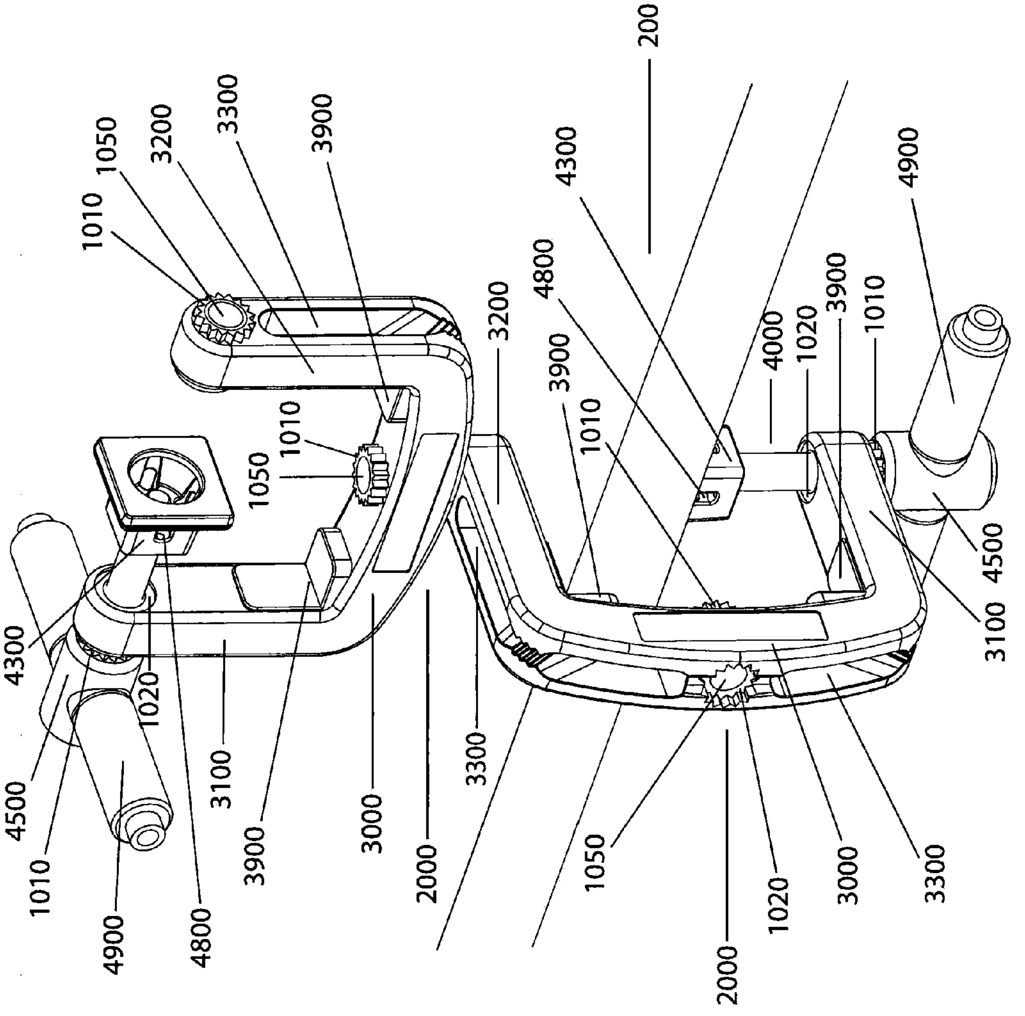
FIG. 7 is a perspective view of a clamp with integrated tensioning device fastened to a table or workbench interlocked with a second clamp frame.

As shown in FIG. 7, according to one embodiment, there is provided a clamp with integrated tensioning device 1000 where frame 3000 is arcuately curved convexly between the horizontally oriented lower and upper jaws 3100 and 3200 respectively. Frame 3000 has at each internal corner an L-shaped abutment 3900 integrally formed in frame 3000 and against which the top, or bottom and side surface of work station 200 may contact to prevent rotation of frame 3000 when clamped, if so desired.

Figure 5:
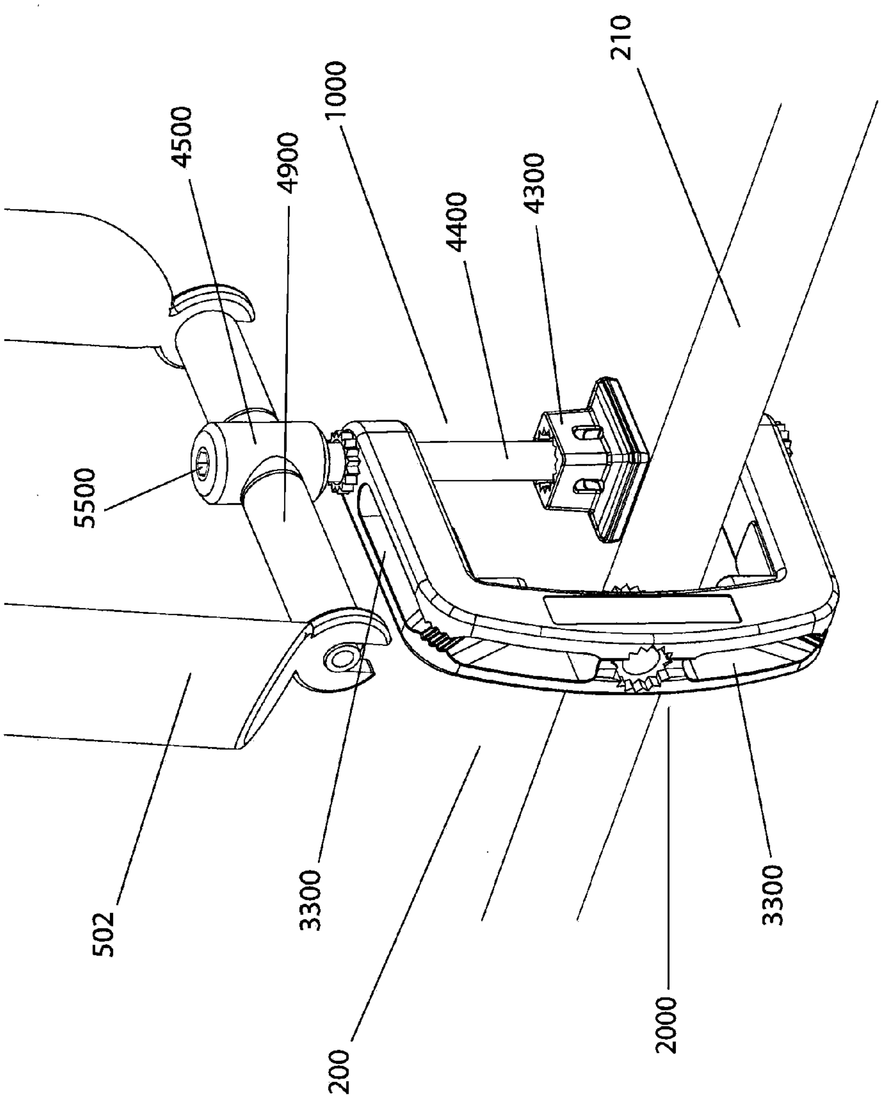
FIG. 5 is a perspective view of a clamp with integrated tensioning device fastened to a table or workbench with a clamping handle adapted to support a bicycle fork as a mounting bracket shown mounted transversely through the support head of the clamping screw subassembly for the purpose of supporting a bicycle for maintenance, adjustment or repair, in accordance with an embodiment of the disclosure.

Reference will now be had to FIG. 5, which shows a clamp with integrated tensioning device 1000 fastened to work station 200 with clamping handle 4900 mounted transversely through support head 4500 of clamping screw 4400 and secured with set screw 5500, clamping handle 4900 adapted to both actuate clamping screw 4400 and support bicycle fork 502 as a bicycle fork mounting bracket for the purpose of supporting a bicycle for maintenance, adjustment or repair, in accordance with an embodiment of the disclosure.

Details on a second aspect of an embodiment are provided. For this aspect, clamp 2000 is matable with one or more clamps 2000 via a set of mating features provided on clamps 2000 that are being fit together. The mating features may interact with each other to provide a positive locking attachment between the two clamps 2000.

It will be appreciated that for an embodiment, the second aspect may be provided that facilitates mating of two components together through a variety of first and second physically and dimensionally complementary features of the two components. For example, mating features can be provided on the first and second clamps 2000 and other components, such as plate 4300 to allow clamps, plates and other components to be connected together.

The mating feature has a first feature on one component and a second feature on another component. Using first clamp 2000 as an example, the first feature may be any protrusion extending from a surface of clamp 2000 and may be a male feature (as described below), nodule, bulge, extension, bump, wall, post, rail, hook, bar or any other feature that may protrude outwardly from frame 3000. Using a second clamp 2000 as an example, the second feature may be any complementary feature extending in the surface of the second clamp 2000 and may be a female feature (as described below), depression, rail, hook, groove, slot, channel or any other feature that may extend inwardly to frame 3000 to receive the first feature in whole or in part. For the purpose of convenience, and not limitation, for the mating features, where the term “male feature”, “first mating feature” or “third protrusion” is used herein, it will be understood that these terms capture any protrusion described for the male feature herein and may be provided in place of the described male feature unless otherwise noted. Also, where the term “female feature” or “second mating feature” is used herein, it will be understood that these terms capture any depression described for the female feature herein and may be provided in place of the described female feature unless otherwise noted.

For one embodiment for the second aspect, FIGS. 7, 8, 9, 17, 18 and 19 show two clamps 2000 having frames 3000 that may be joined to each other by exemplary mating feature(s). For the embodiment, the mating features are features 1010 and 1020, which are provided on the two clamps 2000 and clamp plate 4300. For an embodiment, a male feature 1010 of a first clamp 2000 protrudes from the surface of its frame 3000 and is shaped and dimensioned to mate with corresponding female feature 1020 having a complementary depression in frame 3000 of the second clamp 2000 to receive male feature 1010 in a friction fit manner. Clamp plate 4300 also has corresponding female feature 1020 to receive male feature 1010 in a friction fit manner. In other embodiments, clamp plate 4300 may have corresponding male feature 1010 to receive female feature 1020 in a friction fit manner.

As shown, first and second clamps 2000 have identical placements of male and female features 1010 and 1020. Using first clamp 2000 to describe the locations of the features, in the middle of the middle portion of frame 3000 a male feature 1010 is a hub that extends outwardly from the inner surface of the middle portion and on the direct opposite side on the middle portion, a female feature 1020 is a depression that extends inwardly into frame 3000. At about the distal ends of each of upper and lower jaws 3100 and 3200, male feature 1010 extends outwardly from the outer surface of the jaw away from the other jaw and on the direct opposite side on the jaw, a female feature 1020 is provided on the interior surface that extends inwardly into frame 3000 towards the other jaw. In other embodiments, the male and female feature locations may be reversed. For one embodiment, providing male/female features 1010 and 1020 in complementary locations and having the features symmetrically located along frame 3000, allows any two or more clamps to be mated together like a series of bricks, forming a ‘wall’. For example, when a first clamp 2000 is mated to a second identical clamp 2000, having an arrangement of male/female features as shown in FIG. 8, for example, the positioning of the first and second clamps 2000 can be interchanged.

Figure 8:
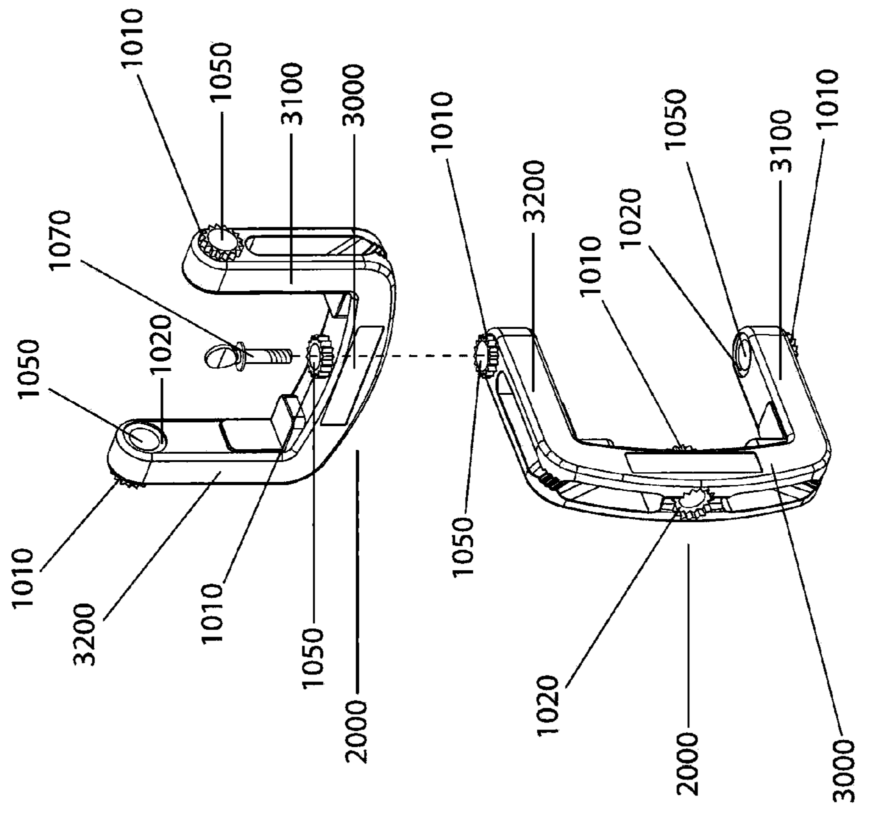
FIG. 8 is an exploded perspective view of two clamp frames, interlocking features and threaded thumb screw.

In other embodiments additional or less features may be provided than those shown in FIG. 8. In an embodiment the male features may be identically shaped and sized, but they can be different shapes and sizes. Also the female features may be identically shaped and sized, but they too can be different shapes and sizes. The male/female features 1010 and 1020 may or may not have complementary female/male features 1020 and 1010 located on an opposite side of frame 3000.

In one embodiment male feature 1010 on frame 3000 of the first clamp has physical features to facilitate orienting of the first clamp to the second clamp. In one embodiment, the physical feature is a set of teeth. One specific embodiment provides sixteen (16) evenly spaced teeth 1090 along the outer side of male feature 1010. Correspondingly, the female feature 1020 has sixteen (16) complementary evenly spaced teeth 1090 along its inner side. These inner and outer teeth are not the same as the teeth described for the second protrusion, noted earlier.

The outer and inner teeth facilitate clamps 2000 to be oriented in different set angles to each other, when male feature 1010 is inserted into female feature 1020, but in a locked orientation to each other. Having 16 spaced teeth provides 22.5 degree increments (360 degrees/16 teeth) for positioning clamps 2000 about each other.

Other numbers of teeth may be provided for the male and female features 1010 and 1020, for example, any number of teeth between two (2) and sixty (60) on the two features 1010 and 1020. It will be appreciated that other physical features instead of teeth may be employed to interlock two frames 3000 in at least two or more positions relative to each other. Different exemplary shapes for male feature 1010 and female feature 1020 include shapes having a perimeter of any of a triangle, square, pentagonal, hexagonal, star, etc. Two or more frames 3000 may be joined to each other at a variety of angles by mating male feature 1010 and female feature 1020. Male feature 1010 and corresponding female feature 1020 joining each frame may be reversed or interchanged. For the purpose of convenience, and not limitation, where the term "orientating feature" is used herein, it will be understood that any protrusion described herein may be provided in place of the described teeth in this paragraph and the preceding paragraph and the shapes described in this paragraph unless otherwise noted. As noted earlier clamping plate 4300 may have either the male or female feature 1010 or 1020 provided thereon to allow plate 4300 to mate with a complementary mating feature on clamp 2000, per FIGS. 9 and 17.

Each feature 1010 and 1020 may have aperture 1050 that may receive a locking mechanism, such as thumb screw 1070 to engage and lock the meshed male and female features together when thumb screw 1070 is turned into corresponding threads in aperture 1050. Aperture 1050 may or may not be threaded to engage with any threads on screw 1070. As shown in FIG. 8, the aperture in male/female features 1010 and 1020 in the middle portion of frame 3000 is not threaded, while the aperture in male/female features 1010 and 1020 in jaw 3200 of frame 3000 is threaded, as screw 1070 has a thread only on its lower portion or vice versa. It will be seen that screw 1070 assists in aligning and locking two clamps 2000 together when the male and female features are mated with each other.

Now, further details are provided on other aspects of an embodiment.

As best seen in FIGS. 9, 16, 17, 18 and 19, according to one embodiment, clamping plate 4300 may provide support for a workpiece when interlocked directly with frame 3000 by male feature 1010 mated and meshed with corresponding female feature 6000, which may be integrally formed in clamp plate 4300 of a complimenting selected shape in frame 3000 such that the shape of male feature 1010 is meshed and interlocked with the shape of female feature 6000 when frame 3000 and clamp plate 4300 are joined together.

Figure 9:
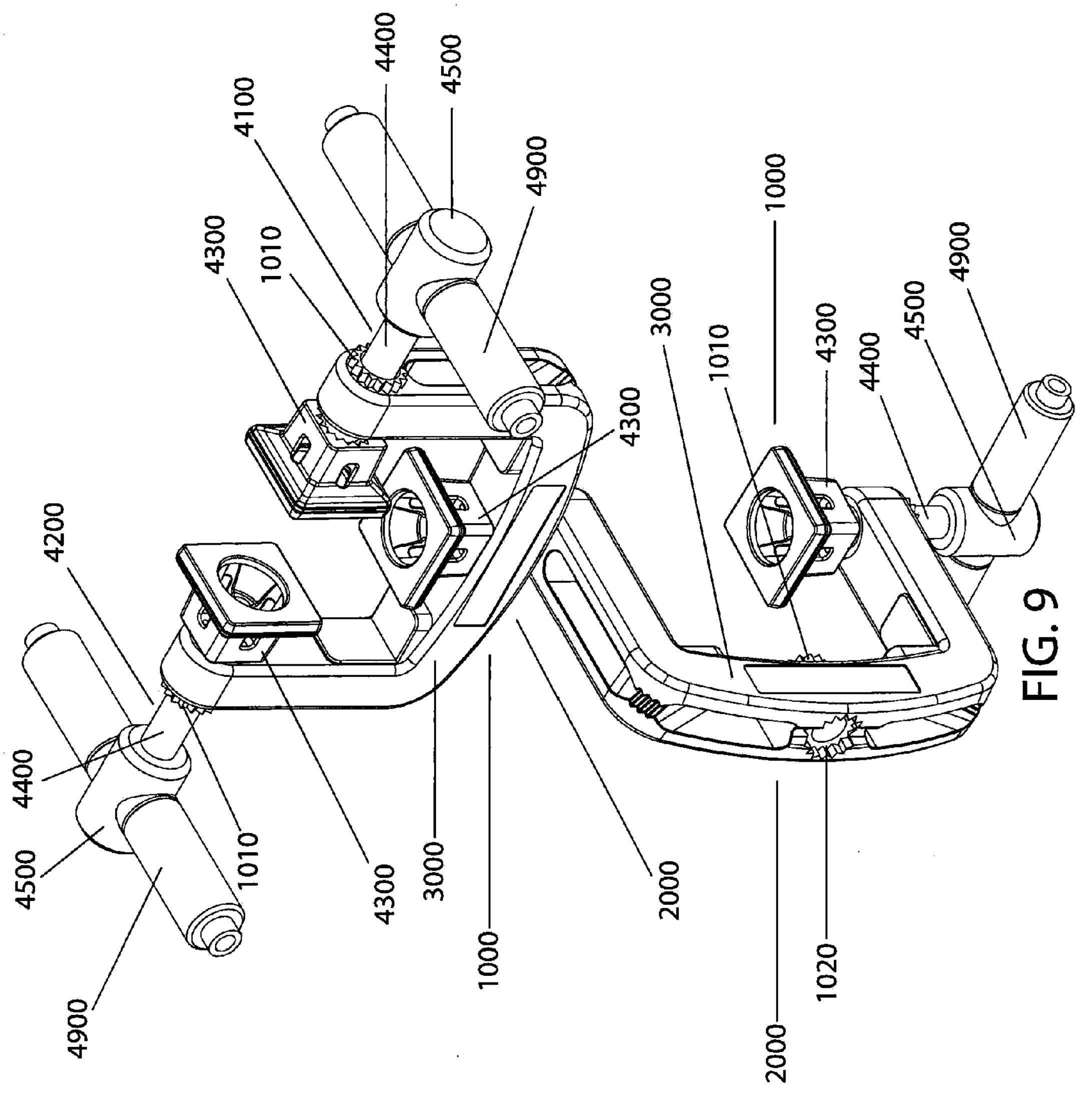
FIG. 9 is a perspective view of a clamp with integrated tensioning device interlocked with a second clamp with integrated tensioning device, one clamp shown having two opposing clamping screw subassemblies and a clamping plate interlocked with clamp frame.

As shown in FIG. 9, according to one embodiment, the clamp with integrated tensioning device 1000 is interlocked with a second clamp with integrated tensioning device 1000, one frame 3000 having two opposing clamping screw subassemblies 4100 and 4200 positioned to securely clamp a workpiece between clamping plates 4300, with additional clamping plate 4300 interlocked with a mating feature on the middle portion of frame 3000 to provide a convenient workpiece support.

Figure 11:
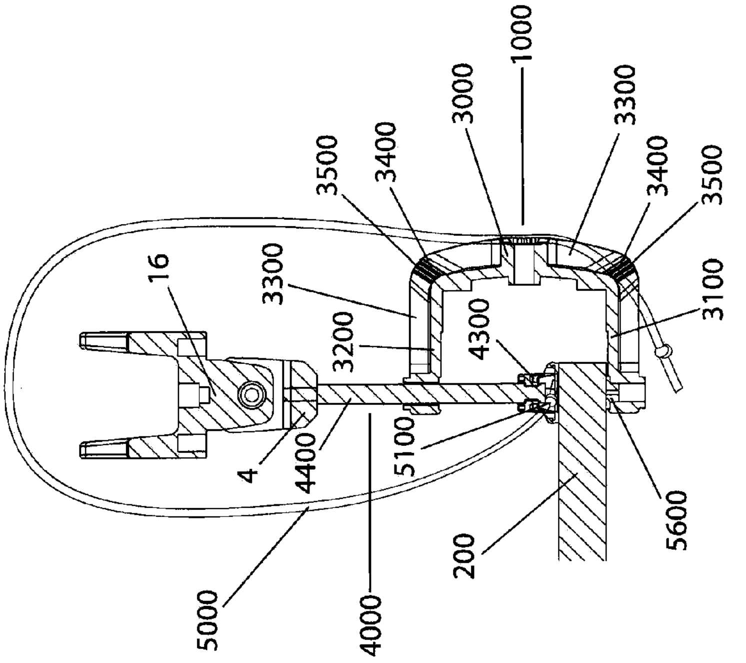
FIG. 11 is a section view of the clamp with integrated tensioning device and associated components fastened to a table or workbench on the line A-A of FIG. 10, in accordance with an embodiment of the disclosure.
Figure 10:
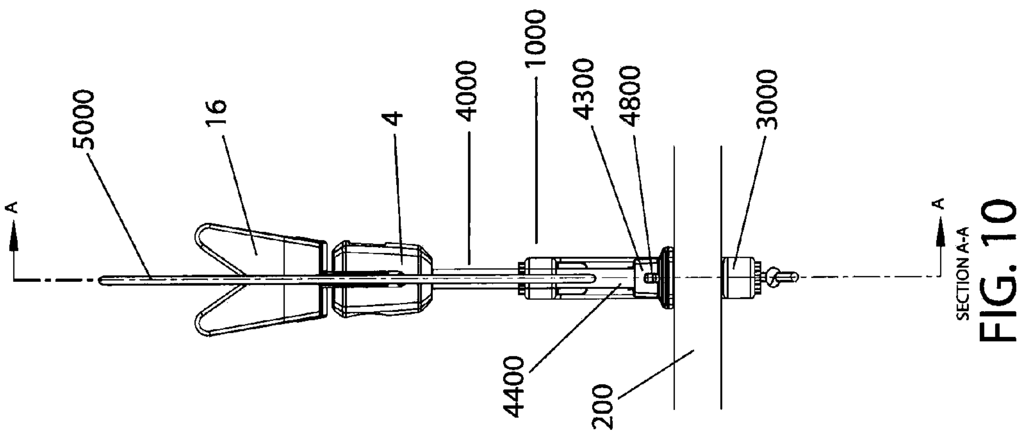
FIG. 10 is a front elevation view of a clamp with integrated tensioning device and associated components fastened to a table or workbench, in accordance with an embodiment of the disclosure.
Figure 13:
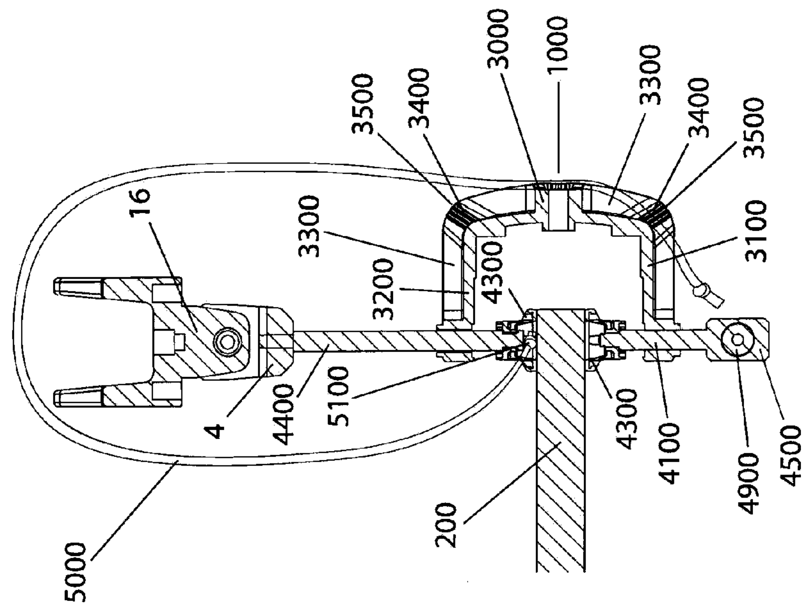
FIG. 13 is a section view of the clamp with integrated tensioning device and associated components fastened to a table or workbench on the line A-A of FIG. 12, in accordance with an embodiment of the disclosure.
Figure 12:
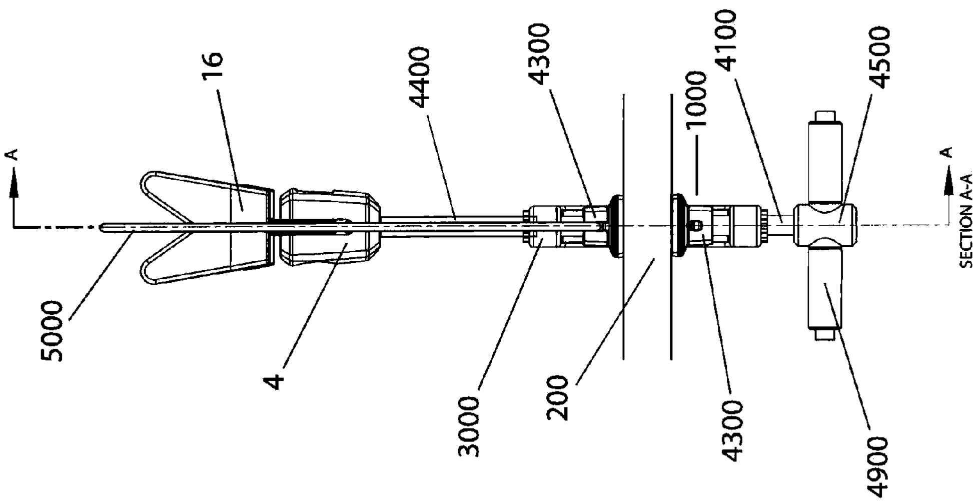
FIG. 12 is a front elevation view showing the same clamp with integrated tensioning device fastened to a table or workbench, but with an additional clamping screw subassembly and a clamping handle mounted to the clamp frame.

As shown in FIGS. 10 and 11, according to one embodiment, a clamp with integrated tensioning device 1000 is fastened to work station 200 in a generally upright position, and clamping screw subassembly 4000 is attached to frame 3000 in a generally upright and vertical orientation with clamping plate 4300 compressed against the top surface of work station 200, thereby securing knot 5100 tied at one end of cord 5000 and captured within clamping plate 4300 and then threaded through aperture 4800 in clamping plate 4300 so as to provide a simple and convenient anchor point from which to pull and tension cord 5000 around or through a workpiece and then fix cord 5000 in cleat 3400, which may be integrally formed as part of frame 3000 for the purpose of retaining the workpiece. When cord 5000 is provided as a shock cord, the upper "loop" of cord 5000 can be looped over a section of the workpiece. Flexible tension is provided in cord 5000 to assist in holding the workpiece to frame 3000.

Figure 15:
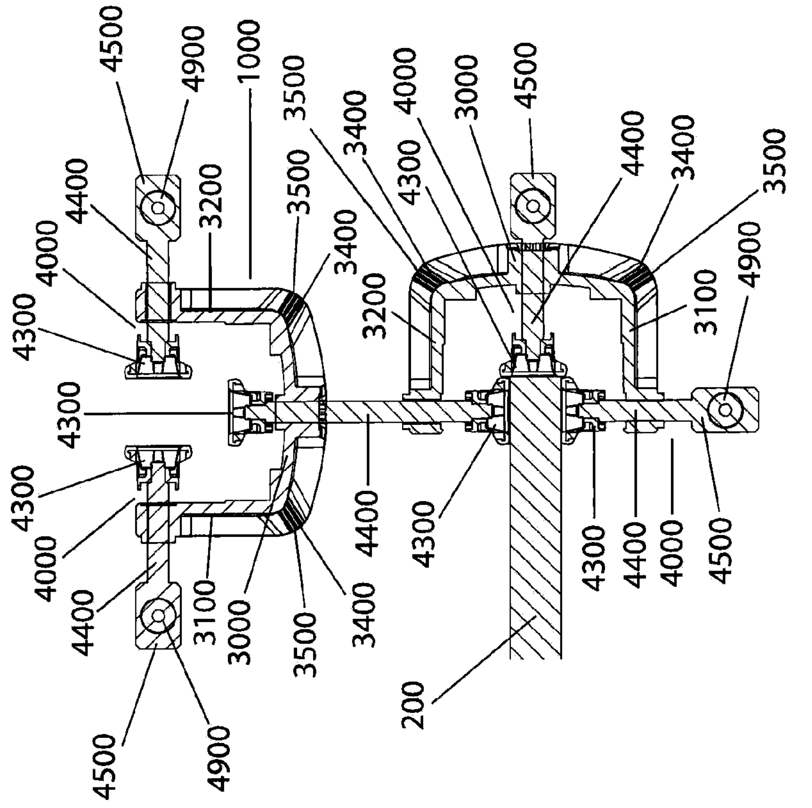
FIG. 15 is a section view of the clamp with integrated tensioning device and associated components fastened to a table or workbench on the line A-A of FIG. 14, in accordance with an embodiment of the disclosure.
Figure 14:
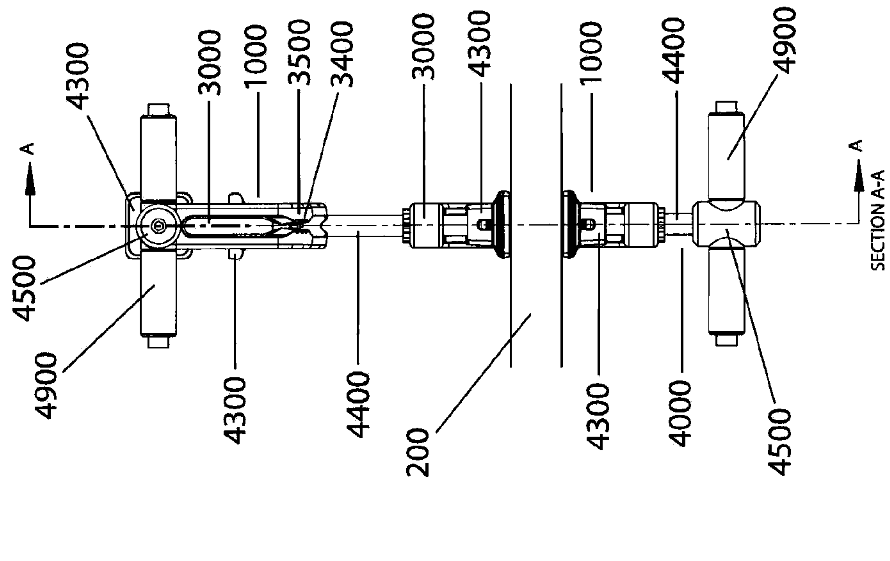
FIG. 14 is a front elevation view of a clamp with integrated tensioning device and associated components fastened to a table or workbench illustrating a three-way clamping arrangement, with a second clamp with integrated tensioning device rotatably mounted to one clamping screw so as to be height adjustable relative to the bench mounted clamp, in accordance with an embodiment of the disclosure.

As shown in FIGS. 14 and 15, according to one embodiment, a clamp with integrated tensioning device 1000 is fastened to work station 200 using two clamping screw subassemblies 4000 with third upper vertically oriented clamping screw 4400, second clamp and integrated tensioning device 1000 turned onto a threaded portion of clamping screw 4400 so as to be rotatably mounted and height-adjustable relative to the clamp and tensioning device 1000 mounted to work station 200, the rotatably mounted and height-adjustable frame 3000 illustrating a three-way clamping arrangement for securely clamping and supporting a workpiece.

Figure 21:
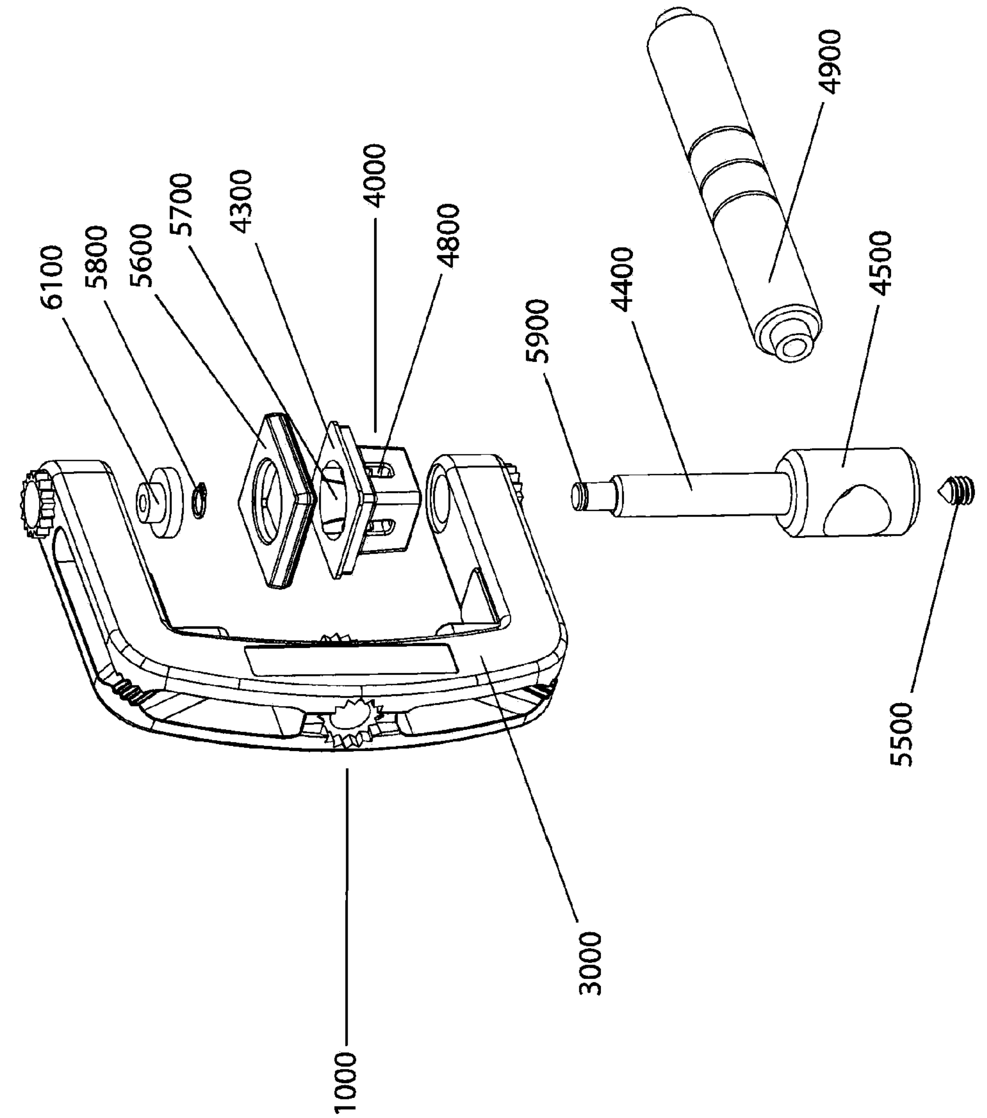
FIG. 21 is an exploded perspective view of the clamp with integrated tensioning device and associated components in accordance with an embodiment of the disclosure.

With reference to FIG. 21, there is shown in accordance with one embodiment constituent parts of a clamp with integrated tensioning device 1000 consisting of a C-shaped frame 3000, clamping screw subassembly 4000 comprising; clamping handle 4900, support head 4500 integrally formed on one end of clamping screw 4400, set screw 5500 for securing clamping handle 4900 when turned into a threaded aperture (not shown) in support head 4500 and compressed against clamping handle 4900, and clamping plate 4300. Clamping plate pad 5600, which may be made of a resilient rubber material, may be press fit or stretched over the upper surface of clamping plate 4300 to provide a non-slip bearing surface that will not mar or otherwise damage the surface of a stationary support when clamped. Clamping plate 4300 has a recess 5700 to contain the knotted portion of cord 5000 (not shown) and at least one aperture 4800 through which cord 5000 may be threaded, recess 5700 allowing easy access to open and install retaining ring 5800 in groove 5900 for the purpose of retaining clamping plate 4300 when retaining ring

5800 is installed on clamping screw 4400. Clamp pad 6100, which may be made of a resilient rubber material, provides for an embodiment a non-slip bearing surface that will not mar or otherwise damage the surface of a stationary support when threaded or press fit into aperture 1050 of the frame 3000.

Figure 17:
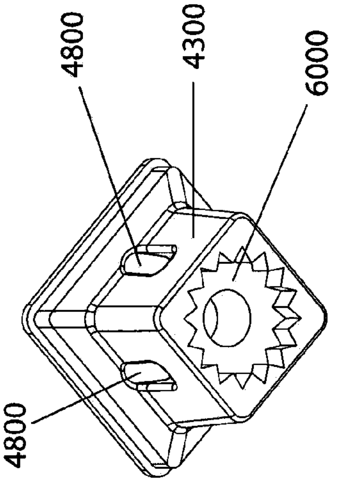
FIG. 17 is a perspective view of the clamping plate in accordance with an embodiment of the disclosure.
Figure 20:
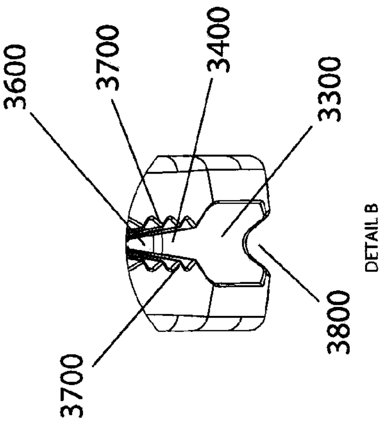
FIG. 20 is an enlarged partial view of the jamming cleat shown in DETAIL B of FIG. 18 in accordance with an embodiment of the disclosure.
Figure 18:
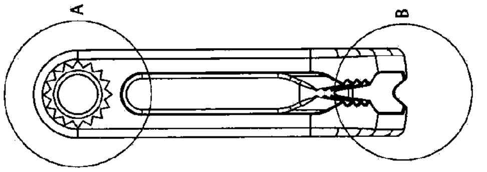
FIG. 18 is a top plan view of the clamp frame in accordance with an embodiment of the disclosure.
Figure 16:
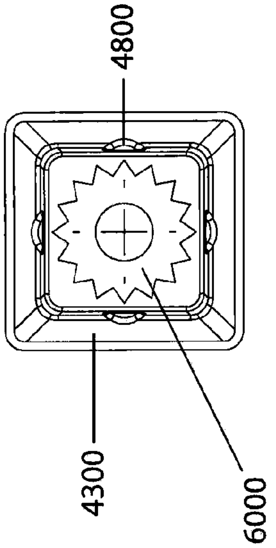
FIG. 16 is a bottom plan view of the clamping plate in accordance with an embodiment of the disclosure.
Figure 19:
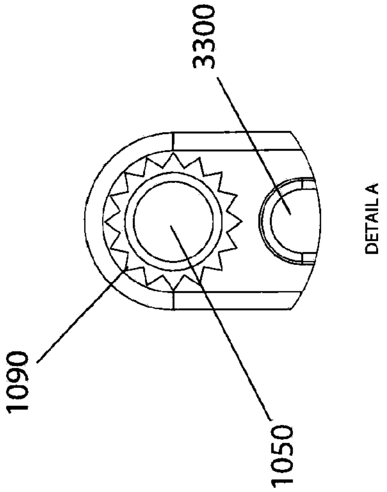
FIG. 19 is an enlarged partial view of the interlocking feature shown in DETAIL A of FIG. 18 in accordance with an embodiment of the disclosure.

As shown in FIGS. 1, 16 and 17, according to one embodiment, clamping plate 4300 is preferably a square shape, one or more sides of which may be readily aligned with the edge of tabletop 210 or other stationary support to consistently position the clamp in relation to stationary support, convenient particularly when two or more clamps with integrated tensioning devices 1000 are employed to hold portions of a workpiece where alignment of clamps 2000 relative to the side or corner of work station 200 is necessary.

Now further details of other aspects of an embodiment are provided.

Figure 22:
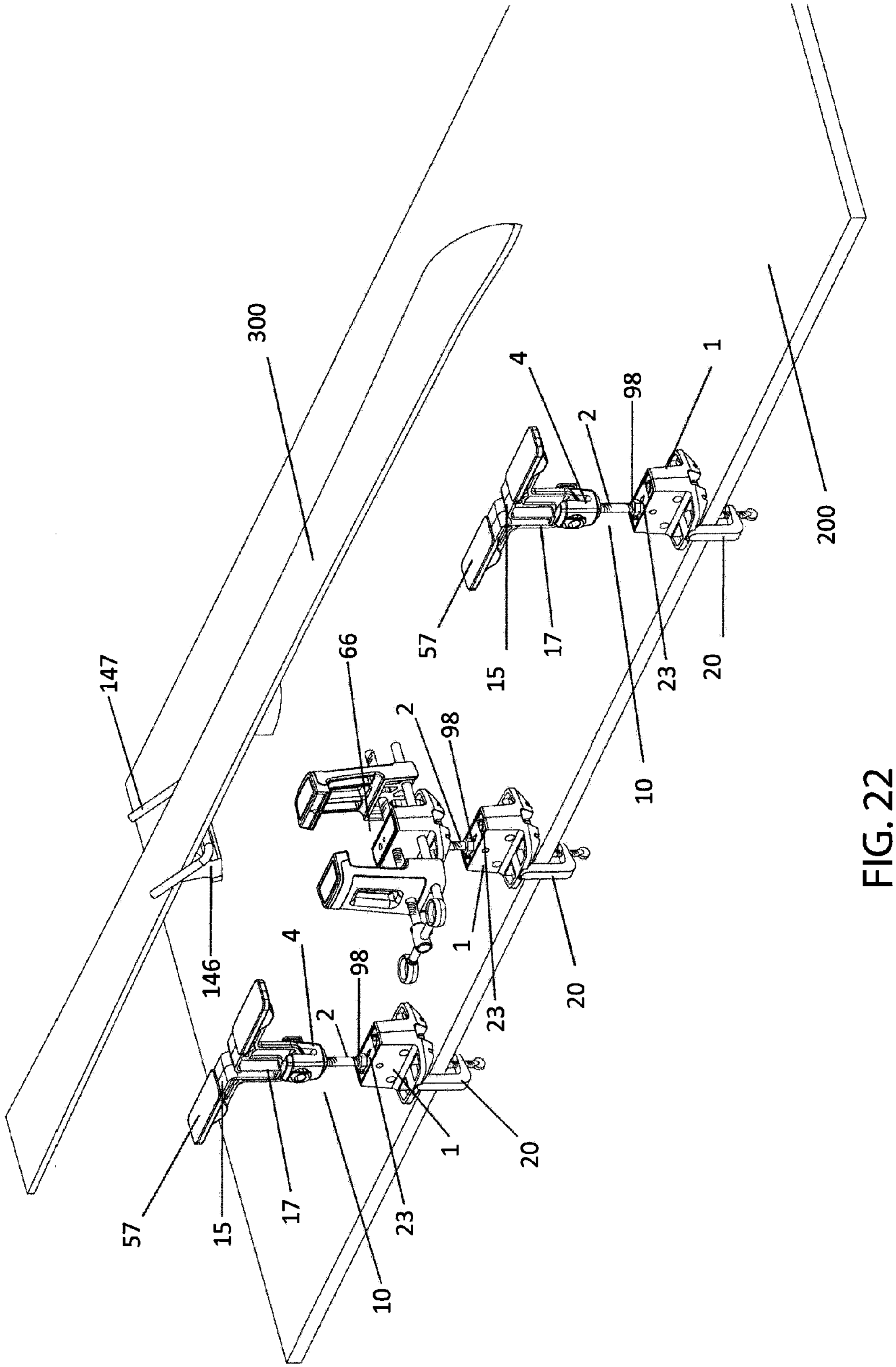
FIG. 22 is a perspective view illustrating a pair of holders with a third holder comprising a vise assembly between the pair of holders, each holder clamped to a table or work bench in spaced relation with a ski shown in a raised position above said holders, in accordance with an embodiment of the disclosure.

Referring to FIG. 22, which illustrates one embodiment, there is shown a pair of portable holders 10 for use in spaced relation with one another as a ski 300, snowboard 400, bicycle 500, gun 600, or pipe 700 support for maintenance operations being carried out at a work station 200.

Each holder 10 comprises a base section 1 adapted to be fixed to the work station 200 in a generally upright position. A threaded rod 2 is turned into threaded aperture 3 in base section 1 in order to mount threaded rod 2 to base section 1 in a generally vertical orientation. A support head 4 is mounted to the uppermost portion of the threaded rod 2. A variety of modular supports, platforms and brackets can be removably mounted to said support head including ski and snowboard support 15, bicycle fork mounting bracket 14, bicycle bottom bracket shell support 16 and gun barrel cradle 44. By virtue of the threaded rod 2 and support head 4 arrangement, the holders 10 can be readily converted to mount a very wide variety of sports equipment including skis 300, snowboards 400, bicycles 500 and guns 600. Further details of the holder configuration and construction will be described hereinafter. According to one embodiment, the rod 2 may be coupled to the base section 1 by friction fit, other suitable means, etc. According to one embodiment, the holders 10 may be mounted to the work station 200 by bolts, other suitable clamps, etc. It will be appreciated that in other embodiments, threaded rod 2 and threaded aperture in base section 1 may be replaced with a friction fit rod that has a clamping and/or locking mechanism that allows for the adjustment of height for brackets and/or the locking of brackets at a given position and/or orientation. Other height adjustment and/or locking mechanism may be used as known to a person of skill in the art.

Figure 26:
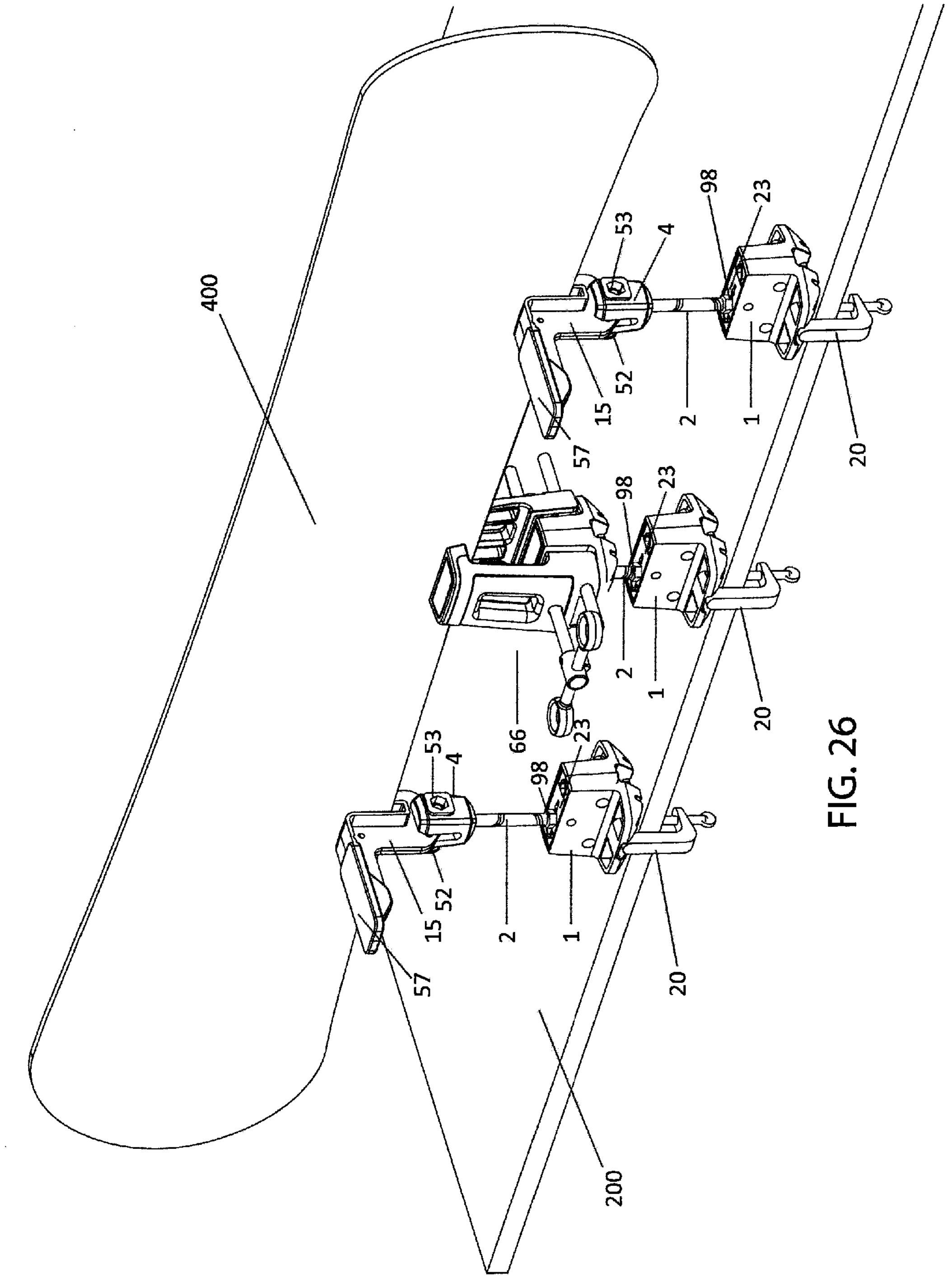
FIG. 26 is a perspective view showing the same holders clamped to a work bench but with the snowboard having been moved into a vertical orientation and held in the vertical slots of the holders for snowboard edge maintenance, in accordance with an embodiment of the disclosure.
Figure 27:
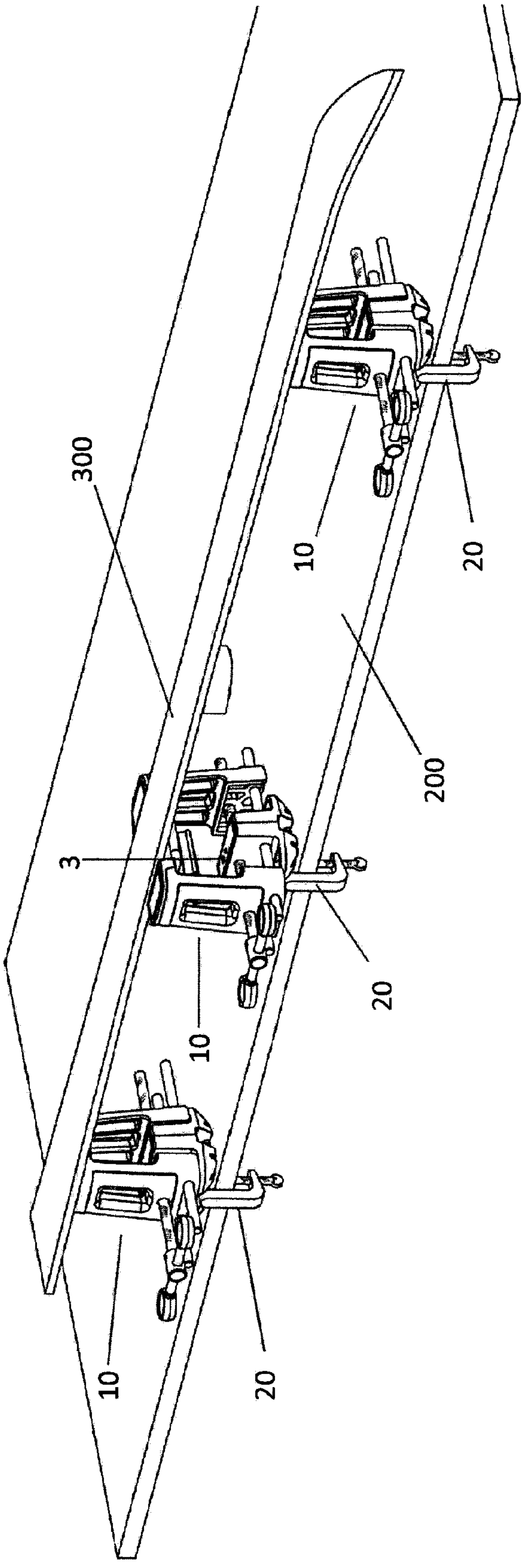
FIG. 27 is a perspective view showing three holders each comprising a vise assembly clamped to a table or work bench in spaced relation with a ski shown positioned upon the holders for ski base preparation/maintenance, in accordance with an embodiment of the disclosure.

As shown in FIG. 22, the holders 10 are mounted to a bench or work station 200 by means of C-clamps 20. As shown in FIG. 27, according to one embodiment, the base sections 1 of the holders 10 are provided with convenient apertures 21 extending above and parallel to the base bottoms thereby to receive the upper legs of the C-clamps 20 to permit convenient clamping to the work station or, as shown in FIG. 26, to permit convenient horizontal mounting and height adjustment of a vise assembly 66 on the threaded rod 2 by turning threaded rod 2 into corresponding threads (not shown) in apertures 21.

As shown in FIGS. 1-7 and FIGS. 9-15, in one alternative embodiment the C-clamp 20 and base section 1 may be interchanged with clamp 2000 including C-shaped frame 3000 and clamping screw subassembly 4000 and/or 4100 to provide a simplified, integrated base/clamp arrangement and vice versa. Features for frame 3000 described above may be incorporated in clamp 20 and vice versa.

Figure 39:
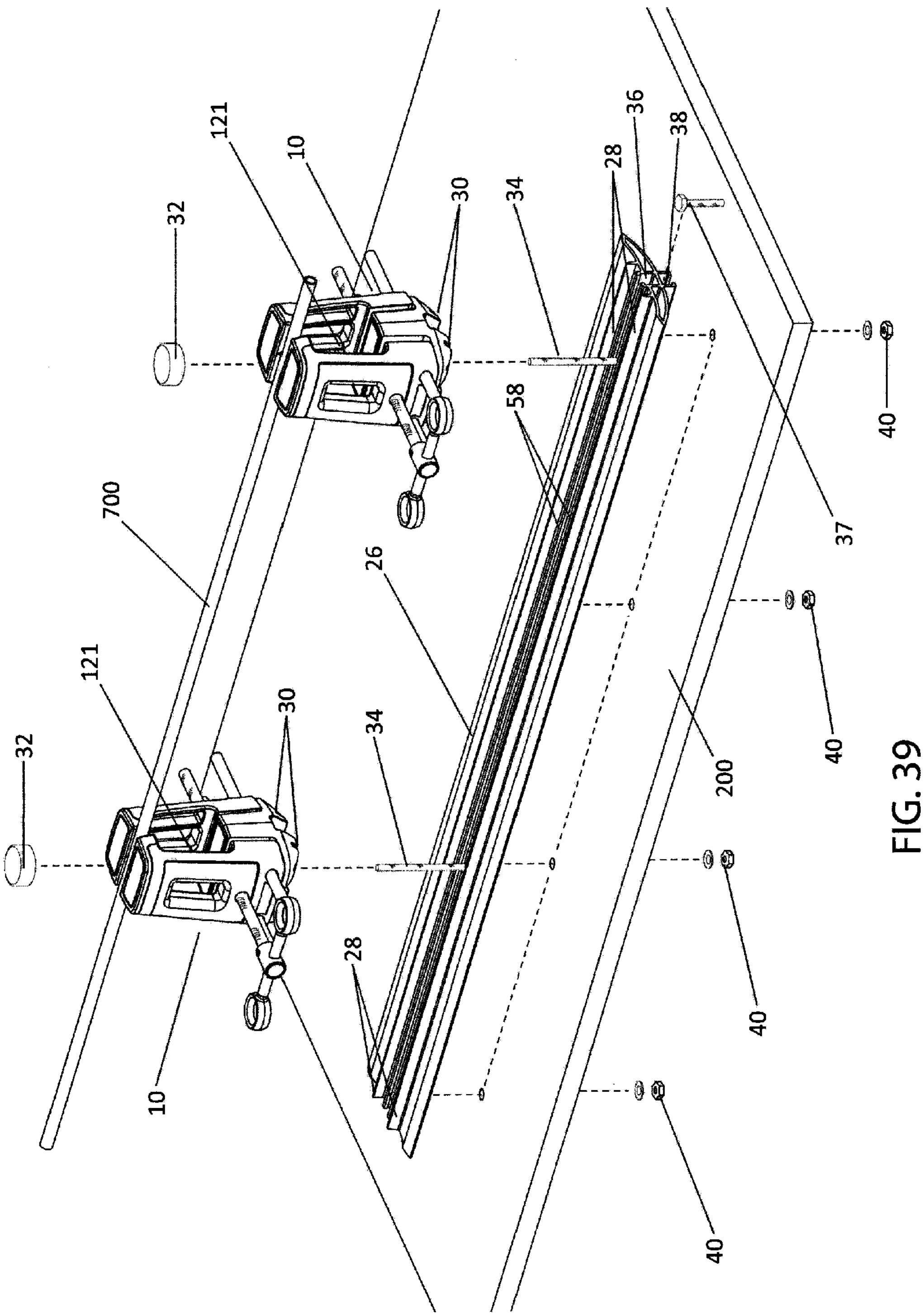
FIG. 39 is a perspective view showing the holders in positions ready to be secured to an optional support rail, which support rail is adapted to be fixed to a work bench or table, in accordance with an embodiment of the disclosure.
Figure 40:
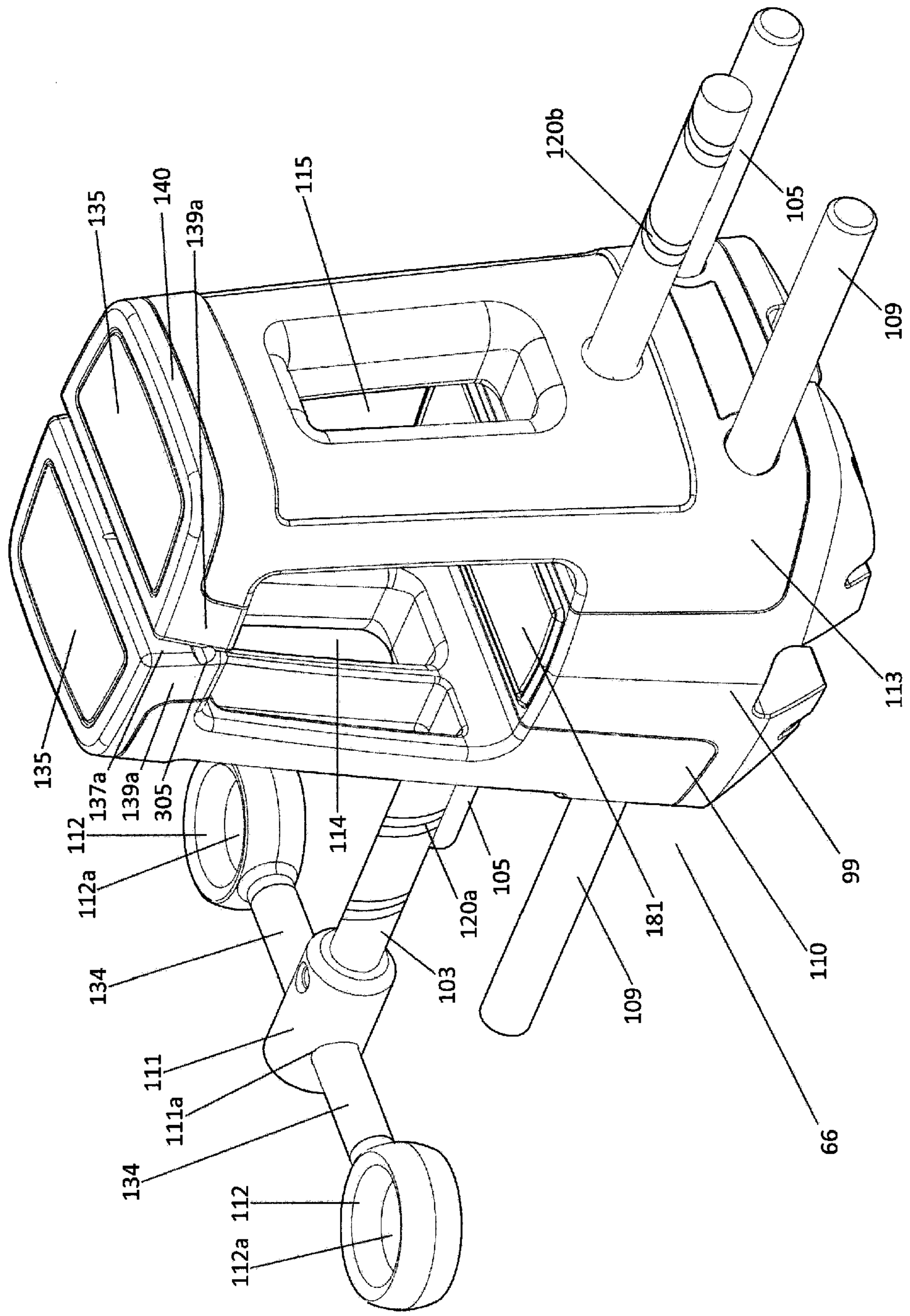
FIG. 40 is a perspective view illustrating the vise assembly of the holder, in accordance with an embodiment of the disclosure.

As shown in FIG. 39, according to one embodiment, the holders 10 are mounted to an elongated support rail 26 having a multiplicity of ribs 28 on is upper surface which interface with spaced grooves 30 provided in the bottom of the holder base sections 1 thereby preventing unwanted rotation of the holders 10 about their vertical axes. Mounting knobs 32 cooperate with headed adjustment screws 34 located within the upper center dove-tail groove 36 of the support rail 26 thereby to enable the holders 10 to be slid toward and away from one another and then tightened at the desired distance from each other thereby to accommodate the length of the ski 300, snowboard 400, bicycle 500, firearm 600 or pipe 700 to be worked on. According to one alternative embodiment (not shown), the threaded rod 2 of the holders 10 may also be mounted directly to the support rail 26 by turning the threaded rod 2 into a nut located within the center dove-tail groove 36 of the support rail 26, then tightening a second nut threaded onto the threaded rod 2 against the inner top surface 58 of the support rail 26. The support rail 26 is, in turn, affixed to the table 200 by means of suitable fasteners including headed adjustment screws 37 located within the lower center dove-tail groove 38 of the support rail 26 and nuts 40 located under the tabletop or work station 200.

Figure 44:
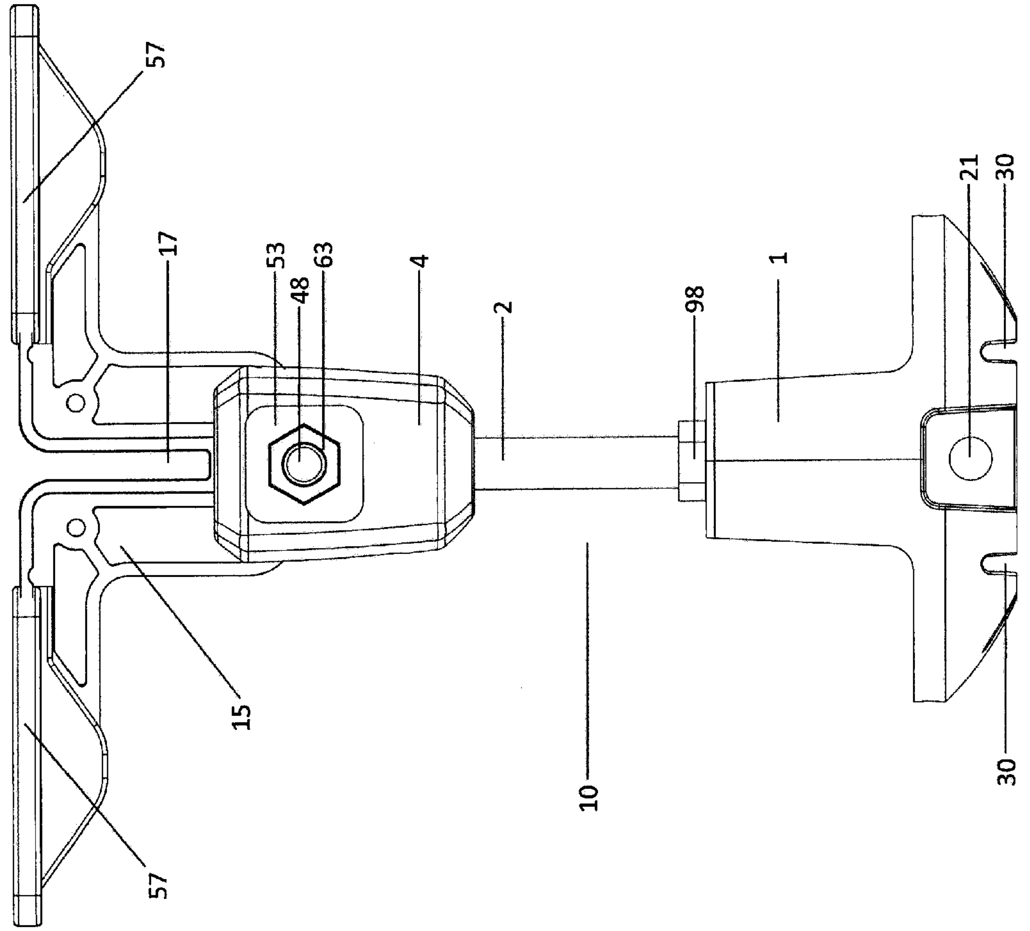
FIG. 44 is a front elevation view of a holder in accordance with the disclosure with a ski and snowboard support being shown mounted to the support head of the holder in the horizontal position, in accordance with an embodiment of the disclosure.
Figure 45:
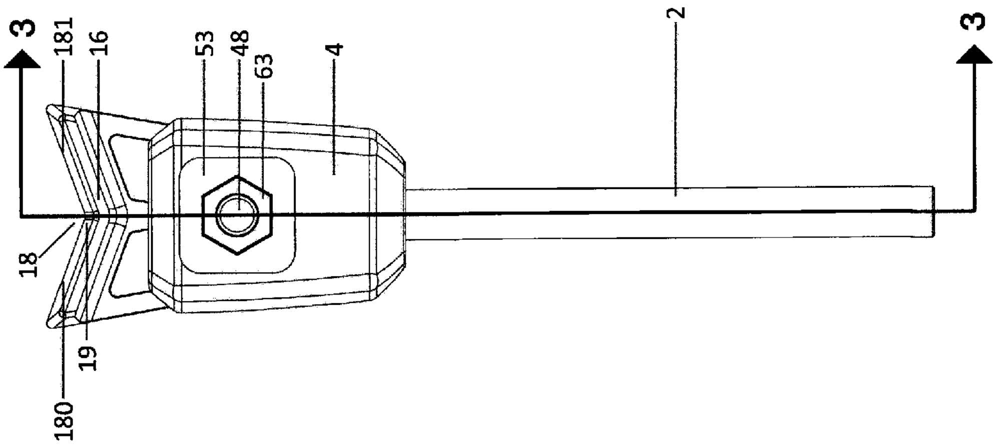
FIG. 45 is a front elevation view in accordance with the disclosure with a bicycle bottom bracket shell support being shown mounted to the support head of the holder in the horizontal position, in accordance with an embodiment of the disclosure.
Figure 48:
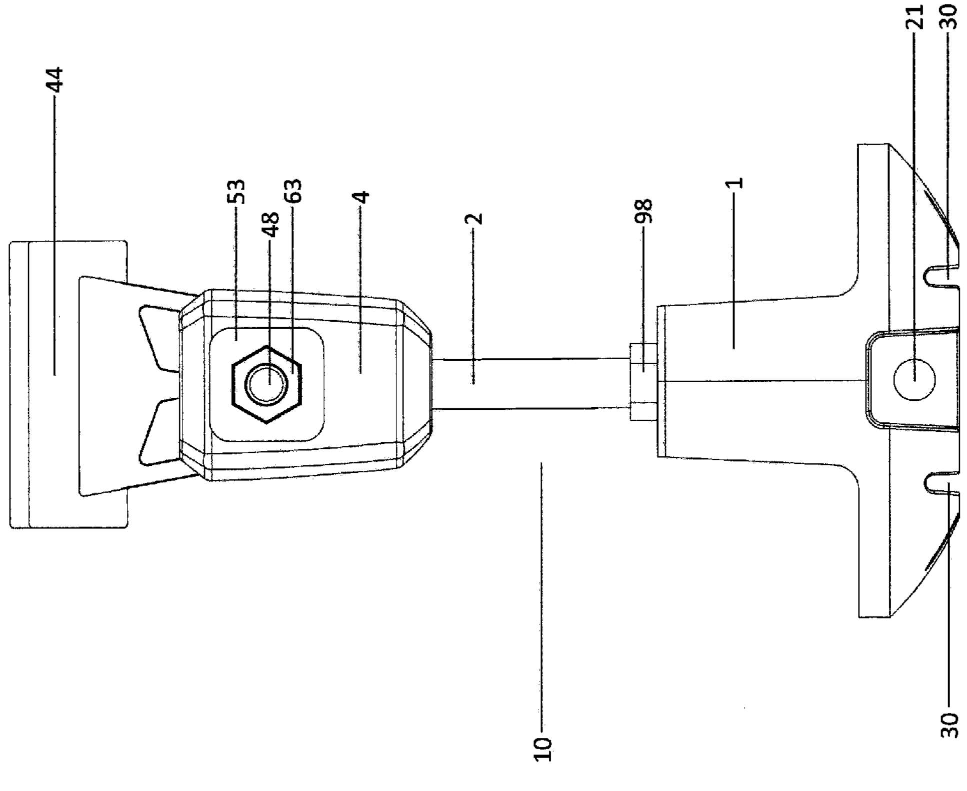
FIG. 48 is a side elevation view of a holder in accordance with the disclosure with a gun barrel cradle being shown mounted to the support head of the holder in the horizontal position, in accordance with an embodiment of the disclosure.
Figure 50:
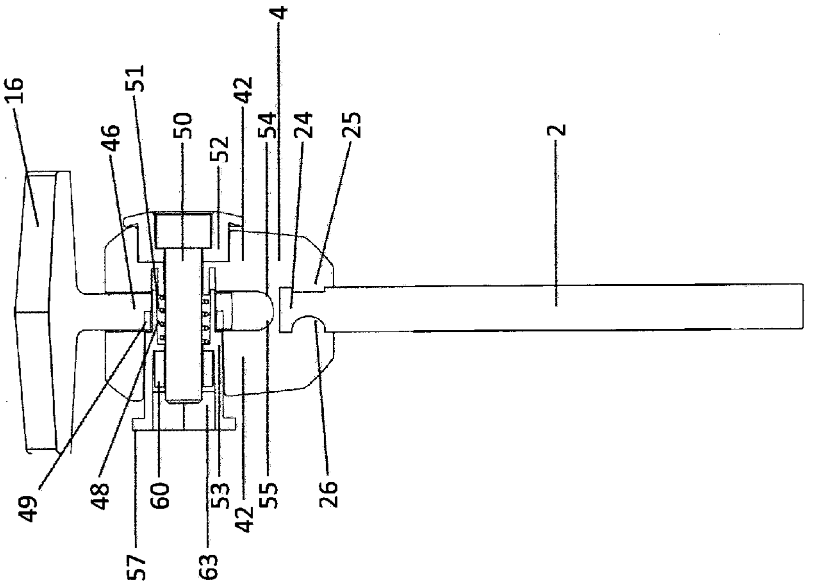
FIG. 50 is a section view on the line 3-3 of FIG. 45 showing the block/pull assembly in the support head of the holder in the unlocked position, allowing the support to pivot on the round axle portion of the locking block, in accordance with an embodiment of the disclosure.
Figure 49:
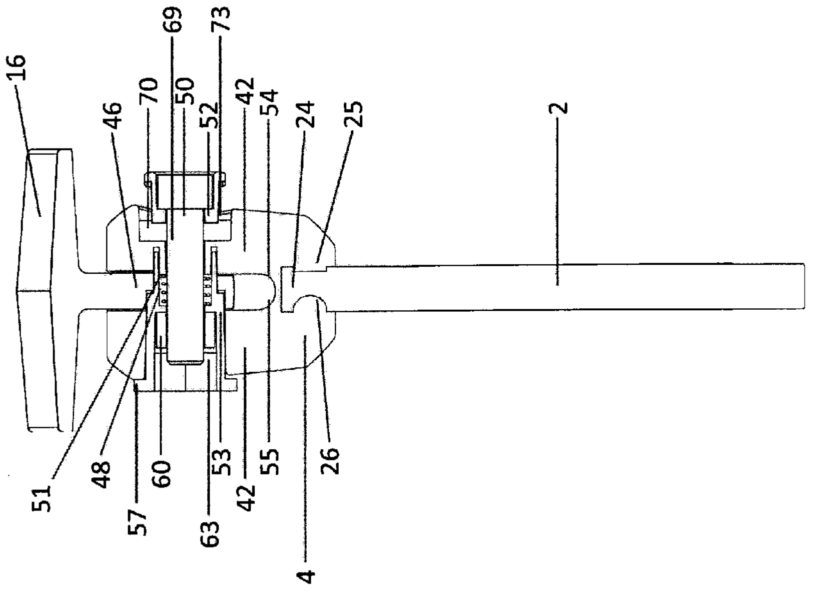
FIG. 49 is a section view on the line 3-3 of FIG. 45 showing a locking block/pull assembly in the support head of the holder in the locked position, locking the support and compressing both flanges of the holder support head against the tongue of the support in the horizontal position, in accordance with an embodiment of the disclosure.
Figure 51:
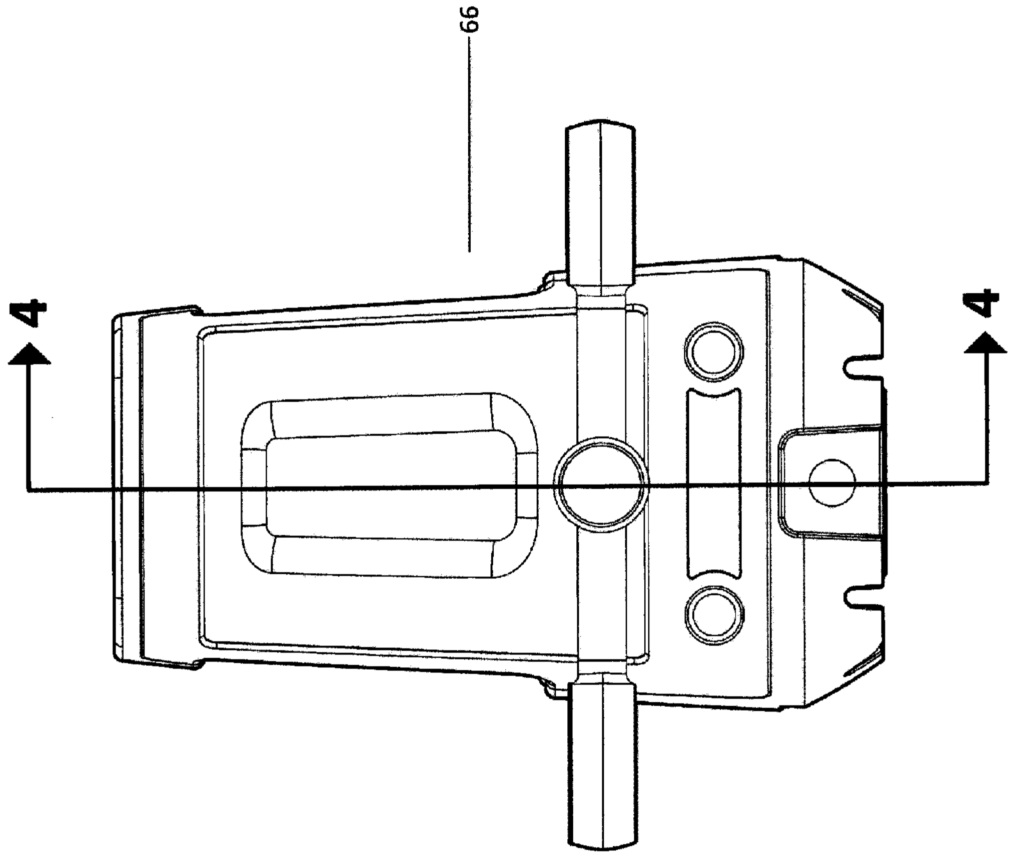
FIG. 51 is a front elevation view of the vise assembly of the holder in accordance with the disclosure, in accordance with an embodiment of the disclosure.

Reference will now be had to FIGS. 44, 45 and 48, which show a ski and snowboard support 15, bicycle bottom bracket shell support 16, and gun barrel cradle 44 mounted to the support head 4 of the holder 10, according to one embodiment. The support head 4 itself is preferably made from a sturdy plastics material which may or may not be reinforced with glass fibers to provide the necessary strength and rigidity. According to one embodiment, the support head 4 may be made from metal, other suitable materials, etc. A vise base 99 including a perpendicular threaded aperture 101 allows the threaded rod 2 to be turned into threaded aperture 3 (not shown) of the base section 1 to permit both mounting of the support head 4 to the base section 1 of the holder 10 and convenient height adjustment of the support head 4 relative to base section 1. According to one embodiment, the threaded rod 2 of the holder 10 is made of steel or stainless steel with threads of the ACME variety. According to one embodiment, the threaded rod 2 may be made from metal, other suitable materials etc. and may include another suitable thread pattern. As shown in FIGS. 49 and 50, according to one embodiment, the support head 4 is preferably molded or cast on the end portion 24 of threaded rod 2, with said end portion 24 having a recessed groove 25 and a partial round shape 26 milled into one side of threaded rod 2 providing mechanical means to prevent support head 4 from rotating or otherwise becoming detached from threaded rod 2.

Figure 55:
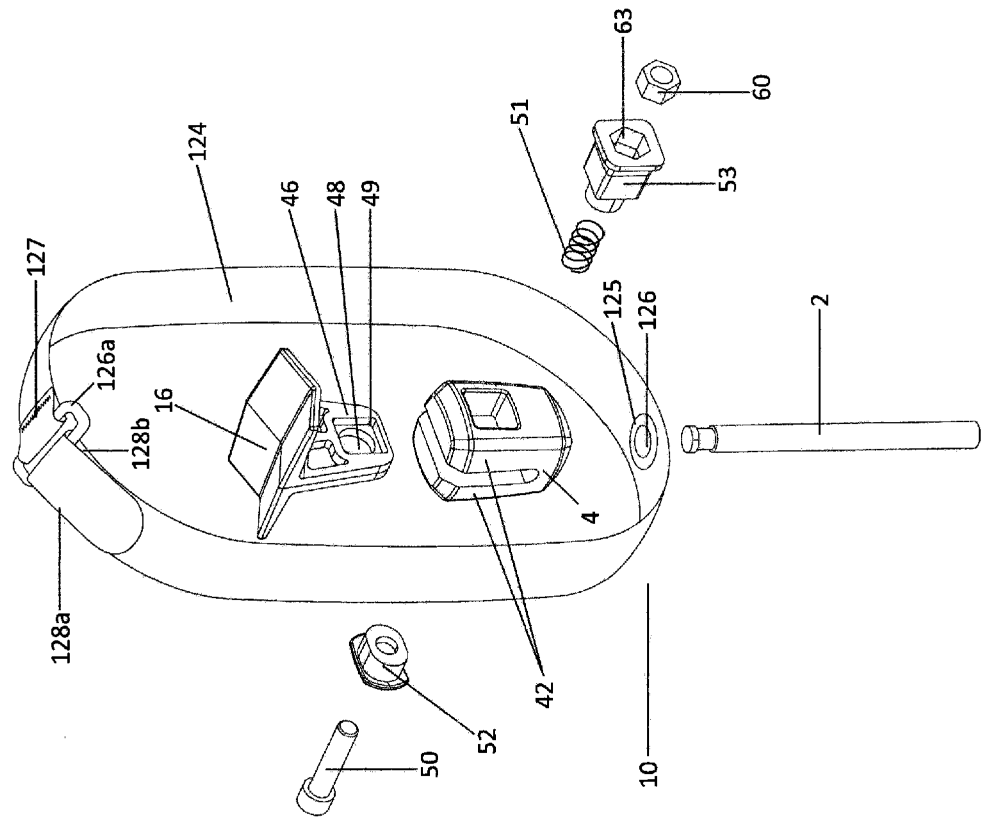
FIG. 55 is an exploded perspective view of the support head of a holder and associated components in accordance with an embodiment of the disclosure.

As shown in FIGS. 49-50 and 55, according to one embodiment, approximately the upper two thirds or so of the support head 4 include a spaced apart generally parallel pair of wide but relatively thin flanges 42. The previously mentioned ski and snowboard support 15, bicycle bottom bracket shell support 16, and gun barrel cradle 44 each have affixed a support tongue 46 sized so as to fit between the two flanges 42 noted above of the support head 4. The lower corners of the support tongue 46 are arcuately curved at 54 and 55. Each support tongue 46 has an aperture 48 in it, with a recess 49 surrounding aperture 48 and through which aperture 48 passes an adjustment socket head screw 50, which screw passes through the two flanges 42 of support head 4, through coil spring 51, through a locking block 53, and into a pull 52 behind which is the spring-biased locking block 53. Locking block 53 is non-rotatably and slidably mounted for movement in rear flange 42 (on the left in FIGS. 28-29) and is shaped to compliment the shape of aperture 48 and recess 49. It will be appreciated that other mechanical arrangements including a wide variety of shape variants of locking block 53 and complementing recess 49 including for instance square, hex, star, etc., may be employed to lock support tongue 46 in a plurality of positions when support tongue 46 is pivoted within support head 4 between positions where said support tongue is in a generally horizontal orientation to a position where said support tongue is generally vertical. It will be appreciated that the degree to which the locking block complements the recess may vary in different embodiments. Socket head screw 50 is tightened when turned through nut 60 captivated in slot 63 of locking block 53 to move locking block 53 inwardly to lock the support in position, or loosened to allow locking block 53 to be pushed outwardly by the spring 51 to move it clear of the recess 49 in tongue 46 allowing for pivotal movement of the support about the horizontal axis of support head 4. The frontal flange 42 (on the right on FIGS. 28-29) includes an aperture 69 and recess 70 permitting the pull 52 to be rotatably and slidably mounted to support head 4 by socket head screw 50 for movement from a position where pull 52 is inserted in recess 70 allowing locking block 53 to be pushed outwardly by the spring 51 to move it clear of the recess 49 in tongue 46 to a position where pull 52 is pulled out and clear of recess 70 then turned 90 degrees and seated in stepped indents 73 to move locking block 53 inwardly to lock the support in position. Locking block 53 has an integrated projecting rim 57 that comes in contact with the outside surface of rear flange 42 when said locking block 53 is moved inwardly and acts to compress both flanges 42 against the support tongue 46 when pull 52 is inserted in recess 70 or seated in stepped indents 73 and the adjustment socket head screw 50 is turned to clamp and secure the support (e.g., support 16).

Figure 23:
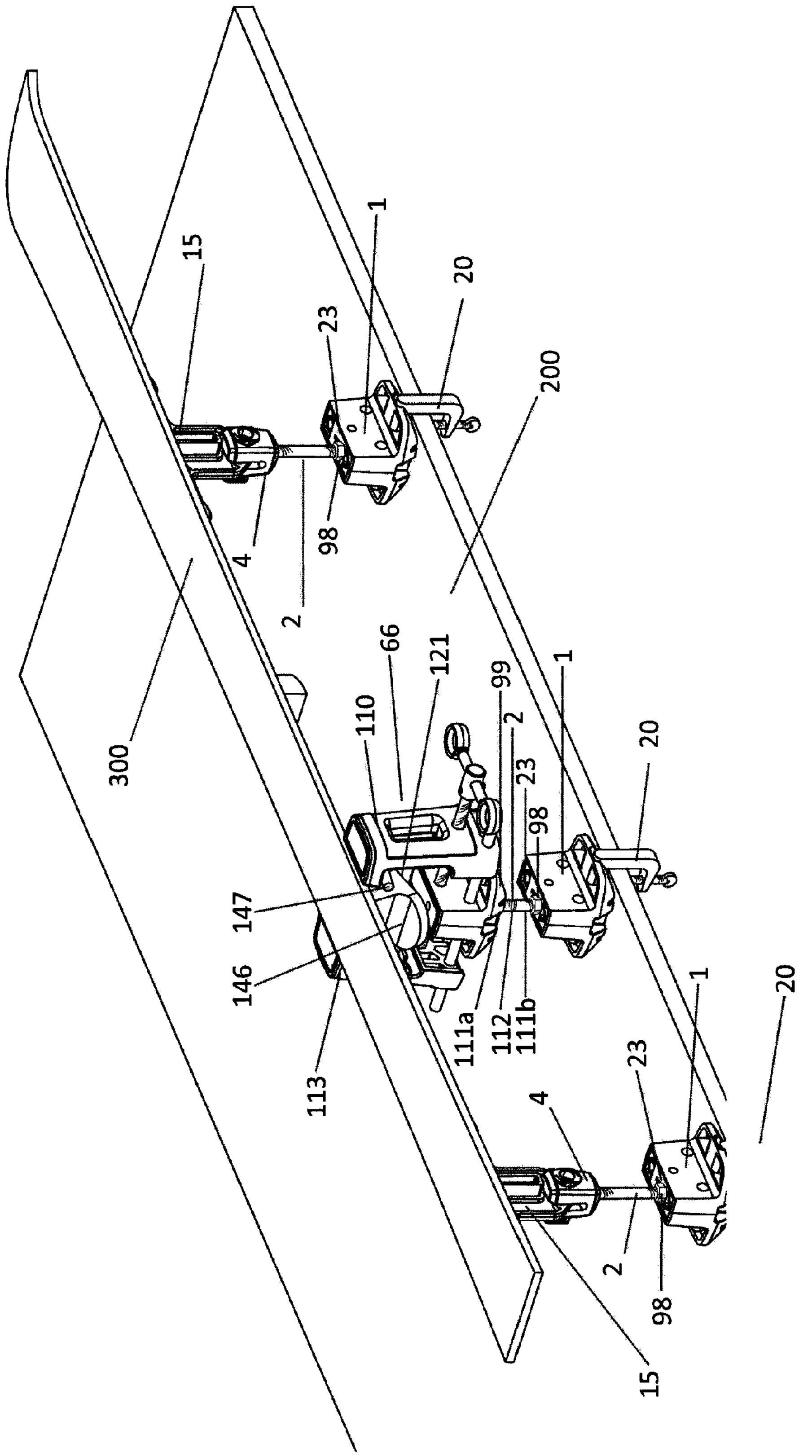
FIG. 23 is a perspective view showing the ski positioned upon the holders for ski base preparation/maintenance, in accordance with an embodiment of the disclosure.
Figure 24:
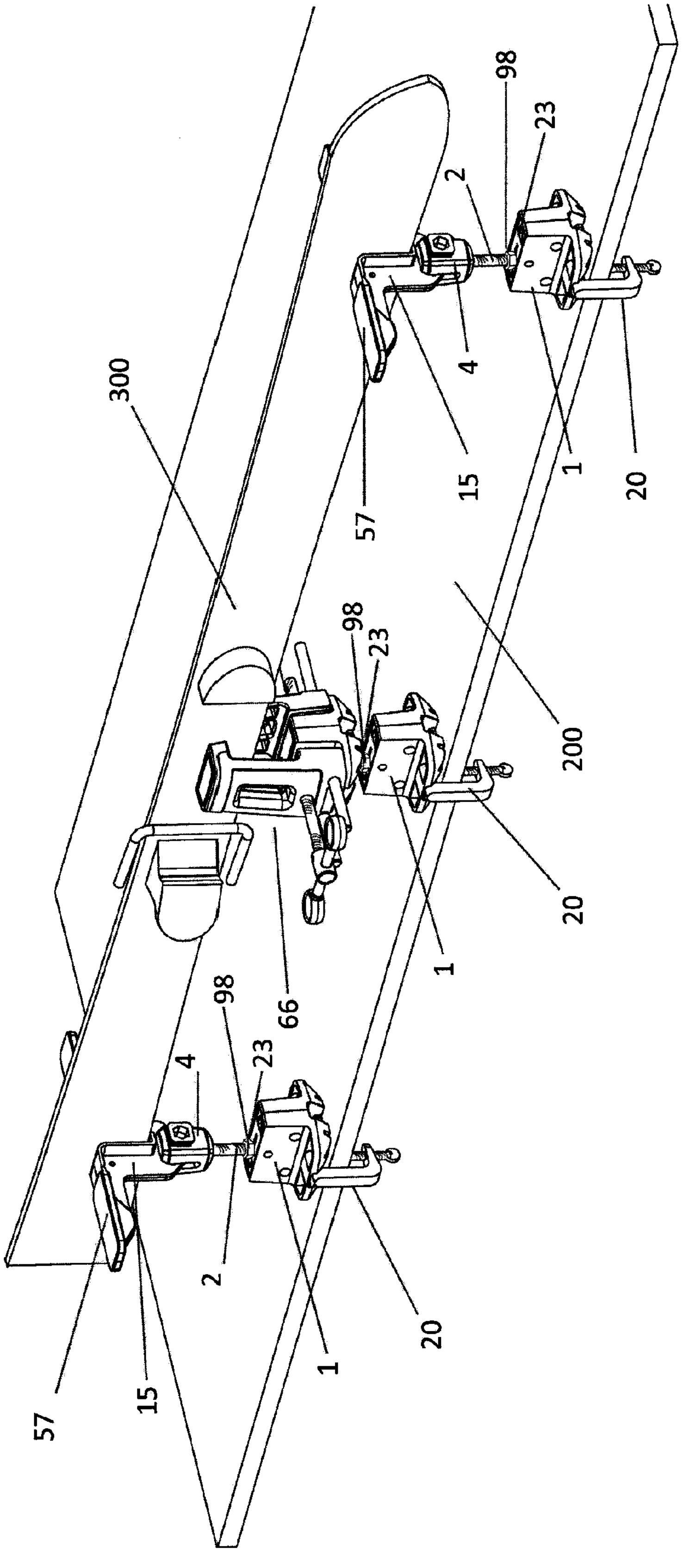
FIG. 24 is a perspective view showing the same holders clamped to a work bench but with the ski having been moved into a vertical orientation and held in the vertical slots of the holders for ski edge maintenance, in accordance with the embodiment of the disclosure.
Figure 25:
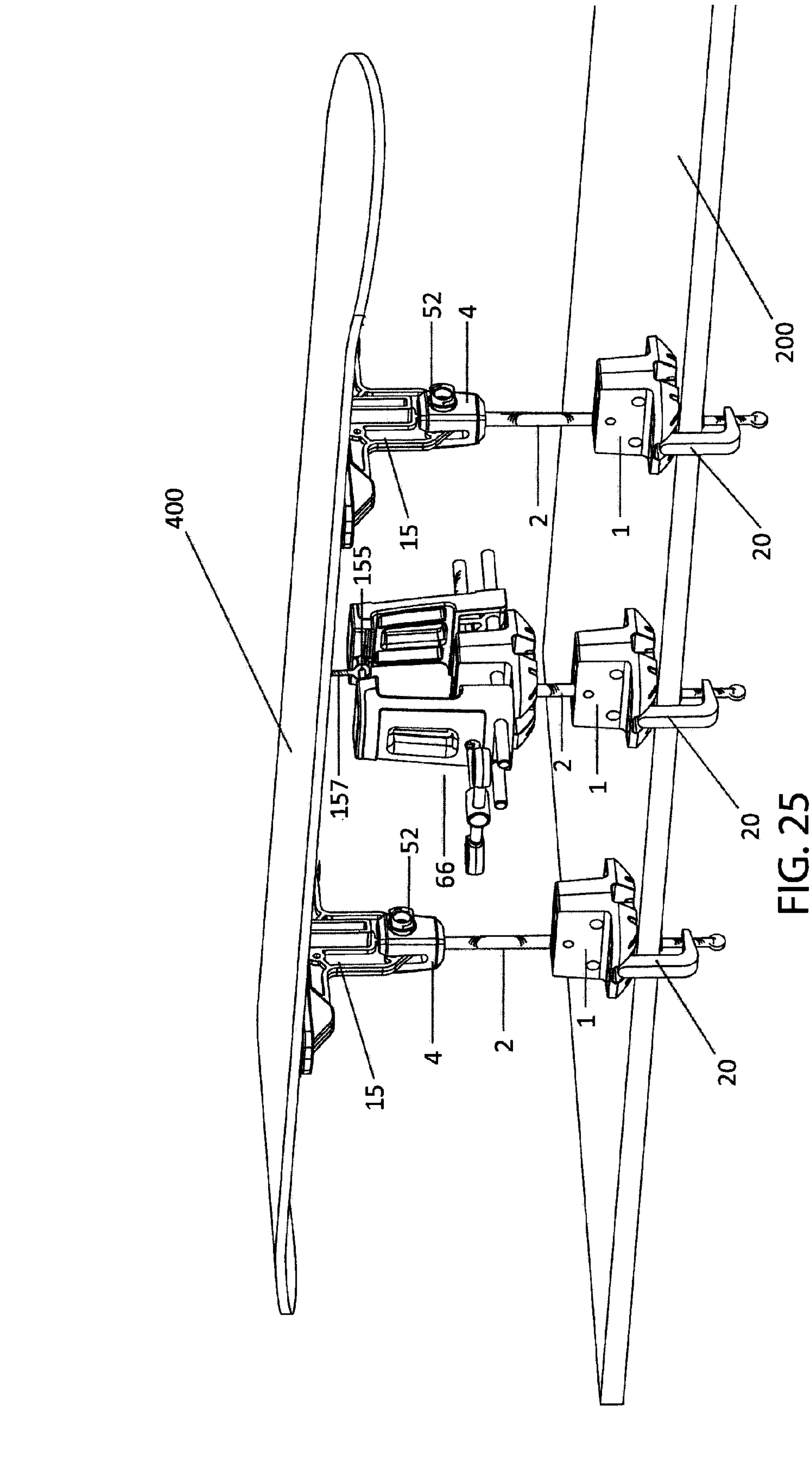
FIG. 25 is a perspective view showing a snowboard positioned upon the holders for snowboard base preparation/maintenance, anchored by an eyebolt turned into one of the snowboard threaded inserts, in accordance with the embodiment of the disclosure.

With reference to FIG. 24 and FIG. 26, according to one embodiment, the ski and snowboard supports 15 are provided with elongated resilient rubber pads 57 to prevent damage to the ski or snowboard upper surface during use and also to provide for sufficient frictional engagement therewith. According to one embodiment, the ski and snowboard supports 15 are made of a glass-reinforced plastics material moulded as a one-piece formation and include vertical slots 17 (see FIG. 23) preferably of a width slightly larger than the largest ski and snowboard thickness so when either a ski 300 or snowboard 400 is placed upright in slots 17 the ski and snowboard support 15, support head 4 and threaded rod 2 of the holder can be rotated as a unit about the base section 1 of the holder and the holders' vertical axis such that two opposing longitudinal edges of each slot 17 act to clamp the ski or snowboard in a fixed upright position. Locking nut 98 on the lower portion of the threaded rod 2 is tightened and compressed against the top portion 23 (see FIG. 22) of the base section 1 to prevent unwanted longitudinal movement of the ski 300 or snowboard 400 once clamped in slot 17. The ski and snowboard support 15, support head 4 and threaded rod 2 of the holder can also be rotated as a unit about the holders' vertical axis to adjust the height of the support relative to the holder base section 1, or to change the orientation of the support from a position where said support is aligned across the width of a snowboard 400 to a position where the support is aligned with the longitudinal axis of a ski 300.

Figure 46:
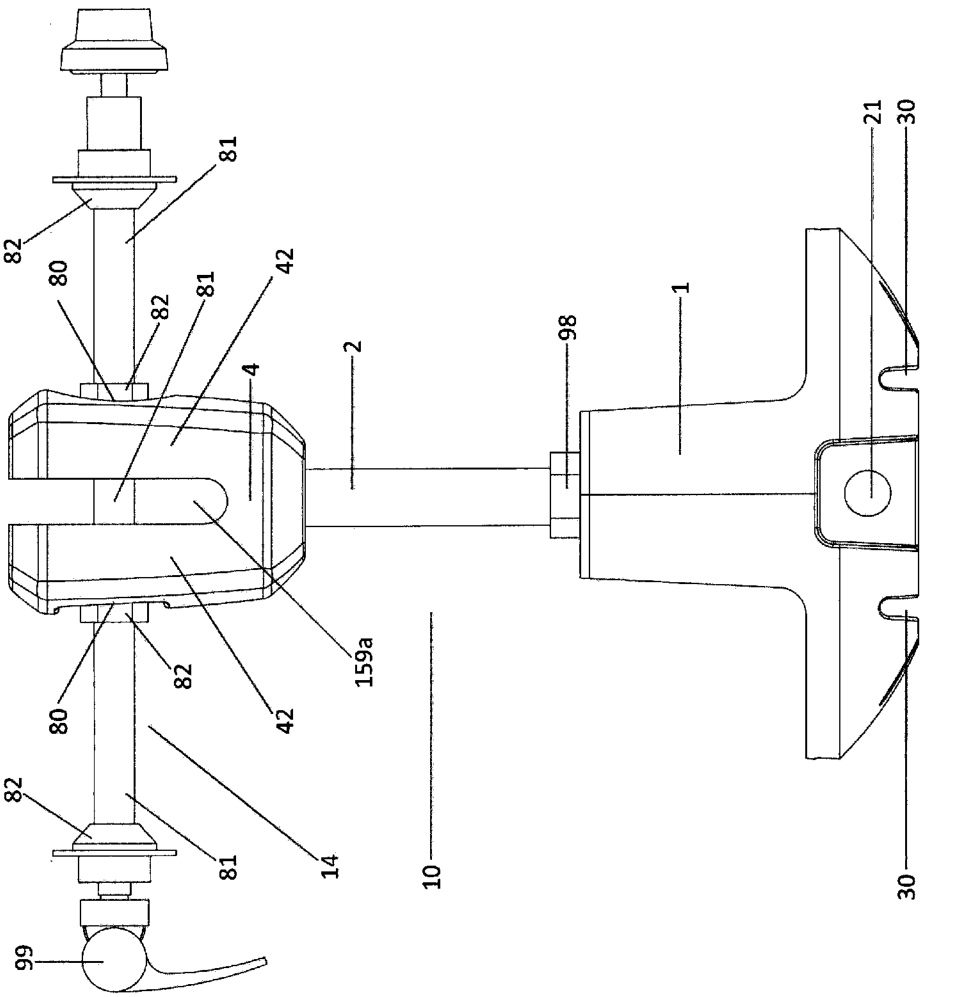
FIG. 46 is a side elevation view of a holder in accordance with the disclosure with a bicycle fork mounting bracket being shown mounted transversely through the support head of the holder, in accordance with an embodiment of the disclosure.

As shown in FIG. 46, according to one embodiment, it will be appreciated that the support head 4 of holder 10 may be arranged to removably hold varying lengths of bicycle fork mounting brackets 14. To achieve this the support head 4 is provided aperture 80 through flanges 42 through which a threaded bicycle axle 81 is inserted and centered so approximately equal lengths of axle 81 are protruding on either of two sides of support head 4. Axle nuts 82 are turned onto the external threads of the axle 81 and tightened against the outside surface of the sides of support head 4 to permit convenient fastening of axle 81 in a transverse orientation through support head 4. Axle 81 can be easily removed from support head 4 by loosening and removing one of the axle nuts 82 on either side of the support head 4. Axle cones 82 are turned onto the threads of axle 81 and positioned in spaced proximity so as to act as a stay against the inside portion of either the front or rear bicycle fork ends when a bicycle 500 is mounted to the holder 10. The fork tightening mechanism may consist of locknuts (not shown) or a quick release mechanism 99 well known in the art.

Figure 6:
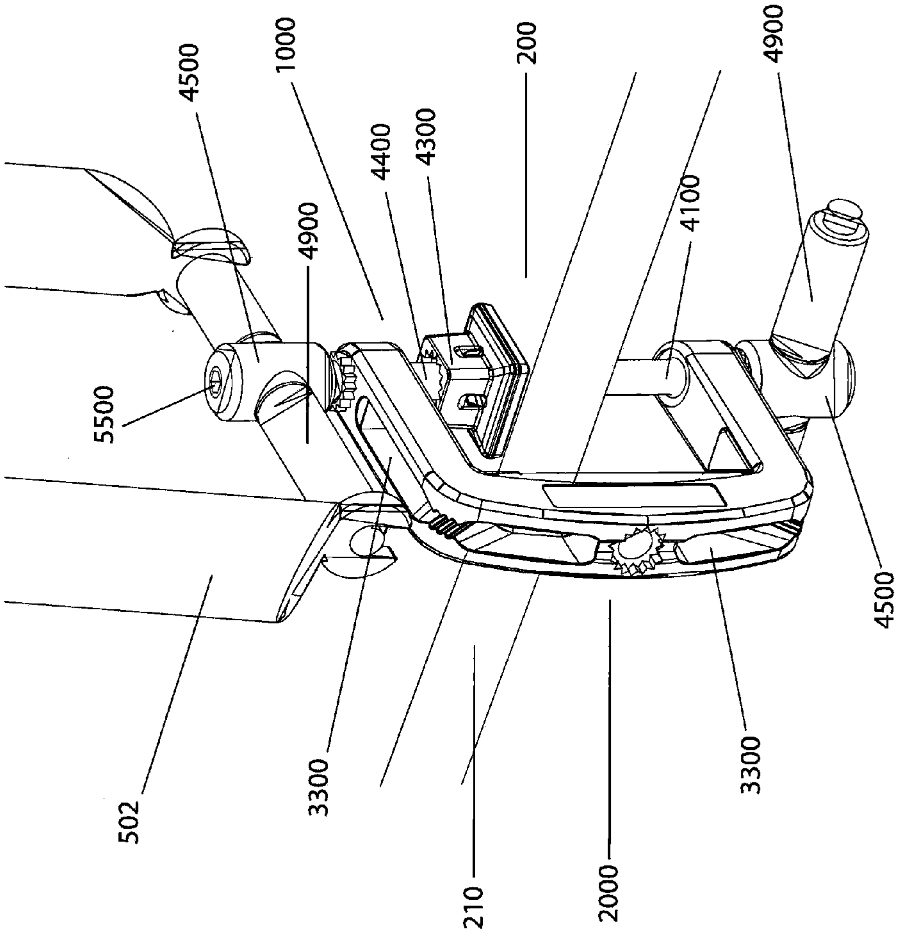
FIG. 6 is a perspective view showing the same clamp with integrated tensioning device, but with an additional clamping screw subassembly and a clamping handle mounted to the clamp frame.

As best seen in FIGS. 5 and 6, according to one alternative embodiment, holder 10 including base section 1, threaded rod 2, support head 4 and fork mounting brackets 14 may be interchanged with clamp with integrated tensioning device 1000 providing a clamping handle 4900 adapted to both actuate clamping screw 4400 and support bicycle fork 502 as a bicycle fork mounting bracket and vice versa. Features of handle 4900 and clamping screw 4400 described above may be incorporated in holder 10 and vice versa.

Figure 32:
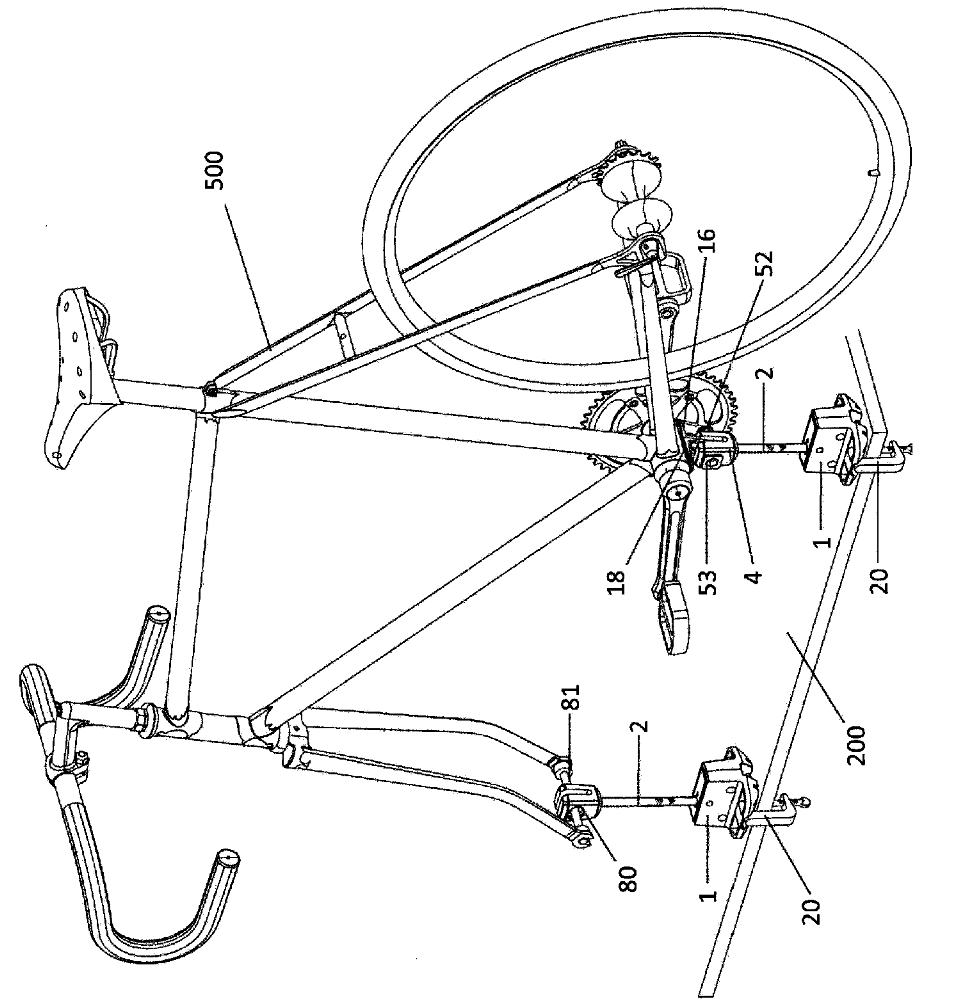
FIG. 32 is a perspective view illustrating a pair of bicycle holders clamped to a table or work bench in spaced relation with a bicycle shown positioned upon the two holders for bicycle maintenance, adjustment or repair, in accordance with an embodiment of the disclosure.
Figure 33:
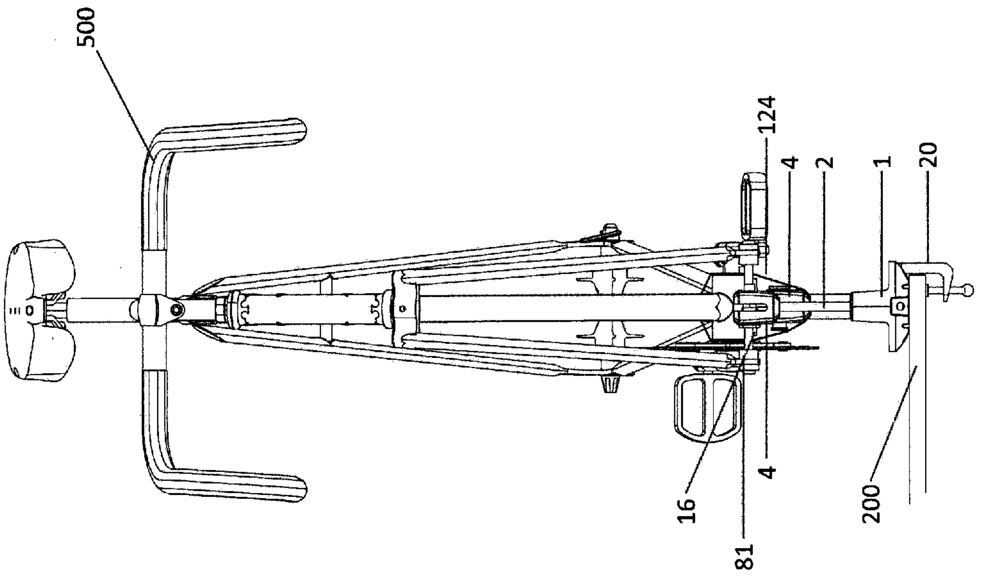
FIG. 33 is a front view illustrating a pair of bicycle holders clamped to a table or work bench in spaced relation with a bicycle shown positioned upon the two holders for bicycle maintenance, adjustment or repair, in accordance with an embodiment of the disclosure.

As shown in FIG. 32, according to one embodiment, the holder 10 including bottom bracket shell support 16 is positioned in close proximity to one corner of the tabletop, support or work station 200 so as to allow either the front or rear bicycle wheel sufficient clearance off the table or stand to spin freely, and threaded rod 2 of the holder 10 is of a sufficient height so as to allow the bicycle crank arms and pedals clearance above the tabletop 200 and base section 1 to rotate without impediment when the bicycle bottom bracket shell is resting on the bottom bracket shell support 16. According to one embodiment, the bottom bracket shell support 16 has a "V" shaped profile 18 allowing a very wide variety of bottom bracket shell diameters and shapes to be cradled between and held within angled flanges 180 and 181 (see FIG. 45) of the bottom bracket shell support 16. According to one embodiment, the bottom bracket shell support 16 has a resilient rubber top surface 19 to prevent damage to the bicycle bottom bracket shell surface and provide for good frictional engagement therewith and is of a width not more than the width of the bicycle bottom bracket itself to allow the bicycle crank arms to clear bottom bracket support 16 without impediment when the bicycle crank arms and pedals are rotated. According to one embodiment, the bottom bracket shell support 16 may be mounted to the support head 4 of the holder 10 for movement between a position where bottom bracket shell support 16 is generally horizontal to one where bottom bracket support 16 is generally vertical, also allowing the support to pivot and be maintained in positions intermediate of horizontal and vertical to accommodate a very wide variety of bicycle frame shapes in the vicinity of the bicycle bottom bracket shell.

With reference to FIG. 55, according to one embodiment, the holder 10 including the bottom bracket shell support 16 includes a retaining strap 124 made of a nylon material (for example) with an eyelet 126 reinforced by a steel grommet 125 of a slightly larger inside diameter than the outside diameter of threaded rod 2 thereby allowing retaining strap 124 to be affixed to holder 10 when threaded rod 2 is placed through eyelet 126 and steel grommet 125. Retaining strap 124 is attached to a rectangular ring 126*a* by being looped through rectangular ring 126*a* and sewn to itself by stitching 127. The retaining strap 124 is provided with a length of hook and loop fastener material 128*a* and 128*b* stitched to one side of the strap end portion opposite the rectangular ring 126*a*, providing convenient means to securely fasten retaining strap 124 to itself when looped around and tensioned against the portion of the bicycle frame where the down tube and seat tube meet the bottom bracket shell and looped through rectangular ring 126*a*.

With reference to FIGS. 1-4 and 10-13, according to one alternative embodiment, holder 10 including retaining strap 124 may be interchanged with clamp with integrated tensioning device 1000, where cord 5000 of the tensioning device is looped around and tensioned against the portion of the bicycle frame where the down tube and seat tube meet the bottom bracket shell and then fixed in cleat 3400 of clamp 2000 in place of holder 10 including retaining strap 124, noted above, and vice versa. Features of tensioning device 1000 described above may be incorporated in holder 10 and vice versa.

Figure 29:
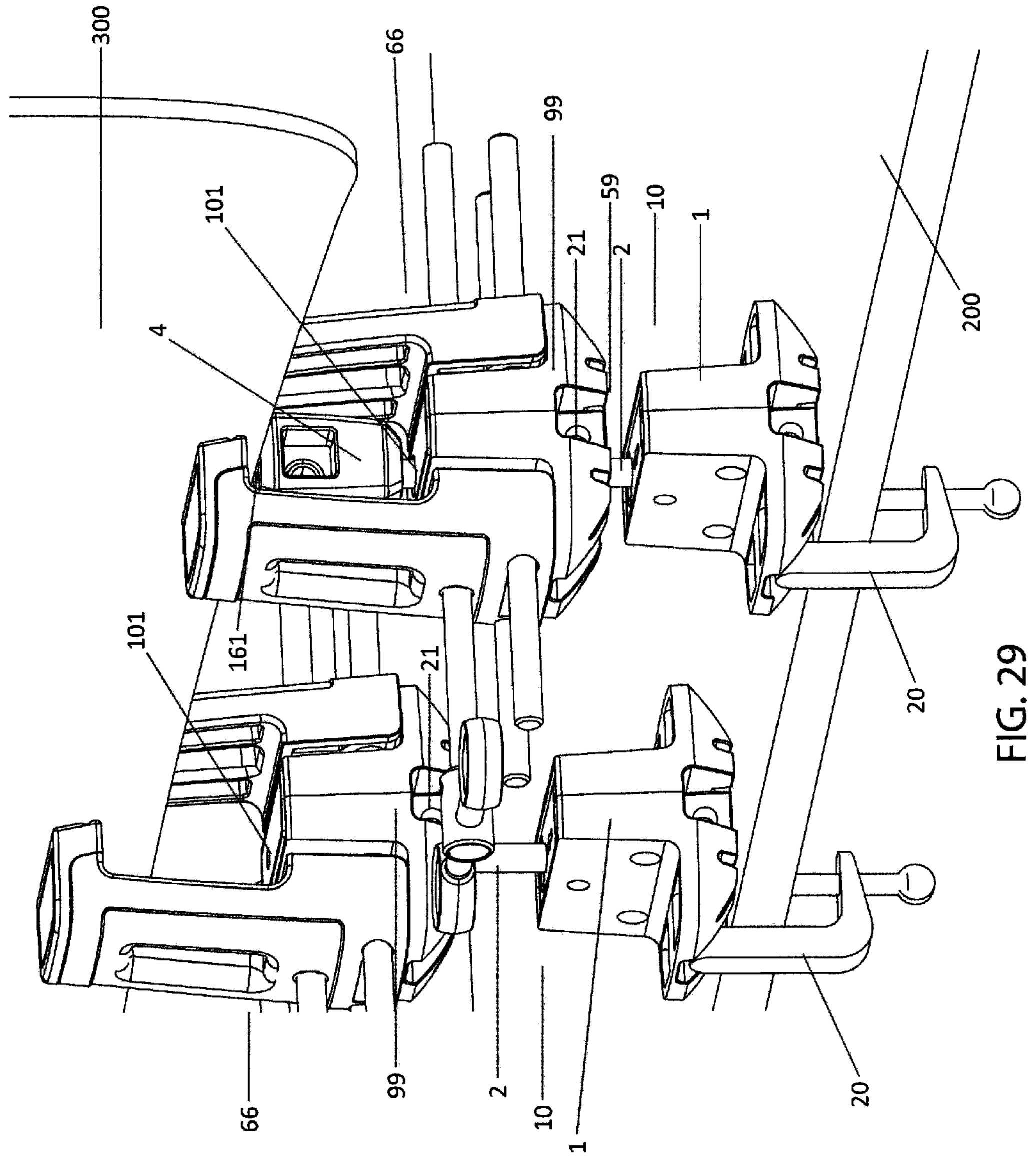
FIG. 29 is a perspective view showing two of the holders clamped to a work bench with the ski having been moved into a vertical orientation and clamped in the vise assemblies of the holders for ski edge maintenance with the ski resting on the top portion of a support head, in accordance with an embodiment of the disclosure.
Figure 30:
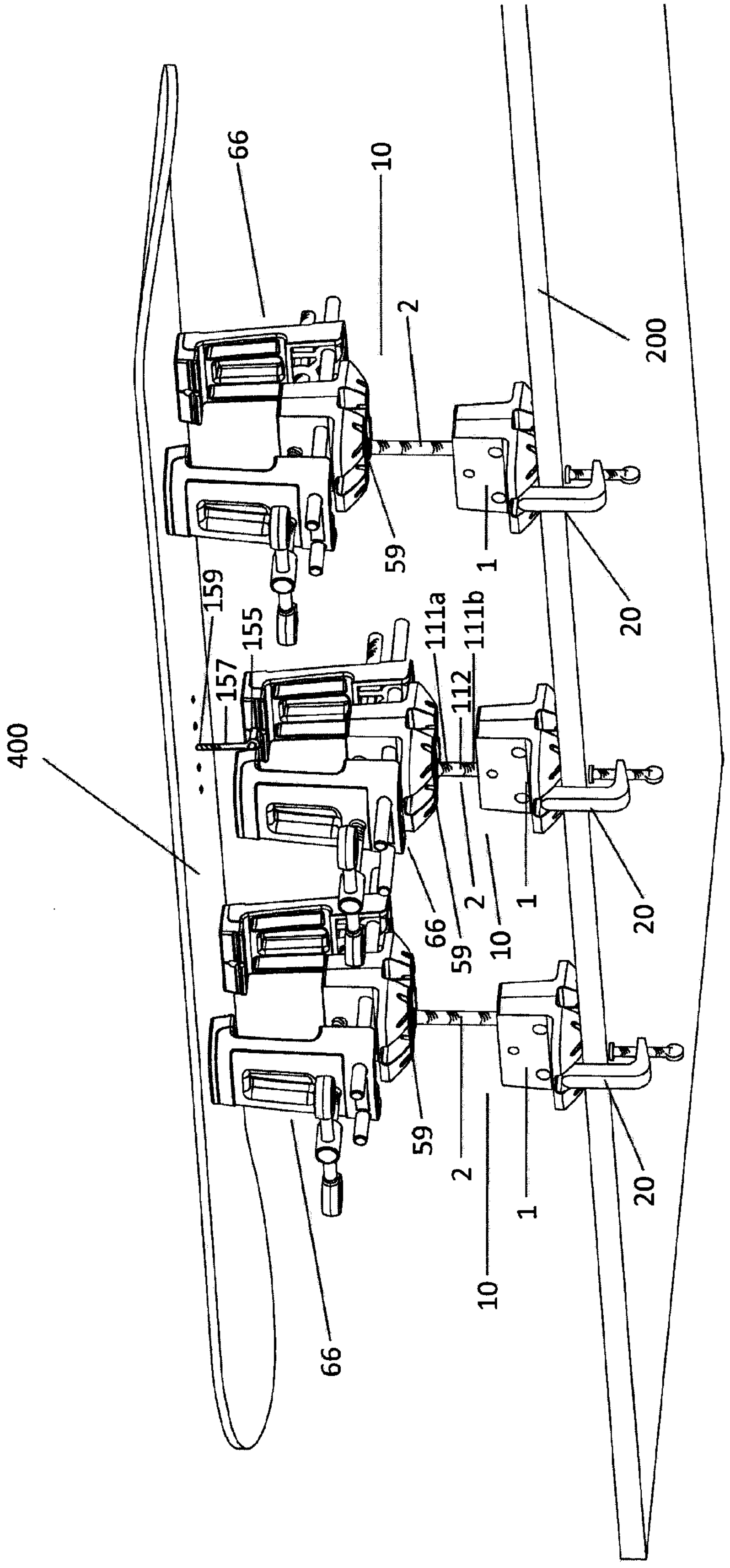
FIG. 30 is a perspective view showing a snowboard positioned upon the holders for snowboard base preparation/maintenance anchored by an eyebolt turned into one of the snowboard threaded inserts, in accordance with an embodiment of the disclosure.
Figure 54:
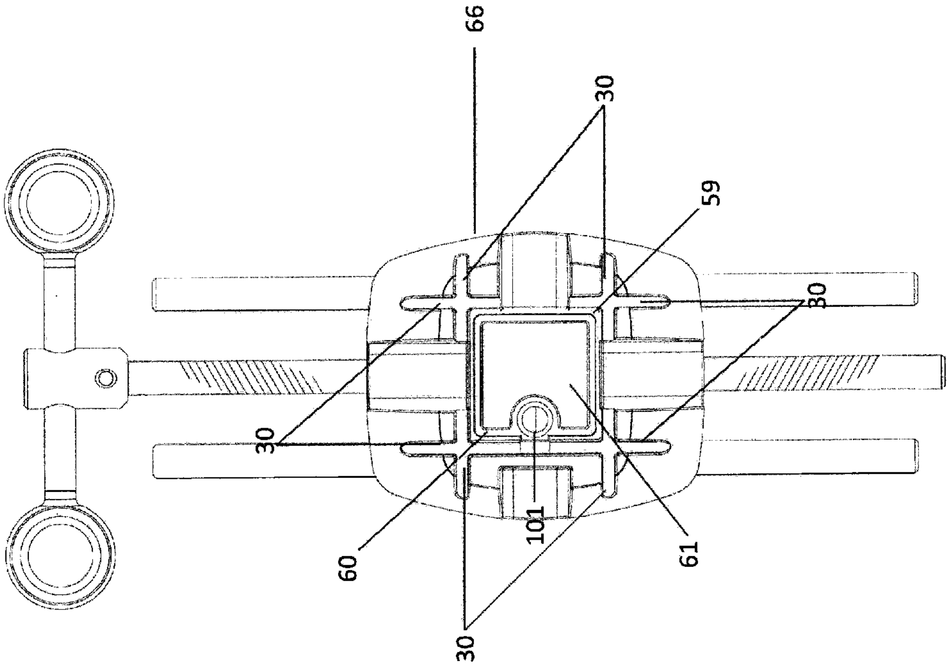
FIG. 54 is a bottom plan view of the vise assembly of the holder in accordance with an embodiment of the disclosure.

FIGS. 29-30, show the vise assembly 66 of the holder 10 in detail, according to one embodiment, a vise base 99 including a perpendicular threaded aperture 101 allows the threaded rod 2 of the holder 10 to be turned into threaded aperture 101 of the vise base 99 to permit mounting of the vise base 99 to the base section 1 of the holder 10. Threaded rod 2 is provided with two reversely disposed sections of threads 111*a* and 111*b* with corresponding complimentary threads in threaded apertures 3 and 101 of base section 1 and vise base 99, respectively. A thread-free section 112 on threaded rod 2 between reversely disposed threads 111*a* and 111*b* is preferably provided with a knurled surface to assist in obtaining a firm grip when using thumb and fore finger to conveniently turn the threaded rod 2 either clock-wise or counter clock-wise about its vertical axis, thereby allowing height adjustment of the vise base 99 relative to the base section 1 without the need to rotate either vise base 99 or base section 1. Alternatively, the vise base 99 is provided with convenient apertures 22 (see FIG. 52) extending above and parallel to the base bottom 59 to receive the upper legs of the C-clamps 20 to permit convenient clamping of the vise assembly 66 directly to a work station 200 if so desired. As shown in FIG. 54, base bottom 59 is provided with a resilient rubber pad 61 that inserts into the indent 60 in vise base 99 to prevent vise base 99 from marring the work station surface and to provide for good frictional engagement therewith.

Figure 56:
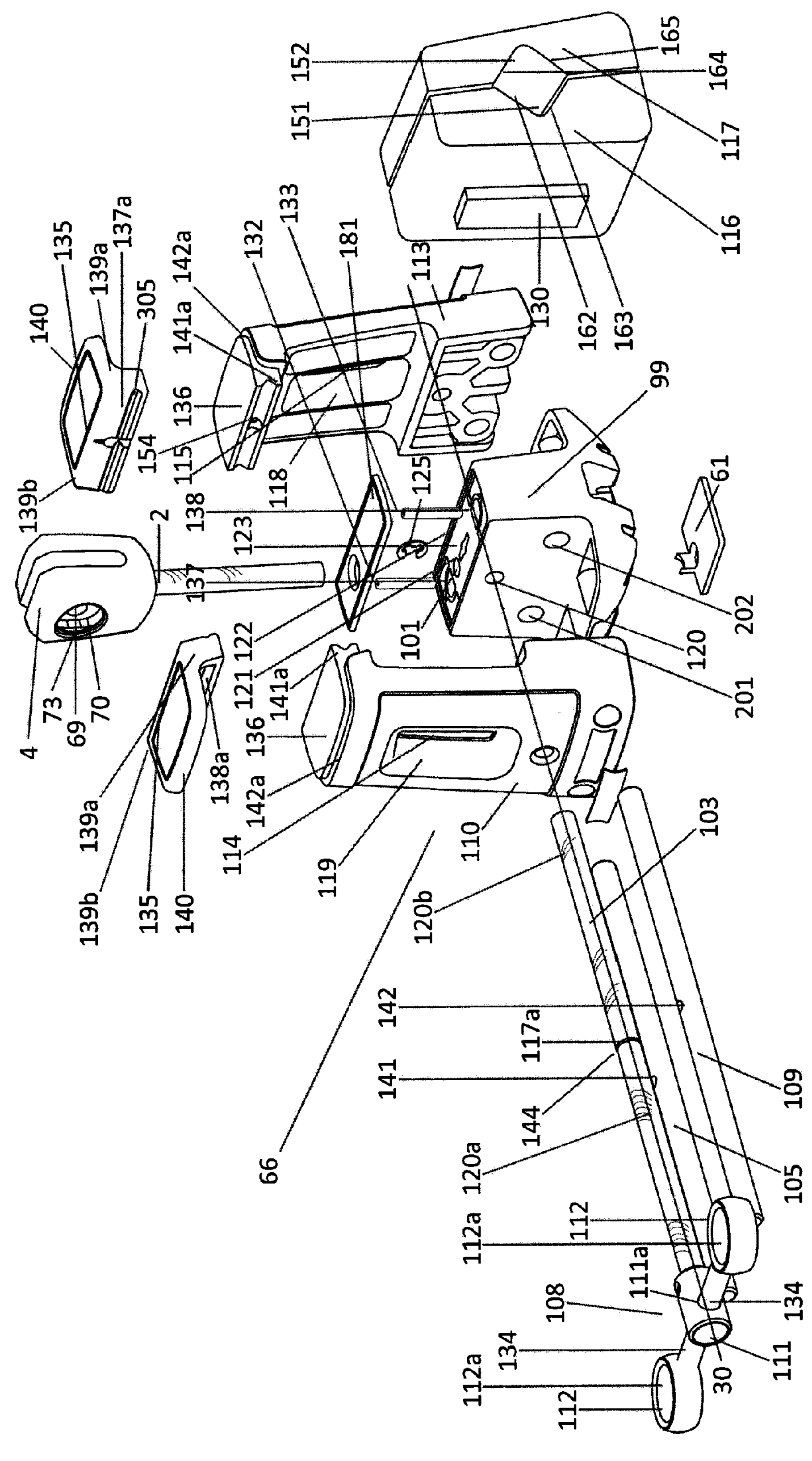
FIG. 56 is an exploded perspective view of the vise assembly and associated components in accordance with an embodiment of the disclosure.

As shown in FIGS. 40-43, according to one embodiment, a vise screw 103 extending horizontally through the vise base 99 with two reversely disposed sections of threads 120*a* and 120*b* is provided to allow for movement of oppositely disposed vise jaws 110 and 113 toward and away from each other. Oppositely disposed vise jaws 110 and 113 are provided with vise screw bores 225 and 226, each threaded to match and engage one section of threads 120*a* or 120*b* on vise screw 103. One embodiment has jaws 110 and 113 moving concurrently either away from to towards each other by action of vise screw 103. One or more vise screws or other movement mechanisms may be provided to effect such movements. Another embodiment may engage vise screws to either move apart and/or bring together jaws 110 and 113. Other movement and engagement systems may be provided in lieu of, or in addition to vise screws to move one or more of the jaws. For example, unthreaded rods may be used. The movements of the jaws 110 and 113 may or may not be symmetrical in displacement. One or both of jaws 110 and 113 may be fixed for a portion of the movement cycle. As shown in FIG. 56, according to one embodiment, vise screw 103 has in its middle a thread-free section 144 which is rotatably mounted through horizontal aperture 120 in vise base 99. The thread-free section 144 is provided with a recessed groove 117*a* to accept external retaining ring 125 which acts as a shoulder against walls 121 and 122 (see FIG. 52) of vertical groove 123 extending downward from the top portion of the vise base 99 so the vise screw 103 as a whole is held in horizontal aperture 120 so as to be immovable in the direction of its longitudinal axis 30 but rotatable about the longitudinal axis 30. Guide bars 105 and 109 extend through horizontal guide bores 201 and 202, respectively, through both vise jaw 110 and vise jaw 113 on either side of the vise screw 103 parallel to its longitudinal axis 30 so vise jaw 110 slides parallel to vise jaw 113 when vise screw 103 is turned either clock-wise or counter clock-wise about its longitudinal axis 30. Spring pins 132 and 133 extending through transverse apertures 141 and 142 in guide bars 105 and 109 and into pin receiving indents (not shown) at the bottom of vertical grooves 137 and 138 in vise base 99 are used to fasten guide bars 105 and 109 to vise base 99. Horizontal aperture 120 and horizontal guide bores 201 and 202 in vise base 99 are all of a sufficient length to hold vise screw 103 and guide bars 105 and 109 in a stable horizontal position. Vise screw 103 is turned by means of a handle assembly 108 fastened to one end of the screw including a lever 134 transversely and slidably mounted through aperture 111*a* in handle end cap 111. Index finger rings 112 mounted on each end of the lever 134 act to prevent the lever from becoming detached from the handle assembly 108 and allow for quick and efficient manual rotation of the handle assembly 108 and vise screw 103 when an index finger is placed through, or partially through ring apertures 112*a*. The handle end cap 111 is of a larger diameter than vise screw 103 and acts as a stop preventing the vise jaws 110 and 113 from winding off the vise screw 103 when vise jaws 110 and 113 are actuated away from each other. Both vise screw 103 and guide bars 105 and 109 are preferably detachably secured to vise base 99 in order to be readily exchanged with a longer or shorter vise screw 103 and guide bars 105 and 109 depending on the width of ski 300, snowboard 400, bicycle 500 firearm 600 or pipe 700 to be held in the vise assembly 66.

Figure 35:
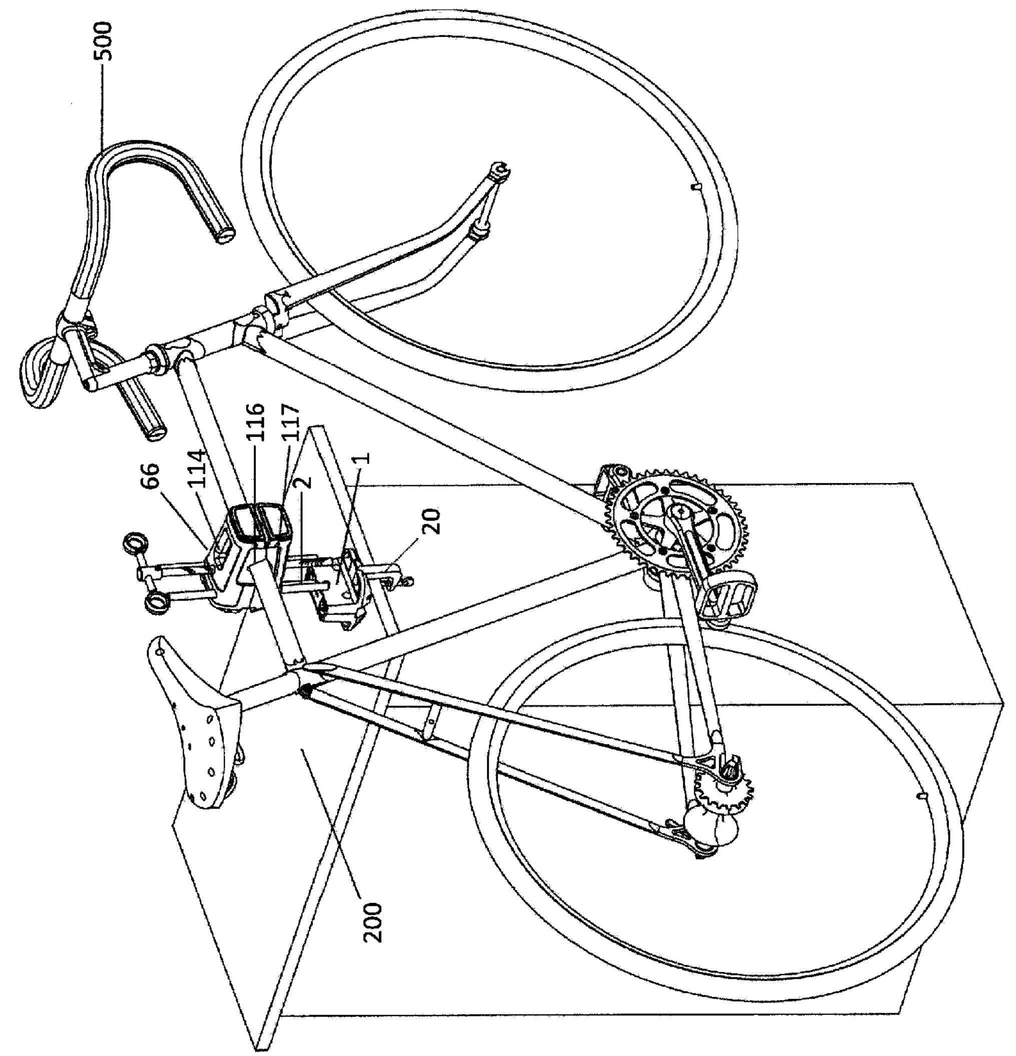
FIG. 35 is a perspective view showing one holder comprising a vise assembly mounted transversely on the vertically orientated threaded rod and base section with said holder clamped to a table or work bench, said vise assembly horizontally clamping the top tube of a bicycle frame and holding a bicycle a sufficient distance off the tabletop to facilitate bicycle maintenance, adjustment or repair, in accordance with an embodiment of the disclosure.

FIGS. 22 and 39 show an open space 121 between the opposing "C" shaped vise jaws 110 and 113 and within the vise assembly 66 allowing a support head 4, clamp knob 32 and/or ski binding 146 and ski brake 147 to be positioned within the vise assembly, the ski brake 147 to be held retracted by and held within vise jaws 110 and 113 when clamping a ski base up in the vise assembly 66, according to one embodiment. Alternatively, as shown in FIGS. 14, 15 and 35, according to one embodiment, bicycle frame pads 116 and 117 are inserted in apertures 114 and 115 in the middle of vise jaws 110 and 113 with frame pad flanges 130 and 131 (not shown) contacting the inside portions 118 and 119 of vise jaws 110 and 113 respectively, such that frame pads 116 and 117 are mechanically held in place within and against vise jaws 110 and 113 so as not to move or become detached from the vise jaw when clamping a bicycle frame. According to one embodiment, the frame pads 116 and 117 have a "V" shaped profile 151 and 152 to facilitate clamping a very wide variety of bicycle frames between the opposing vise jaws 110 and 113 of the vise assembly 66 and frame pads 116 and 117 are, according to one embodiment, made of a resilient material such as rubber so as not to dent, mar or otherwise damage the bicycle frame being clamped. Other shapes may be provided in the pads which would facilitate clamping.

Figure 41:
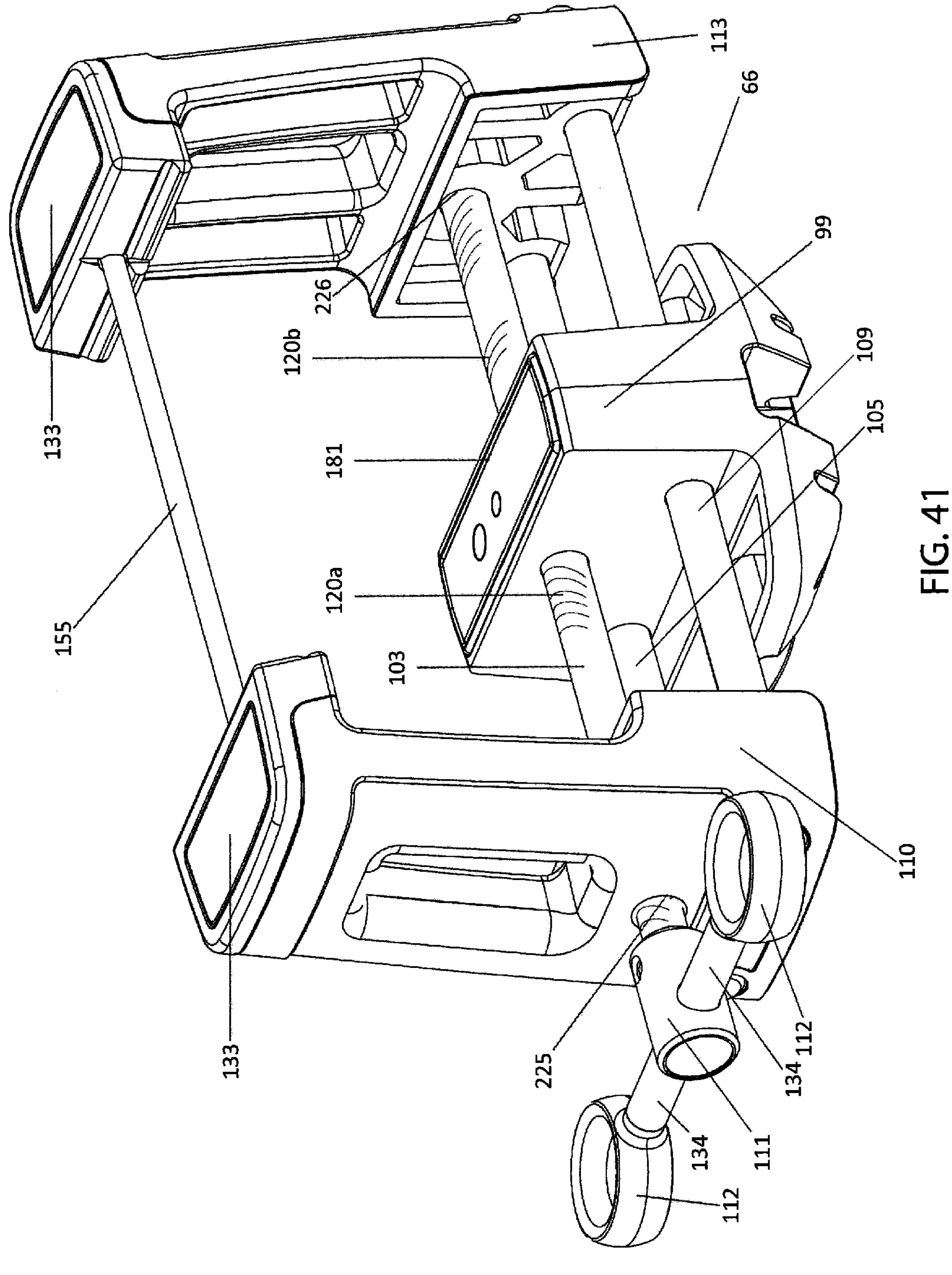
FIG. 41 is a perspective view of the vise assembly with a pin shown placed in a perpendicular orientation and clamped in the stepped indents of the oppositely disposed vise jaws, in accordance with an embodiment of the disclosure.
Figure 42:
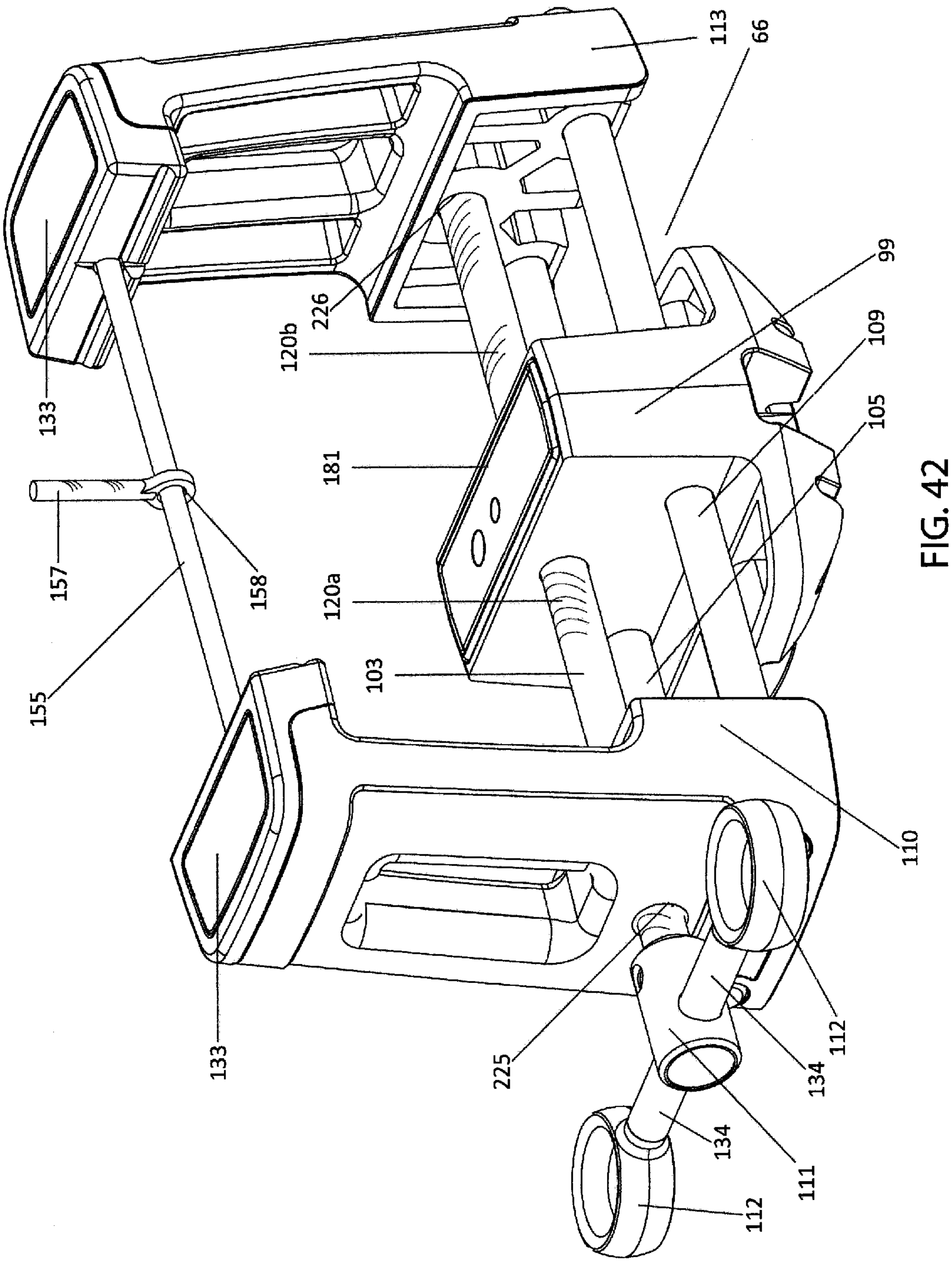
FIG. 42 is a perspective view of the vise assembly with a pin shown anchoring an eyebolt, said pin placed in a perpendicular orientation and clamped in the stepped indents of the vise jaws, in accordance with an embodiment of the disclosure.
Figure 43:
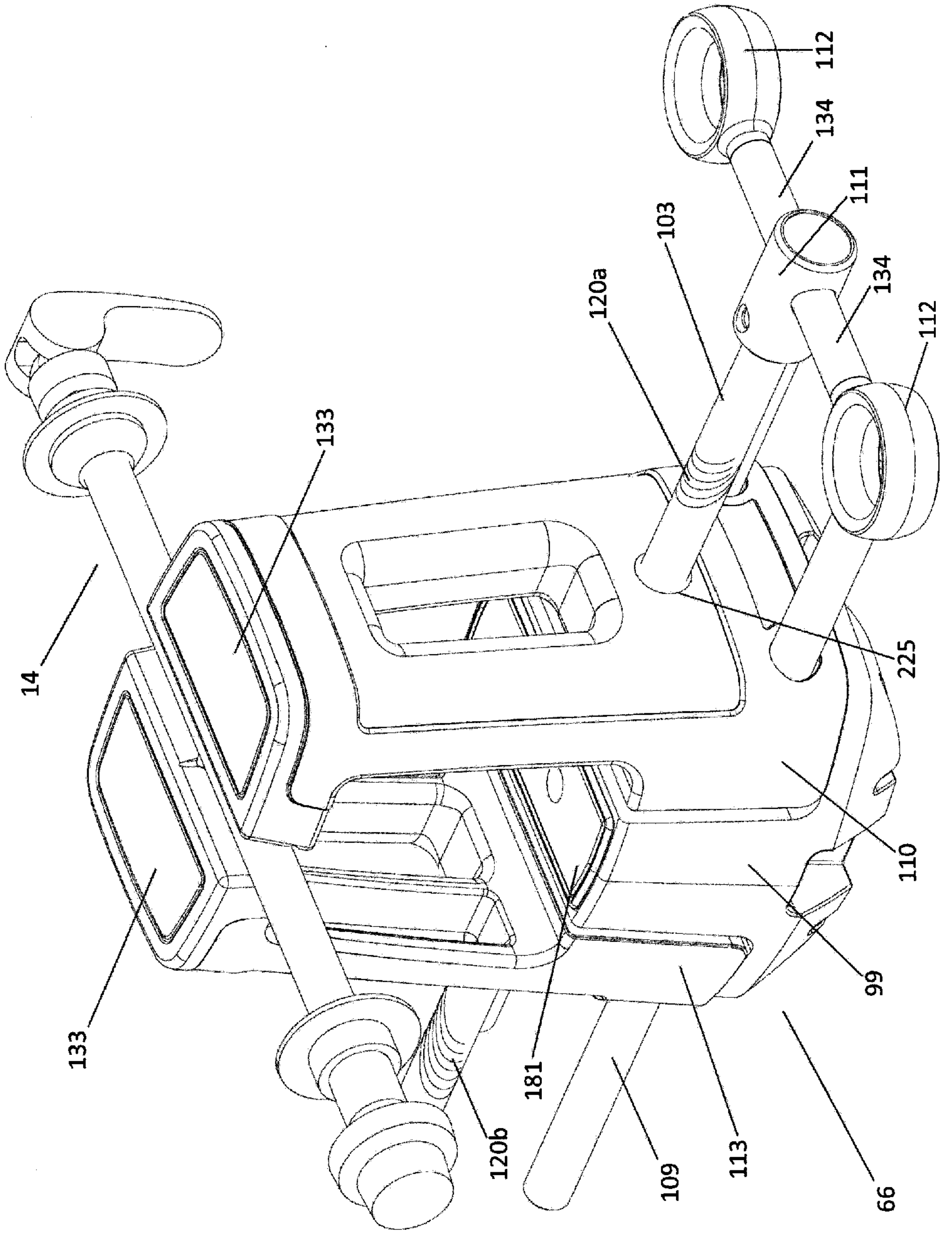
FIG. 43 is a perspective view showing a bicycle fork mounting bracket clamped horizontally between, and parallel with the oppositely disposed vise jaws of the vise assembly, in accordance with an embodiment of the disclosure.
Figure 52:
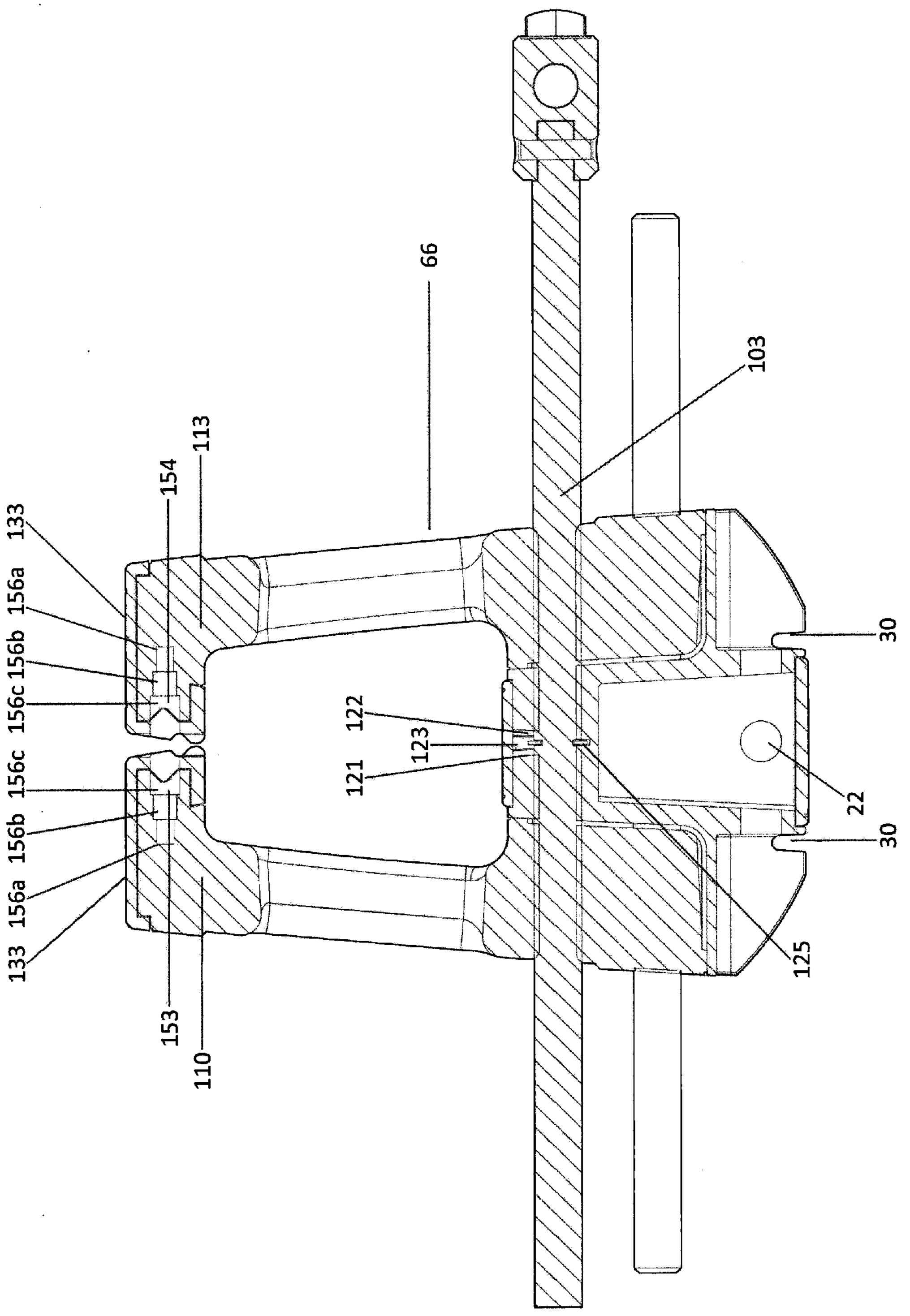
FIG. 52 is a section view of the vise assembly on the line 4-4 of FIG. 51, in accordance with an embodiment of the disclosure.
Figure 53:
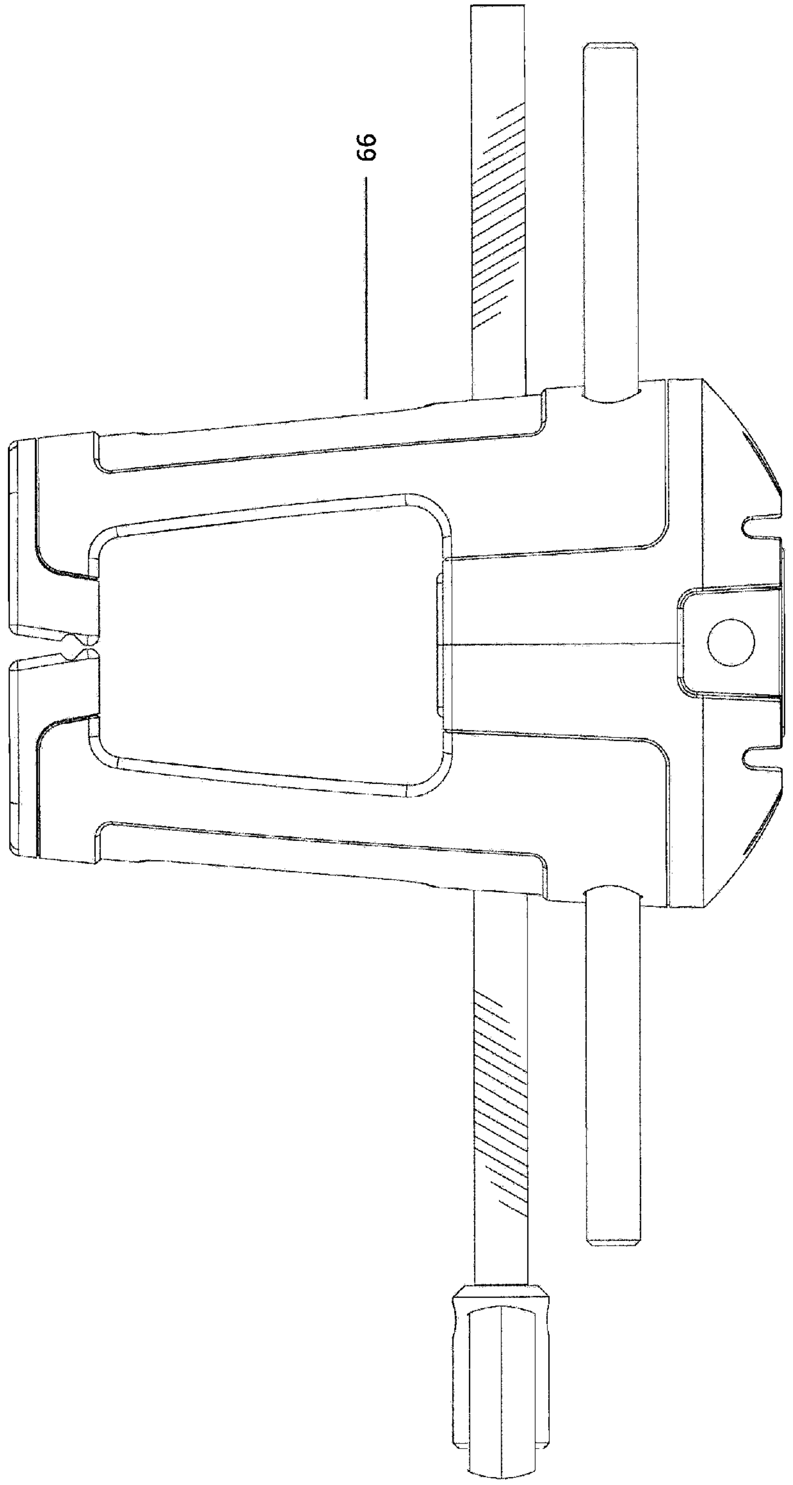
FIG. 53 is a side elevation view of the vise assembly of the holder in accordance with an embodiment of the disclosure.

As shown in FIGS. 41, 42 and 52, according to one embodiment, each of the vise jaws 110 and 113 includes recessed stepped indents 153 and 154 to receive and hold pins 155 of varying diameters and lengths when oppositely disposed vise jaws 110 and 113 are closed upon both ends of pin 155 extending between and perpendicular to the vise jaws 110 and 113. Pin 155 is closed upon and fixed between vise jaws 110 and 113 to horizontally position and mimic the pin employed by certain types of cross country, touring and backcountry ski boots. Certain skis with bindings typically of the Nordic variety can then be attached to the vise assembly 66 through pin 155 by closing the ski binding upon pin 155 in the same manner the binding attaches to the ski boot. According to one embodiment, at least three diameters of pins may be held in progressively smaller diameter stepped indents 156*a*, 156*b* and 156*c* in each vise jaw 110 and 113 onto which both NNN and SNS cross country, touring and backcountry touring ski bindings may be fastened. As shown in FIGS. 30 and 42, according to one embodiment, pin 155 may also be used to provide anchor for an eyebolt 157 when pin 155 is inserted through eyebolt aperture 158, closed upon and fixed between vise jaws 110 and 113 in order to fasten a snowboard 400 to the vise assembly 66 when eyebolt 157 is turned into one of the snowboard threaded inserts 159. The threaded rod 2 of the holder 10 is provided with two reversely disposed sections of threads 111*a* and 111*b* with corresponding complimentary threads in threaded apertures 3 and 101 of base section 1 and vise base 99 respectively with a thread-free section 112 on threaded rod 2 between reversely disposed threads 111*a* and 111*b* to permit convenient turning of the threaded rod 2 either clock-wise or counter clock-wise about its vertical axis, thereby allowing the height of the holder 10 to be readily adjusted relative to the snowboard 400 without the need to rotate either vise base 99 or base section 1.

As shown in FIGS. 41, 42, 43 and 52, according to one embodiment, a flat surface 133 is provided on the top of each vise jaw 110 and 113 allowing the vise assembly 66 to act as a rest in addition to having clamping ability. The vise jaws 110 and 113 are actuated towards each other to clamp either a ski 300 or snowboard 400 in a vertical orientation, or actuated a sufficient distance away from each other to provide stable support for a ski or snowboard resting horizontally on the flat top surface 133 of each vise jaw. The vise assembly 66 is able to be rotated such that the vise jaws 110 and 113 can be positioned in line with the longitudinal axis of the ski 300 or snowboard 400 so as not to interfere with base rilling, structuring and/or imprinting tools with vertically disposed flanges of a thickness greater than the thickness of a ski or snowboard when drawn down the ski or snowboard base as required when the ski or snowboard is resting base up. As shown in FIG. 56, according to one embodiment, the vise jaws 110 and 113 may be provided with resilient jaw pads 135, each pad covering the entire top portion 136 of each vise jaw and comprising a front flange 137*a*, bottom flange 138*a*, side flanges 139*a*, 139*b* and rear flange 140 to cooperate with jaw block 141*a* and stepped indent 142*a* of vise jaws 110 and 113 such that each pad 135 is mechanically held in place against vise jaws 110 and 113 so as not to move or become detached from the vise jaw when clamping. According to one embodiment, the jaw pads are made of a resilient material such as rubber so as not to dent, mar or otherwise damage the ski 300, snowboard 400, bicycle 500, gun 600 or pipe 700 being clamped.

Figure 28:
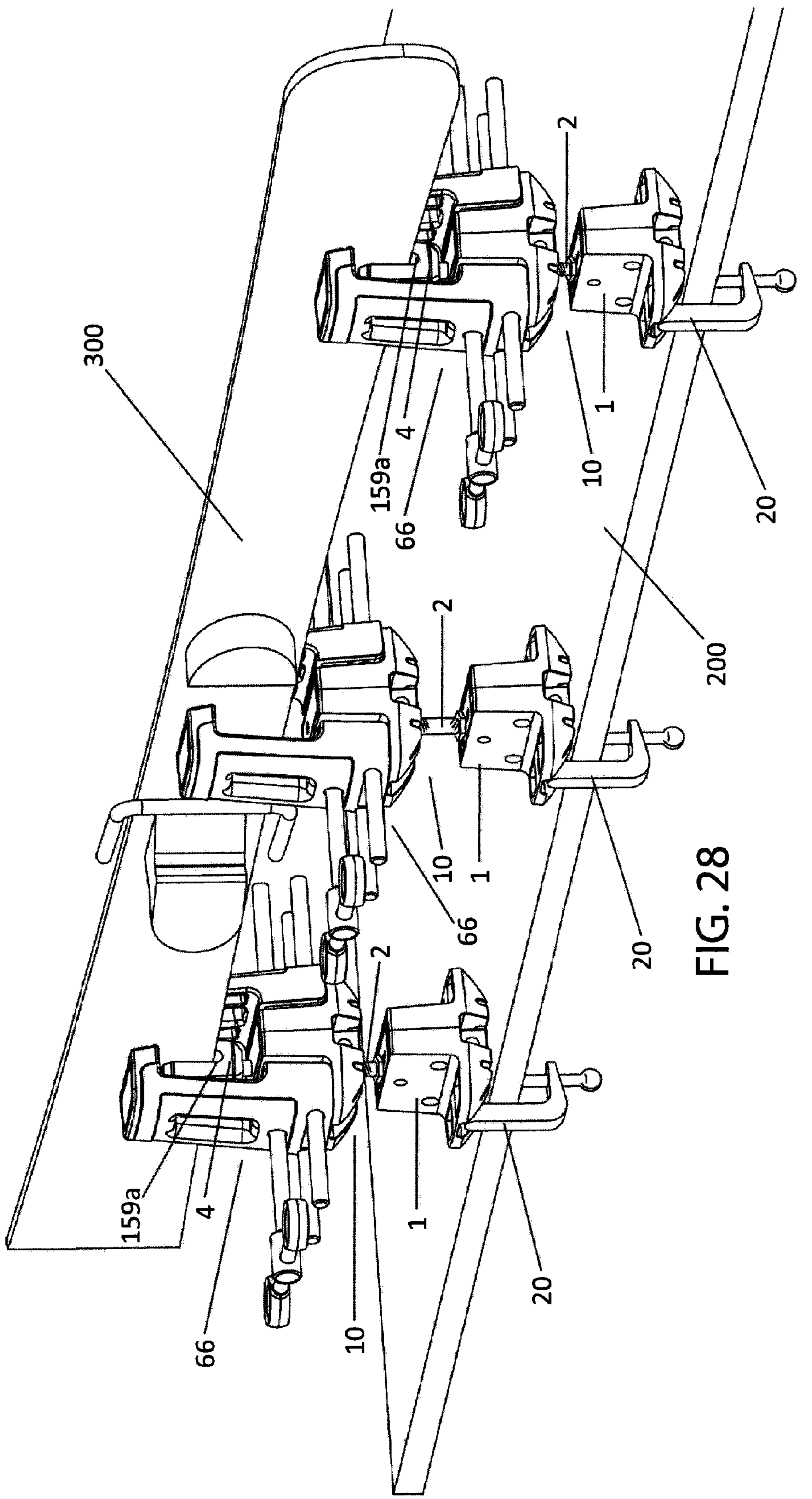
FIG. 28 is a perspective view showing the same holders clamped to a work bench but with the ski having been moved into a vertical orientation and clamped in the vise assemblies of the holders for ski edge maintenance with the ski resting between the two flanges of the support heads, in accordance with an embodiment of the disclosure.
Figure 31:
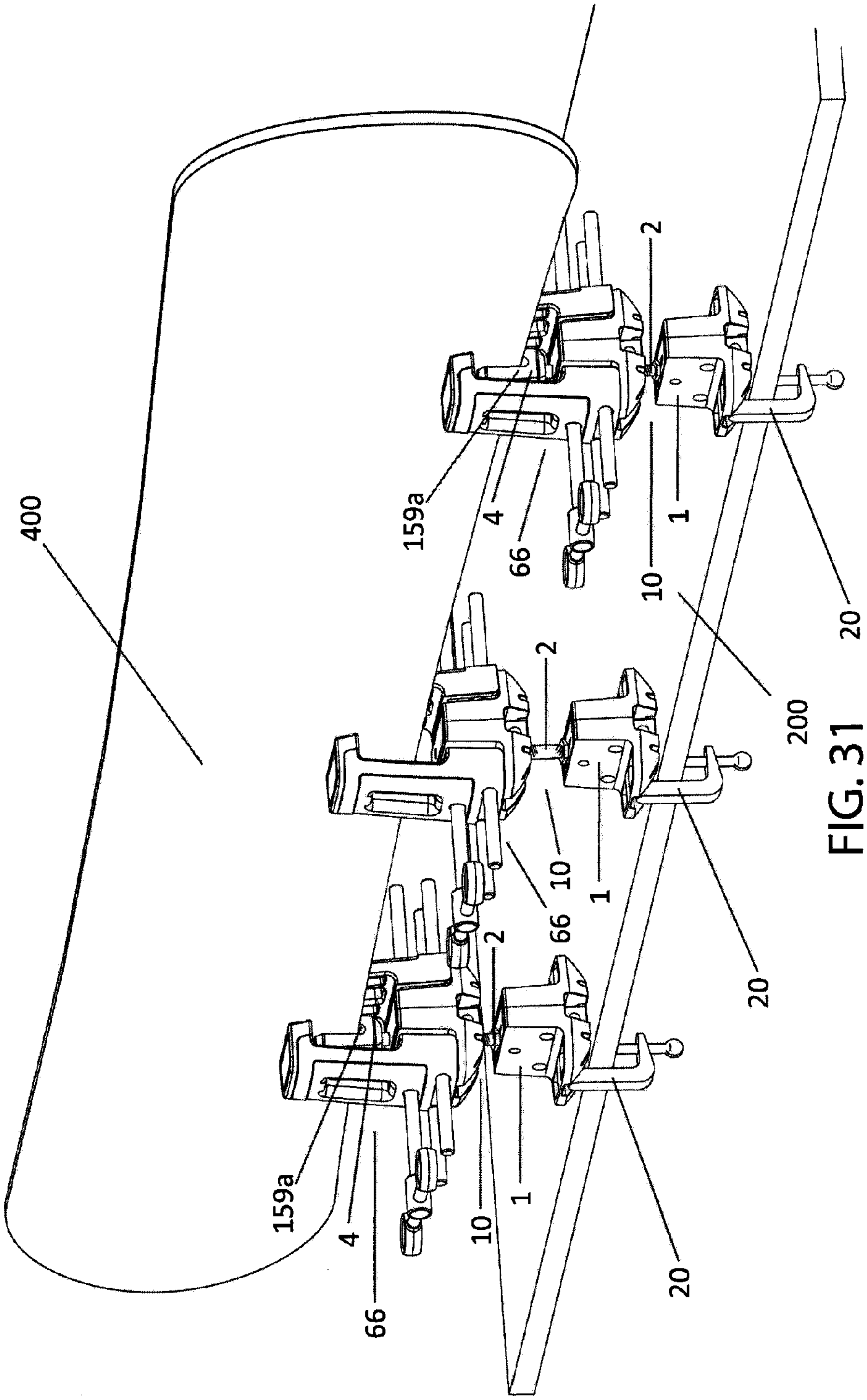
FIG. 31 is a perspective view showing the same holders clamped to a work bench but with the snowboard having been moved into a vertical orientation and clamped in the vise assemblies of the holders for snowboard edge maintenance with the snowboard resting between the two flanges of the support heads, in accordance with an embodiment of the disclosure.

With reference to FIGS. 27, 28, 30 and 31, there is shown in accordance with embodiments of the disclosure, three holders 10 each comprising a vise assembly 66 clamped to a tabletop, support or work station 200 such that a first (right) holder 10 is placed under or in close proximity to the shovel portion of a ski 300 or snowboard 400, a second (middle) holder 10 is positioned under the binding area and a third (left) holder 10 positioned under or in close proximity to the tail portion of a ski 300 or snowboard 400. As shown in FIGS. 28 and 31, according to one embodiment, the first (right) and third (left) holders 10 are positioned under or in close proximity to both shovel and tail portions of the ski or snowboard and are each equipped with support heads 4 mounted upon the threaded rod 2 portions of each holder. Vertical slot 159*a* (see FIG. 46) in each support head 4 serves to stabilize a ski 300 or snowboard 400 in a generally upright position when the support head 4 is rotated about its vertical axis such that the vertical slot 159 is aligned parallel with vise jaws 110 and 113 and the ski 300 or snowboard 400 is dropped down into vertical slot 159*a* and clamped between vise jaws 110 and 113 to permit convenient side edge tuning. The support head 4 of each holder 10 also acts as a rest for a ski 300 placed upright on the top surface 161 (see FIG. 29) of support head 4 then clamped between the vise jaws 110 and 113 when support head 4 is rotated about its vertical axis such that the vertical slot 159*a* is perpendicular to vise jaws 110 and 113, thereby allowing the vise jaws to clamp the ski 300 relatively close to its bottom edge allowing work to be done on the top edge of the ski 300 without obstruction from the vise jaws 110 and 113. A ski 300 is held either base up for base tuning or base down to facilitate binding mounting by clamping the sides of the ski 300 in the binding area using the second holder 10 and resting the shovel and tail portions of the ski 300 on the top flat surface 133 (see FIG. 52) of the vise jaws 110 and 113 of the first and third holders 10. When holding skis 300 having an alpine binding the second holder 10 is positioned directly under the binding ski brake 147.

Figure 34:
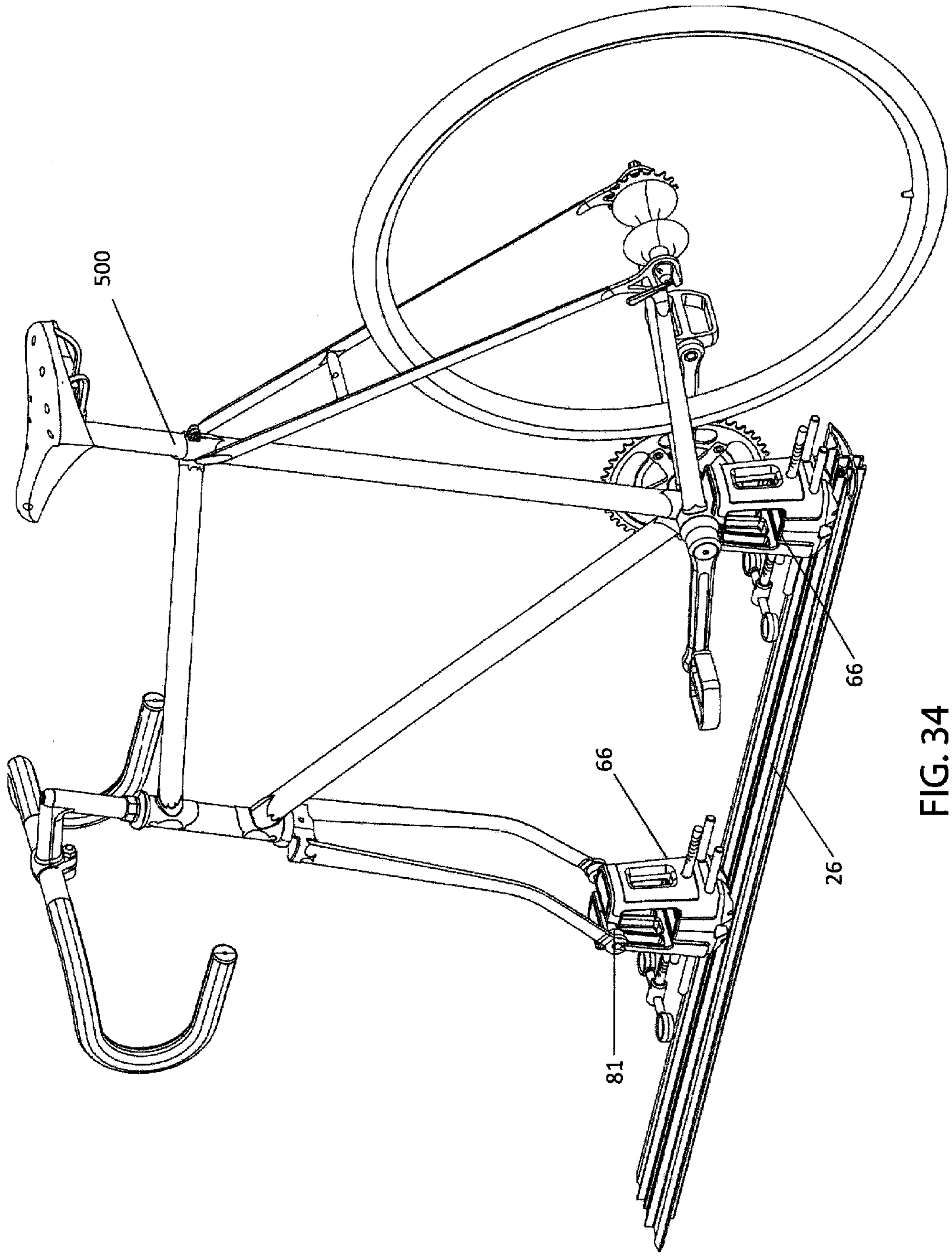
FIG. 34 is a perspective view showing two holders each comprising a vise assembly fastened to a support rail in spaced relation with a bicycle shown positioned on the holders for bicycle maintenance, adjustment or repair, in accordance with an embodiment of the disclosure.

In one embodiment of the disclosure shown in FIG. 34, a first and second holder 10 each comprising a vise assembly 66 are mounted on an elongated support rail 26 with each holder positioned in spaced relation along the support rail 26 such that the first (right) holder 10 is placed under or in close proximity to a bicycle frame bottom bracket shell and the second (left) holder 10 is positioned under either the front bicycle dropout or rear bicycle dropout. The vise assembly 66 of each holder 10 is orientated such that the vise jaws 110 and 113 are transversely positioned relative to the length of the support rail 26 on which the supports are fastened. The vise jaws 110 and 113 of the first (right) holder 10 can be adjusted towards or away from each other to allow the bicycle bottom bracket shell to be seated against, and rest upon, the front flange 137*a* (see FIG. 56) of each jaw pad 135 with the longitudinal axis of the bottom bracket parallel to both vise jaws 110 and 113. The first (right) holder 10, according to one embodiment, includes the retaining strap 124 described in detail above (see FIG. 55) to provide convenient means to secure the bicycle frame against vise jaws 110 and 113. According to one embodiment, a horizontal "V" shaped groove 305 (see FIG. 56) is provided in the top clamping surface 137*a* of each vise jaw 110 and 113 allowing for convenient horizontal clamping of a wide variety of bicycle fork mounting brackets 14 (see FIG. 46) with circular cross sections in the vise jaws of the second (left) holder 10, thereby allowing the front or rear bicycle dropout to be securely fastened to second (left) holder 10.

Figure 36:
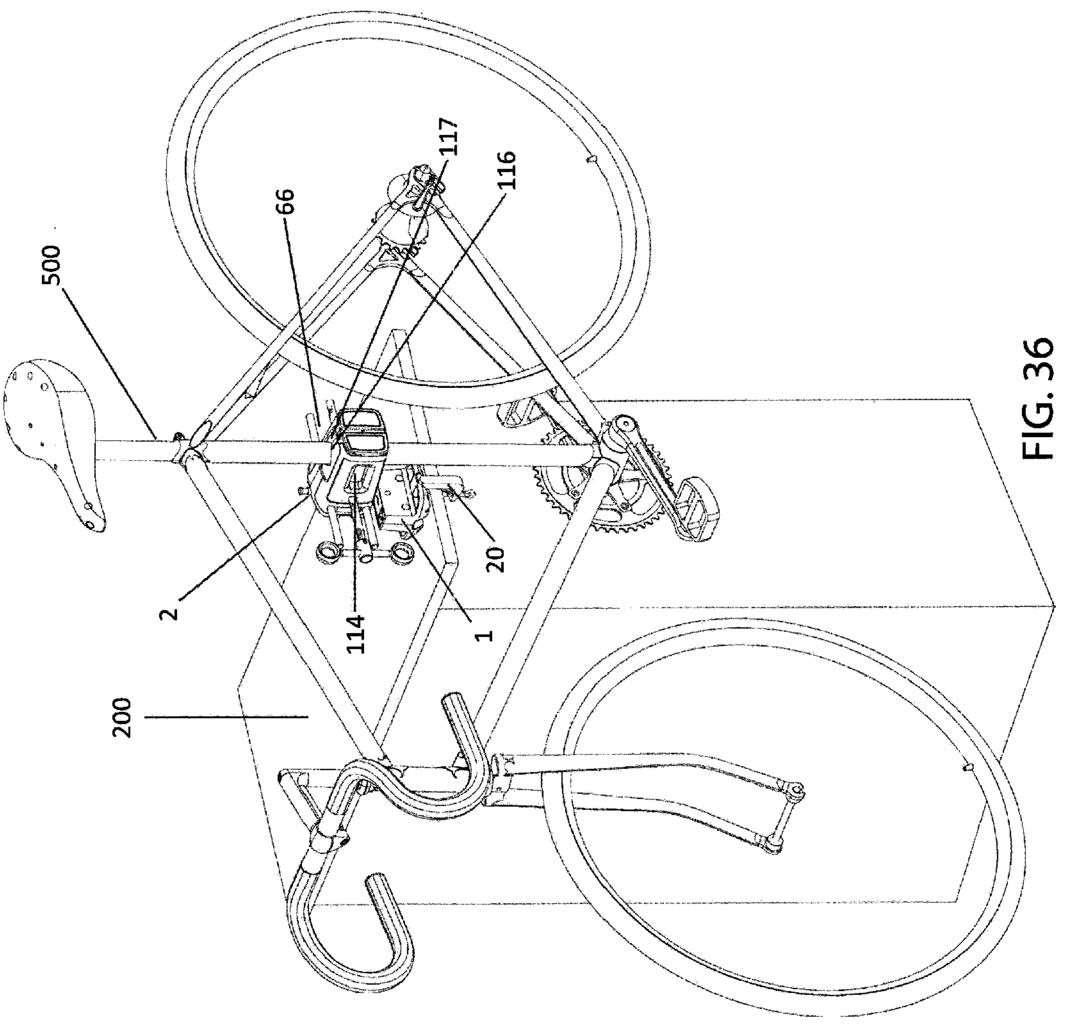
FIG. 36 is a perspective view showing one holder comprising a vise assembly mounted transversely on the vertically orientated threaded rod and base section with said holder clamped to a table or work bench, said vise assembly vertically clamping the seat tube of a bicycle frame and holding a bicycle a sufficient distance off the tabletop to facilitate bicycle maintenance, adjustment or repair, in accordance with an embodiment of the disclosure.
Figure 47:
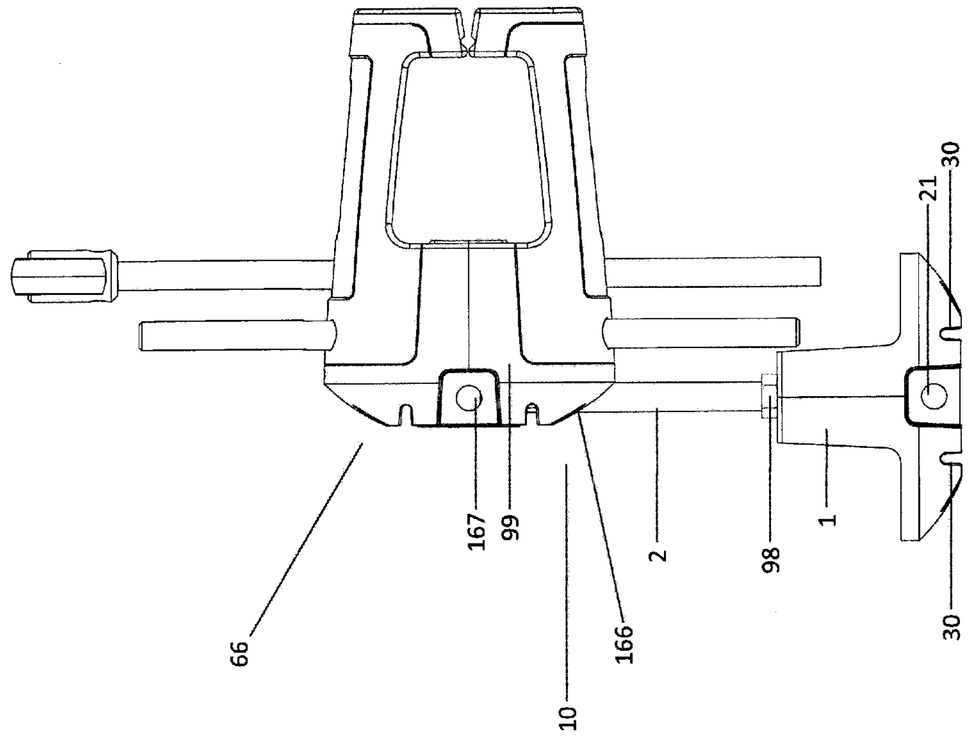
FIG. 47 is a side elevation view of a holder in accordance with the disclosure showing one holder comprising a vise assembly mounted transversely on the vertically orientated threaded rod and base section of the holder, in accordance with an embodiment of the disclosure.

With reference to FIGS. 35 and 36, there is shown in accordance with one embodiment of the disclosure, opposing vise jaws 110 and 113 of vise assembly 66 including apertures 114 and 115 (see FIG. 56) where resilient rubber frame pads 116 and 117 are inserted to facilitate clamping a very wide variety of bicycle frames between the opposing vise jaws 110 and 113 of the vise assembly 66. Each frame pad 116 and 117, according to one embodiment, has a "V" shaped profile 151 and 152 (see FIG. 56) allowing a very wide variety of bicycle frame tube diameters and shapes to be cradled between and held within angled flanges 162, 163 and 164, 165 of the frame pads 116 and 117, respectively. The frame pads 116 and 117 are, according to one embodiment, made of a resilient rubber material to prevent damage to the bicycle frame and provide for good frictional engagement therewith. Pads may or may not be provided. As shown in FIG. 47, according to one embodiment, vise assembly 66 is mounted transversely on the vertically orientated threaded rod 2 of the holder 10 with threaded rod 2 turned into a corresponding threaded aperture 166 (similar to 21, 167) in vise base 99. In this manner the vise assembly 66 is positioned in a generally horizontal orientation with the longitudinal axis of opposing vise jaws 110 and 113 parallel with the tabletop 200 allowing vise jaws 110 and 113 of the vise assembly 66 to both clamp the top tube of the bicycle frame and act to suspend the bicycle 500 a sufficient distance off the tabletop 200 and above the ground to facilitate bicycle maintenance, adjustment or repair. Alternatively, according to one embodiment, the vise assembly 66 can be mounted transversely on the vertically orientated threaded rod 2 of the holder through a second threaded aperture 167 in the vise base 99 positioning the vise assembly 66 in a generally horizontal orientation, but with the vise jaws 110 and 113 perpendicular to the tabletop 200. In this orientation, the opposing vise jaws 110 and 113 are able to clamp the vertically orientated seat tube of the bicycle frame, thereby holding the bicycle 500 sufficiently off the table 200 and above the ground to facilitate bicycle maintenance, adjustment and repair operations thereon.

Figure 37:
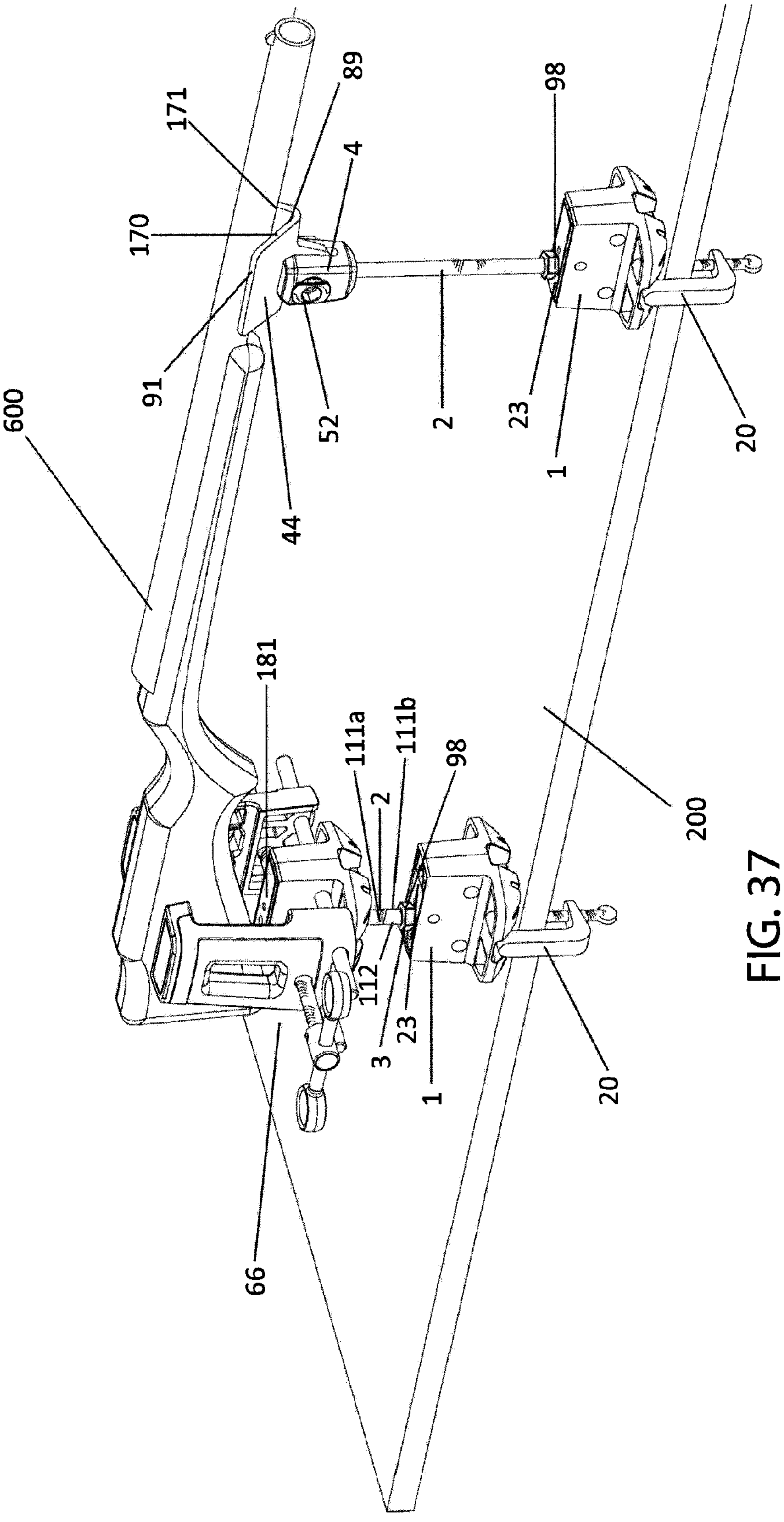
FIG. 37 is a perspective view illustrating a pair of firearm holders clamped to a table or work bench in spaced relation with a gun shown positioned on the two holders for gun inspection, cleaning, repair and sighting, in accordance with an embodiment of the disclosure.
Figure 38:
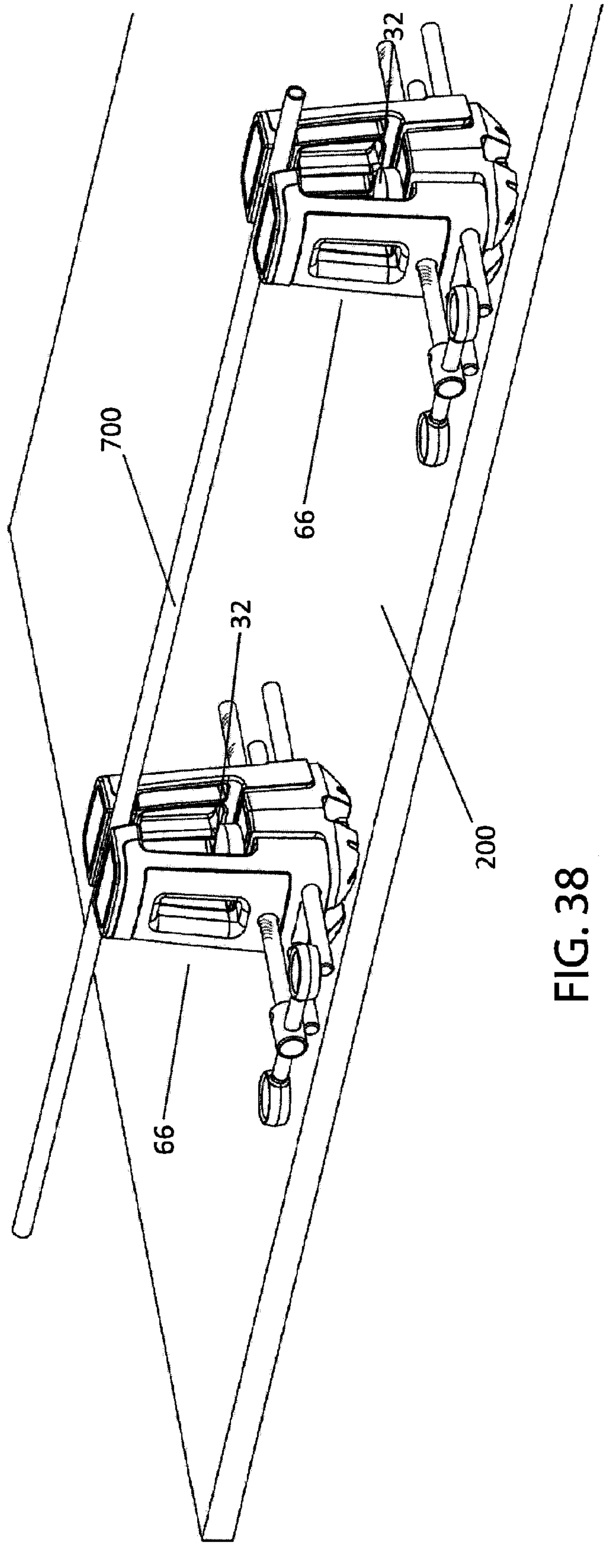
FIG. 38 is a perspective view showing two holders each comprising a vise assembly fastened to a table or work bench in spaced relation as a tool to clamp a section of household copper pipe illustrating the holders versatility, adjustability, and/or adaptability to other non-ski, snowboard, bicycle and firearm uses, in accordance with an embodiment of the disclosure.

According to one embodiment of the disclosure, a first holder 10 is provided for use in spaced relation with a second holder 10 as a firearm support, each said holder being adapted to support one of the opposing end portions of a gun 600. The portable holder comprises a base section 1 adapted to be fixed to the work station 200 in a generally upright position and a threaded rod portion 2 mounted to said base section 1 in a generally upright and vertical orientation. As shown in FIG. 37, according to one embodiment, a support head 4 mounted upon said threaded rod 2 allows a gun barrel cradle 44 to be mounted on one (the right) of the holders 10. The gun barrel cradle 44, according to one embodiment, has a "V" shaped profile 89 allowing a very wide variety of gun barrel diameters to be held between and within angled flanges 170 and 171, said "V" shaped profile 89 also allowing the gun barrel to be automatically centered relative to the vertical axis of said gun barrel cradle 44 when resting thereon. As the "V" shaped profile 89 only supports the bottom portion of the gun barrel a clear line of sight can be established down the top longitudinal portion of the barrel necessary when performing firearm sighting operations. The gun barrel cradle 44, according to one embodiment, has a resilient rubber top surface 91 to prevent damage to the gun barrel surface and provide for good frictional engagement therewith. The gun barrel cradle 44 is mounted to the support head of the holder for movement between a position where said cradle is generally horizontal to one where said cradle is generally vertical, allowing said cradle to pivot between horizontal and vertical positions to accommodate various barrel inclination angles. A vise assembly 66 as described above is mounted to the threaded rod 2 portion of the second (left) holder 10 with the vise base 99, according to one embodiment, having a resilient top pad 181 to frictionally engage the bottom of a gunstock resting thereon, permitting centered clamping of the gunstock along its longitudinal axis between the oppositely disposed vise jaws 110 and 113. The threaded rod 2 of the second (left) holder is provided with two reversely disposed sections of threads 111*a* and 111*b* with corresponding complimentary threads in threaded apertures 3 and 101 (see FIG. 54) of base section 1 and vise base 99 respectively. A thread-free section 112 on threaded rod 2 between reversely disposed threads 111*a* and 111*b* is, according to one embodiment, provided with a knurled surface to assist in obtaining a firm grip when using thumb and fore finger to conveniently turn the threaded rod 2 either clock-wise or counter clock-wise about its vertical axis to permit convenient height adjustment of the vise assembly 66 and gunstock relative to the base section 1 of the holder 10 and allows the angle of inclination of the gun 600 to be readily adjusted relative to the holders 10. Locking nut 98 on the lower portion of threaded rod 2 is tightened and compressed against the top portion 23 of the base section 1 allowing the threaded rod portion 2 and vise assembly 66 to be fastened to the vise base 99 in a fixed position once the holder 10 has been adjusted to the desired height.

It will be appreciated that in other embodiments, two components may be mated together with various clamping, threading and/or other locking or engagement systems known to those of skill in the art. An embodiment has described threaded rods and apertures for connecting and orienting the base section to the support head. In other embodiments, the threaded portion in the aperture in the base may be provided on the support head. In other embodiments, a clamp or friction fit system may be used instead of or in addition to the threads on the rod and the support head. For example, a telescoping rod may be provided with a swivel joint attached to its head. A locking pin may be provided to lock the rod in place. The pin may engage with apertures on the rod. Alternatively or additionally a collar may be provided that can be tightened in place around or about the rod to lock the rod at a given orientation and/or displacement. Such systems may also be provided in the vise jaws, as described earlier.

It will be appreciated that features describing aspects of embodiments as being "straight", "horizontally oriented", "vertically oriented", "upright" or in other terms relating to position or orientation have a range of acceptable values or positions that, if provided, still provide a functional embodiment. For example, a component described as being "horizontal" will encompass an embodiment where the component is substantially horizontal. As a further example, if two components are described as being "parallel" in orientation, other embodiments will tolerate the two components being aligned in a nearly parallel fashion. Similarly, if a component is described as being "straight", other embodiments will tolerate a component being nearly straight. It will be plainly obvious to a person of skill in the art as to what range of values would be acceptable. Further, elements that are described as being "integrated" with another element may be provided as distinct, separate elements that are joined together, in another embodiment and vice versa.

Although the disclosure has been described with reference to certain specific embodiments, various modifications thereof will be apparent to those skilled in the art without departing from the scope of the disclosure as outlined in the claims appended hereto.

The invention claimed is:

1. A clamp system for holding a workpiece, comprising:

a clamp having
- a frame having a cavity located along an exterior surface of the frame, the cavity having
- a first wall and a second wall;
- a first protrusion located in the cavity on the first wall, extending towards the second wall and retaining a cord; and
- a second protrusion extending to a center line of a spine of the clamp and extending from the first protrusion;

a first mating feature located on the frame at a first location, the first mating feature having an aperture to receive a locking mechanism;

a second mating feature shaped to mate with the first mating feature located on the frame at a second location; and a first clamping screw subassembly mated to the clamp through a first opening in the frame, the first clamping screw subassembly having
a clamping plate having an aperture receiving the cord;
a clamping screw; and
a support head formed on one end of the clamping screw.

2. The clamp system as claimed in claim 1, wherein:
the clamp is a C-clamp having a lower jaw connected to a middle section connected to an upper jaw; and
the first protrusion further comprises a feature located on the second wall, extending towards the first wall and shaped to retain the cord.

3. The clamp system as claimed in claim 2, wherein:
the first protrusion has a V-shaped cross section.

4. The clamp system as claimed in claim 1, wherein the clamp further comprises:
a second protrusion extending to a center line of a spine of the clamp and extending from the first protrusion.

5. The damp system as claimed in claim 1, wherein:
the cavity spans a corner of the exterior surface of the frame; and
the first protrusion is located in about the corner in the cavity.

6. The clamp system as claimed in claim 1, wherein:
the first mating feature is a third protrusion extending from the surface of the clamp; and
the second mating feature is a depression shaped to receive the third protrusion.

7. The clamp system as claimed in claim 1, wherein the first mating feature has an aperture to receive a locking mechanism.

8. The clamp system as claimed in claim 1, wherein:
the first location is in on a distal end of a lower jaw of the frame on the exterior surface on the frame; and
the second location is in on the distal end of the lower jaw on an interior surface on the frame.

9. The clamp system as claimed in claim 1, wherein the clamp further comprises:
an orientation feature provided on the first mating feature to orient a second damp in one of at least two fixed orientations relative to the clamp when the first mating feature of the clamp is mated to the second mating feature of the second clamp.

10. The clamp system of claim 9, wherein in use:
the clamp is mounted to a workstation; a workpiece is mounted on the support head; and the cord is fed through the first protrusion in the clamp, over a section of the workpiece and to the clamping plate to assist in stabilizing the workpiece at the workstation.

11. The clamp system of claim 9, further comprising:
a clamping plate mated to the clamp, the clamping plate having a recess to receive the cord.

12. The clamp system of claim 1, wherein:
the support head has a clamping handle having ends adapted to receive mounting hold a bicycle fork of the workpiece.

13. A clamp, comprising:
a frame having
a lower jaw;
a middle section connected to the lower jaw at a first corner;
an upper jaw connected to the middle section at a second corner; and
first and second cavities defined an exterior surface of the frame at the first and second corners;
a first protrusion located in the each of the first and second cavities around the first and second corners, the first protrusion located on a first wall of the first and second cavities, extending towards a second wall of the first and second cavities retaining a cord at one end of the cord;
a second protrusion extending to a center line of a spine of the clamp and extending from the first protrusion;
a first clamping screw subassembly mated to the clamp through a first opening in the upper jaw of the frame, the clamping screw subassembly having
a clamping plate;
a clamping screw; and
a support head formed on one end of the clamping screw; and
a second clamping screw subassembly mated to the clamp through an opening in the lower jaw of the frame.

14. The clamp of claim 13, further comprising:
a first mating feature located on the frame at a first location, the first mating feature shaped to mate with a second mating feature of a second clamp.

15. The clamp of claim 13, wherein:
the support head has a second mating feature to mate with the first mating feature of the clamp.

16. The clamp of claim 13, wherein:
the support head has a clamping handle having ends adapted to receive mounting hold a bicycle fork end of the workpiece.

17. A clamp system for holding a workpiece, comprising:
a cord having a first end and a second end;
a clamp having
a frame having a first cavity located along an exterior surface of the frame, the first cavity having a first wall and a second wall;
a first protrusion located in the first cavity on the first wall, extending towards the second wall and retaining the cord; and
a second protrusion extending to a center line of a spine of the clamp and extending from the first protrusion; and
a first clamping screw subassembly having mateable through a first opening in the frame of the clamp, the first clamping screw subassembly having
a clamping plate having an aperture receiving the cord;
a damping screw;
a support head formed on one end of the clamping screw; and
an aperture for receiving the second end of the cord.

18. The clamp system for holding a workpiece as claimed in claim 17, wherein:
the frame further comprises
a lower jaw;
a middle section connected to the lower jaw at a first corner;
an upper jaw connected to the middle section at a second corner; and
a second cavity that defines with the first cavity an exterior surface of the frame at the first and second corners;
the protrusion is located in the first cavity;
the first opening is located in the upper jaw; and
the second opening is located in the lower jaw.

* * * * *